US012632864B2

(12) United States Patent
Mawson

(10) Patent No.: US 12,632,864 B2
(45) Date of Patent: May 19, 2026

(54) FEDERATED IDENTIFIERS FOR CROSS-PLATFORM INTEROPERABILITY

(71) Applicant: Block, Inc., San Francisco, CA (US)

(72) Inventor: Jeremy Mawson, Elanora (AU)

(73) Assignee: Block, Inc., Oakland, CA (US)

( * ) Notice: Subject to any disclaimer, the term of this patent is extended or adjusted under 35 U.S.C. 154(b) by 287 days.

(21) Appl. No.: 17/525,786

(22) Filed: Nov. 12, 2021

(65) Prior Publication Data

US 2023/0074653 A1      Mar. 9, 2023

Related U.S. Application Data

(60) Provisional application No. 63/238,713, filed on Aug. 30, 2021.

(51) Int. Cl.
*G06Q 20/40* (2012.01)
*G06Q 20/06* (2012.01)
*G06Q 20/08* (2012.01)
*G06Q 20/38* (2012.01)

(52) U.S. Cl.
CPC ....... *G06Q 20/4014* (2013.01); *G06Q 20/065* (2013.01); *G06Q 20/0855* (2013.01); *G06Q 20/381* (2013.01)

(58) Field of Classification Search
CPC ............. G06Q 20/4014; G06Q 20/065; G06Q 20/0855; G06Q 20/381
See application file for complete search history.

(56) References Cited

U.S. PATENT DOCUMENTS 9,703,802 B1 * 7/2017 Ward .................... G06F 16/182
10,990,936 B1 4/2021 Hecht et al.
11,055,692 B1 * 7/2021 Bodalia ............ G06K 19/06112
(Continued)

FOREIGN PATENT DOCUMENTS

KR      20200134622 A  * 12/2020  ............. G06Q 40/04

OTHER PUBLICATIONS

David J. Lutz et al: "A Survey of Payment Approaches for Identity Federations in Focus of the SAML Technology", IEEE Communications Surveys and Tutorials, vol. 15, No. 4, Fourth Quarter, Jan. 1, 2013 (Jan. 1, 2013), pp. 1979-1999.
(Continued)

*Primary Examiner* — Davida Lee King
(74) *Attorney, Agent, or Firm* — IP Spring

(57) ABSTRACT

In one embodiment, techniques include storing indications of unique identifiers used by users of service providers that are part of a federated system. Each of the unique identifiers is associated with only one user. A computing system of a first service provider receives an intent to register a unique identifier with the first service provider. The computing system determines availability of the unique identifier based on determining whether the unique identifier is associated with another user in the data store. Based at least in part on the determination that the unique identifier is available, the computing system maps, in the data store, the unique identifier with an account of the user associated with each service provider that is part of the federated system. Subsequent to the mapping, the unique identifier is usable as a proxy in lieu of personal data associated with the user on each service provider.

20 Claims, 13 Drawing Sheets

(56) References Cited

U.S. PATENT DOCUMENTS

| | | | | |
|---|---|---|---|---|
| 2016/0179769 | A1* | 6/2016 | Gershom | ................ G06F 16/23 |
| | | | | 715/235 |
| 2019/0095989 | A1* | 3/2019 | Archer | ................. G06Q 20/342 |
| 2019/0114362 | A1* | 4/2019 | Subbian | .............. G06F 16/9535 |
| 2021/0117940 | A1* | 4/2021 | Grassadonia | ........ G06Q 20/384 |
| 2021/0295331 | A1* | 9/2021 | Buradagunta | ........ G06Q 20/385 |
| 2021/0312431 | A1* | 10/2021 | Ravinathan | ........ G06Q 20/0658 |

OTHER PUBLICATIONS

International Search Report and Written Opinion for International Application No. PCT/US2022/041339, mailed Dec. 14, 2022.

* cited by examiner

FEDERATED IDENTIFIERS FOR CROSS-PLATFORM INTEROPERABILITY

PRIORITY

This application claims the benefit, under 35 U.S.C. § 119(e), of U.S. Provisional Patent Application No. 63/238,713, filed 30 Aug. 2021, the entire contents of which are incorporated herein by reference.

TECHNICAL FIELD

With the widespread use of the Internet and electronic payment technologies, it has become convenient for individuals to conduct electronic payment transactions. In some examples, to facilitate electronic payment transactions, users send or receive money on a platform provided by a payment service using identifiers.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

Figure 1:
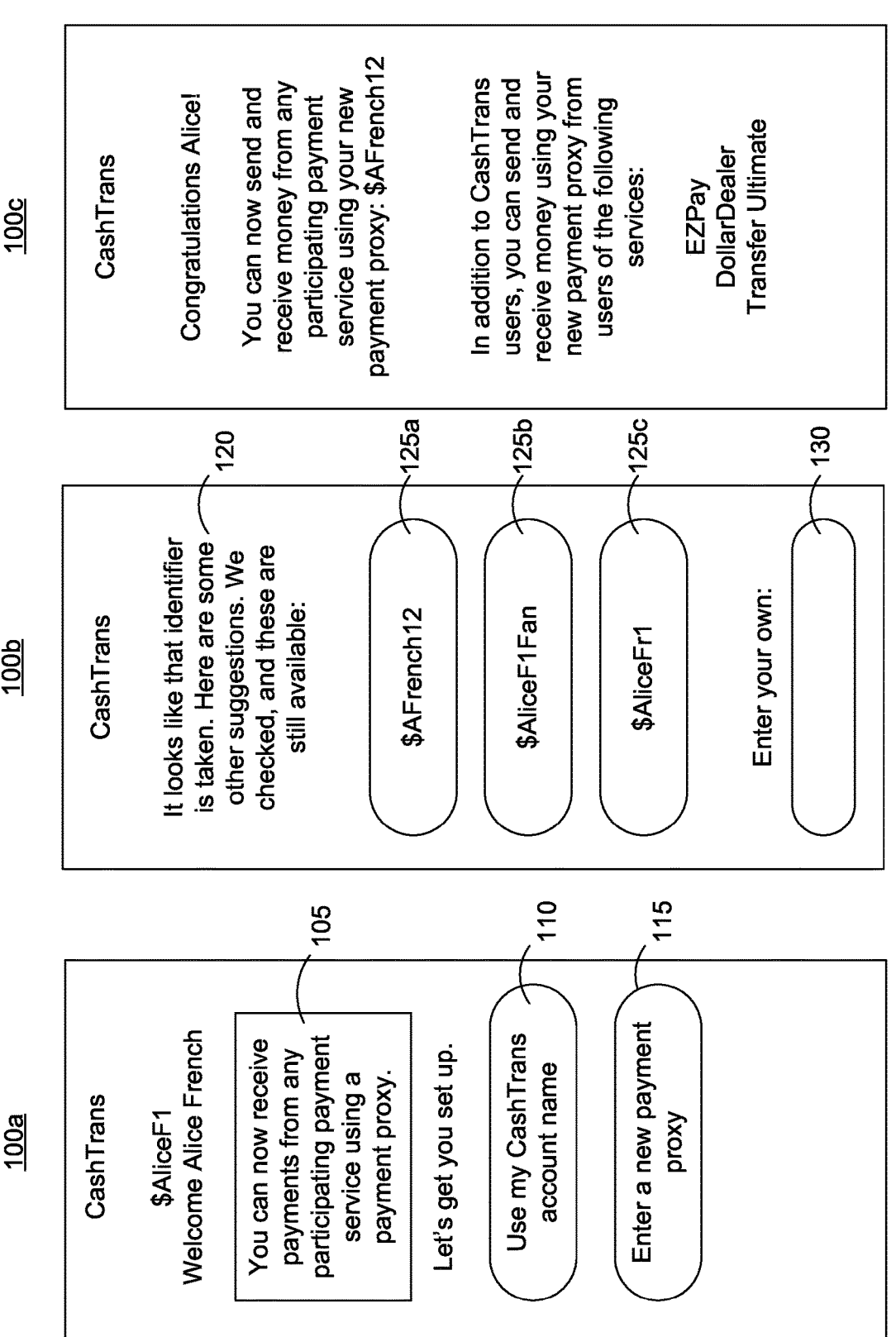
FIG. 1 is an example interface of a mobile application according to some embodiments disclosed herein.

This application relates to a federated identifier technology that includes creating, maintaining, and monitoring use of identifiers for referencing user account information across multiple platforms. A platform can comprise software or hardware components or systems that facilitate operations of a service, such as a payment service. Users of services, such as payment services, can use identifiers as proxies for financial information in lieu of providing user account information directly. When used with payment services, such identifiers can be referred to as "payment proxies." Each user can have their own identifier that is unique to them (i.e., no other user of a payment service has the same identifier) and thus the identifier can be a "unique identifier." Techniques described herein relate to a payment service creating an identifier that is unique to a user across multiple services that are associated with a centralized or decentralized (i.e., "distributed") control or decision-making system. That is, in an example, a payment service can create a unique identifier that can be configured to work across payment rails and with payment technologies of multiple, different payment services based on technical specifications provided by each of the payment services. Further, a payment service can maintain such a unique identifier and monitor use of the unique identifier on its own platform, as well as third-party platforms associated with other services, for example via software or hardware components, such as application programming interfaces. Such creation, maintenance, and monitoring can enable users to use the same unique identifiers with multiple, interoperable services or platforms.

Users routinely conduct payment transactions, such as peer-to-peer transactions, through a variety of payment services, such as web-based, mobile-based, or hardware/firmware-based payment services. In at least one example, a user of a payment service is associated with a user account. A user account can be associated with one or more financial accounts of a user, identifying information of the user (e.g., a username, email address, phone number), or the like. In some examples, a user account can be associated with an identifier that uniquely identifies the user from other users of the payment service. As described above, such an identifier can be a "unique identifier." In one example, the unique identifier can comprise a syntax that includes, for example, a monetary currency indicator (or "currency indicator") prefixing one or more alphanumeric characters. In another example, the unique identifier can be an email address, phone number, or other kind of user information. At the time of sending or receiving money, the payment service can utilize unique identifiers to identify participants to a transaction.

Different payment services utilize different technical specifications, communication protocols, or payment rails. As such, in conventional techniques, a unique identifier associated with a particular payment service is not operable on another payment service. A user that utilizes multiple, different payment services creates a unique identifier for each payment service. With the proliferation of varied payment services, this lack of interoperability can cause users to have multiple unique identifiers and can limit cross-platform transactions. Techniques described herein, however, offer solutions to such problems associated with conventional technologies. For example, techniques described herein relate to "federated identifiers," wherein a unique identifier is unique across multiple services that utilize a centralized or decentralized control or decision-making system such that the unique identifier uniquely identifies the user among all of the users of each of the multiple services. "Federated" in this context can refer to the fact that each participating service responds to centralized or decentralized control or decision making but retains its own authority in its domain. As such, techniques described herein relate to a payment service creating a unique identifier that is unique to a user across multiple services that are associated with a centralized or decentralized control or decision-making system.

In conventional technologies, differing technical specifications, communication protocols, or payment rails can limit interoperability of multiple payment services. Techniques described herein, however, leverage modifications to existing platforms to enable interoperability among different platforms. That is, a payment service can create an identifier that can be configured to work across payment rails, communication protocols, or with payment technologies of multiple, different payment services based on technical specifications provided by each of the payment services. As such, techniques described herein enable the interoperability of an identifier on multiple, different platforms (e.g., associated with multiple, different services). In some examples, the identifier, which can be unique to a user on a payment service (i.e., a "unique identifier," can be used to transact— or otherwise exchange data—between one or more services. In some examples, such interoperability can cause re-formatting of a unique identifier for use on a first platform to comply with technical specifications of a second platform (e.g., $userA, @userA, userA@email.com, etc.). Such reformatted unique identifiers can similarly be used to transact— or otherwise exchange data—between one or more services. As such, such unique identifiers can be referred to as "federated identifiers," as described herein. In at least one example, a payment service can utilize one or more application programming interfaces to enable multiple, distinct platforms to communicate with one another and ensure format compliance on the distinct platforms. In some examples, such interoperability can cause the re-formatting of the technical specifications of the second platform. Thus, federated identifier technology, as described herein, can be used to allow for interoperability and identification of users across a variety of platforms. As such, techniques described herein offer solutions to existing technical problems of conventional technologies.

In addition to interoperability challenges that arise with different technical specifications, communication protocols, or payment rails, the use of unique identifiers across platforms creates another challenge with respect to namespaces of unique identifiers used across platforms. For example, the size and variety of unique identifiers (e.g., the "namespace") is limited based on the character set and syntax used to create such unique identifiers. This can be problematic when two or more payment services merge userbases. In an example, two payment services may use the same syntax for identifiers. The two payment services can attempt to combine their userbases to provide for interoperability between the two payment services. However, because the two payment services use the same syntax, there is a high likelihood that different users, one from each of the payment services, have registered the same user identifier. This overlap between users is referred to as a "collision." Collisions can also arise when a user attempts to register a unique identifier that is available on a first payment service of a network of services, because no other user has registered the unique identifier with the first payment service, but is unavailable on a second payment service of the network of services, because a user on the second payment service has registered the unique identifier. Collisions can further arise when two users, on two different payment services, attempt to register a same unique identifier at substantially the same time and only one user can be granted use of the unique identifier.

Techniques described herein offer solutions to such collision problems through the federated identifier technology. For example, the multiple payment services using the federated identifier technology can establish and otherwise agree to a collision resolution protocol. The collision resolution protocol can provide a fair and predictable manner of resolving conflicts such that users are not disadvantaged by virtue of their use of one or more of the multiple payment services. Resolving conflicts can include determining which registration request associated with which of the multiple payment services are granted. In a first example collision resolution protocol, each of the multiple payment services can operate on a synchronized clock. Requests to register a unique identifier are associated with a timestamp by the payment service issuing the request. When different payment services attempt to register a same unique identifier, the registration request that is associated with an earlier timestamp is granted. Another example collision resolution protocol uses a standardized mathematical resolution tool. When a centralized or decentralized control or decision-making system detects a collision between two registration requests, the decision-making system or the payment services generate a mathematical value using an immutable value associated with each registration. The mathematical value can be a hash value generated by a predetermined hash function. The centralized or decentralized control or decision-making system can compare the two mathematical values and grant the registration request associated with a mathematical value satisfying some predetermined characteristic or test. Example characteristics or tests can include the greatest value, the least value, the greatest or least absolute value, the result of another mathematical function applied to the mathematical value (e.g., a modulo function), or the like. In another example collision resolution protocol, a turn-based system can be used where priority levels are assigned among the multiple payment services and priority levels are adjusted when a payment service relies on a priority level to resolve a collision. Additional or alternative collision resolution protocols are further discussed herein.

In some implementations, the techniques described herein can preemptively recommend, for example using machine learning algorithms, whether a certain unique identifier is available on different platforms, and if not recommendations to create a unique identifier or substantially similar identifier across different platforms. In addition to determining which of one or more competing registration requests are granted, techniques described herein offer solutions to generating or recommending alternative unique identifiers to users when a registration request is not granted. Recommendations can be based on, for example, look-ahead or type-ahead text prediction, a sequential or ordered recommendation system, other text recommendation engines, or similarity and comparison models. The recommendation system can include the use of machine learning. As an example, a recommendation or decision-making system (e.g., in a centralized embodiment) or a payment service can determine similarity between a requested unique identifier and one or more suggested unique identifiers based on one or more similarity-determining functions. The similarity-determining functions can include a semantic understanding algorithm, such as natural language processing, to evaluate the meaning of words used in the requested identifier and generate identifiers with similar semantic meaning. Additionally or alternatively, the similarity-determining functions or recommendation system can use one or more machine learning models trained to categorize unique identifiers and otherwise identify similarities across unique identifiers, such as frequency of co-usage or replacement-level usage of words in a language corpus. A word embedding model can, for example, generate an embedding corresponding to the unique identifier and to a set of pre-generated unique identifiers, where the embedding maps words to an embedding space such that distance in the embedding space is inversely related to similarity. To make a recommendation, the word embedding model can generate an embedding for the requested unique identifier, identify a set of identifiers corresponding to embeddings near the embedding for the requested unique identifier in the embedding space, and provide the set of unique identifiers as recommendations. Additional or alternative recommendation systems are further discussed herein.

Techniques described herein further relate to techniques for maintaining the security of financial information by limiting the amount and format of financial information stored in a centralized data store or on a semi-public or public ledger. In particular, techniques described herein relate to the generation, storage, and maintenance of tokens, which can include cryptographic tokens, to correspond to the user accounts in the centralized data store (e.g., in a centralized embodiment) or in a ledger (e.g., in the decentralized embodiment). The financial information associated with the user account can be stored in an account data store maintained by the payment service and not provided to the centralized data store or account ledger. The payment service can retrieve the financial information associated with the user account when presented with the token. As described herein, the token can include or be based on a public key generated by a payment service to correspond to a user account. The payment service can store the corresponding private key with the financial information and use the private key to verify the authenticity of the token. The use of the token provides another solution to problems associated with other systems for promoting interoperability of multiple different systems in which data is shared among the different systems. The token is used as a substitute for the shared data and retrieved on demand and in response to validation, securing the integrity of the data.

The diversification and proliferation of payment services amplifies the opportunities for misdirecting payments. In conventional technologies, different users can register and use the same identifier on multiple payment services. This can be problematic due to the limited size of the namespace for unique identifiers shared between payment services. As an example, two different users Alice French and Alice Fairfield, using two different payment services, can each register the identifier $AliceF1 enabling them to send and receive payment using that unique identifier (e.g., unique on each payment service). That is, Alice French can use $AliceF1 on Payment Service A and Alice Fairfield can use $AliceF1 on Payment Service B. This can lead to misdirected payments among other users who desire to send payment to a person or entity that uses a unique identifier on a first payment service when the sending users use the same identifier on other payment services. Continuing with the example, another user, Bob Brown, can be told by Alice French to send payment using the unique identifier $AliceF1. Bob Brown can search for $AliceF1 on his payment service of choice without confirming which service Alice French uses. If Bob Brown is using Payment Service B (i.e., where Alice Fairfield is using $AliceF1) and Bob Brown completes the payment, he has unintentionally sent the payment to Alice Fairfield instead of Alice French.

As another example, misdirected payments can be intentionally induced via fraudulent activities. Fraudulent activities, such as users misrepresenting their identities through a unique identifier registered on a payment service, can intentionally induce misdirected payments. Returning to the example above, another user Charles Smith may know that Alice French frequently receives payments using the identifier $AliceF1 on a popular payment service. Charles Smith may intentionally register $AliceF1 on a new or trending payment service with the intent to mislead other users of the new payment service into sending payments to him thinking they are going to Alice French. Furthermore, the proliferation of payment services exposes institutional users to risk of digital squatters registering a unique identifier on a new payment service that is used by the institutional users on other payment services. As an example, a charity may register identifiers on a variety of payment services to facilitate users easily donating to the charity regardless of the user's payment service of choice. Bad actors can, however, determine that the charity has yet to register the identifier on a new payment service. A bad actor can anticipate users "donating" to the charity and, by registering the identifier with the new payment service, collect the donated funds on their own behalf.

Techniques described herein offer solutions to alleviate misdirected payments. That is, by utilizing federated identifiers, techniques described herein enable the mapping of a single unique identifier to a single user. A unique identifier can uniquely refer to a single user among all users of all services using the federated identifier technology and therefore be "universally unique" to that single user. As such, a sending user can input a unique identifier associated with a user to indicate the user is a recipient of a payment and, regardless of which payment service they are using, the user associated with the unique identifier can receive the funds. Further, techniques described herein prohibit bad actors from creating identifiers fraudulently and inducing fraudulent payments. As such, techniques described herein offer improvements to user experience with services or platforms as described herein.

Techniques described herein therefore provide various technical solutions to technical problems as described above. Additional solutions are apparent in the discussion of the figures below. It should be noted that while reference is made to "payment services" and associated platforms, techniques described herein are similarly applicable to various types of service providers, such as social networking service providers, communication service providers, or the like. That is, techniques described herein are not limited to implementing federated identifiers for payment services and instead relate to implementing federated identifiers for any type of service that is configured for interoperability, as described herein.

FIG. 1 illustrates example user interfaces of a mobile application relating to registering an identifier in an operating environment associated with federated identifiers. As described above, an identifier can be unique for a particular payment service and thus can be referred to as a "unique identifier." In some examples, an identifier can be unique across multiple payment services (e.g., a "universally unique identifier). In examples where the multiple payment services are constituent services of a federated identifier system, the identifier can be referred to as a "federated identifier." That is, a "federated identifier" is a unique identifier that is unique across multiple services that utilize a centralized or decentralized control or decision-making system such that the unique identifier uniquely identifies the user among all of the users of each of the multiple services. "Federated" in this context can refer to the fact that each participating service responds to centralized or decentralized control or decision making but retains its own authority in its domain. In some examples, the various participating services can be first-party or third-party services. As a non-limiting example, the various participating services can be operated by a service providing the operating environment or a service with access to the operating environment.

The user interfaces illustrate embodiments of the techniques disclosed herein. In a first user interface 100*a*, a user named Alice French has signed into a mobile application, which for illustrative purposes is associated with a payment service called "CashTrans." The user interface 100*a* includes a notification 105 informing Alice French that CashTrans has joined an operating environment that uses federated identifiers and that she can receive payments from users of other payment services that are part of the same operating environment. Such payment services can be referred to as "constituent services" because they are associated with a centralized or decentralized control or decision-making entity. As used herein, a federated identifier enables a user to be uniquely referenced across the constituent services.

In some examples, a federated identifier can have a particular syntax, which can facilitate parsing by computer systems and easy identification by users. The syntax can include, for example, a monetary currency indicator (or "currency indicator") prefixing one or more alphanumeric characters. The currency indicator operates as a tagging mechanism that indicates to a computer system to treat the inputs as a request from the sender to initiate a transfer, where detection of the syntax (which includes one or more alphanumeric characters tagged by a monetary currency indicator) through monitoring triggers the transfer. The currency indicator can correspond to various currencies, e.g., dollar ($), euro (€), pound (£), rupee (₹ ), yuan (v), etc. Although use of the dollar currency indicator ($) is used herein, it is to be understood that any currency symbol could equally be used. The term "alphanumeric character" as used here refers to a symbol that can be a number (i.e., numeric), a letter (i.e., alphabetic), or a combination thereof. In some examples, a federated identifier can take the form of a phone number, email address, mailing address, or other such identifier.

In some examples, a federated identifier can be used as a proxy, in lieu of other information. For instance, when used for a transaction, a federated identifier can be used as a payment proxy in lieu of financial account information of one or more users of the transaction. A payment proxy assists a user in protecting their personal, and especially financial, information because it allows users to initiate transfers without divulging said information. For example, the payment proxy can be linked by a payment service to a bank account, debit card number, credit card number, etc. Additionally, the payment proxy is easier for most users to remember than a traditional bank or payment card number. An individual payment service can preferably ensure that each payment proxy used on its own system is unique and is registered for use by a single user account. Techniques described herein, however, enable a payment proxy to be used across multiple, interoperable payment services.

The user interface 100*a* further includes two interactive elements 110 and 115 to expedite Alice selecting a federated identifier. By selecting interactive element 110, Alice can request to use her existing unique identifier ("$AliceF1") on the CashTrans service. By selecting interactive element 115, Alice can request to use a new unique identifier.

In a second user interface 100*b*, Alice has selected interactive element 110. The CashTrans application has communicated with the payment servers which have in turn determined that the unique identifier "$AliceF1" is already registered to another user of a payment service in the operating environment, e.g., through a different payment service that uses federated identifiers (i.e., a different constituent service). The notification 120 indicates to Alice that her preferred unique identifier is not available. The user interface 100*b* also includes several interactive elements 125*a*, 125*b*, and 125*c* that represent unique identifiers that have been identified by CashTrans as being available for Alice to register with the operating environment that uses federated identifiers. Interacting with any of the interactive elements 125*a*, 125*b*, or 125*c* can initiate a request to register that unique identifier to her account with the operating environment that uses federated identifiers. The user interface 100*b* also includes an interactive element 130 where the user, Alice, can enter a custom unique identifier to attempt to register it with the operating environment that uses federated identifiers.

In a third user interface 100*c*, Alice has selected interactive element 125*a* to request to register the unique identifier "$AFrench12." The third user interface 100*c* includes additional information regarding the operating environment that uses federated identifiers, including a list of participating payment services and confirmation of the new unique identifier for Alice's account. Alice can now initiate and receive transactions with other users using any of the participating payment services using the federated identifier.

In particular embodiments, after Alice requests and completes registration of the federated identifier $AFrench12, CashTrans can merge Alice's existing account information with the new federated identifier. That is, Alice's existing account information can be updated to include the new federated identifier instead of the previous unique identifier. Additionally or alternatively, CashTrans can create a new account for Alice based on the previously available information. In certain embodiments, the new account co-exists with the old account (e.g., Alice can select which account to use) for a predetermined period of time. In other embodiments, the old account can be deprecated immediately. As described herein, registration of the federated identifier $AFrench12, can cause the other participating payment services to create user accounts for Alice which may include select account information provided by CashTrans (and on permission from Alice). Alice can also access the other participating payment services using the federated identifier and supplement her account information on the other services.

In particular embodiments, after Alice requests and completes registration of the unique identifier $AFrench12, any previous unique identifiers used by Alice on the payment service can be disabled such that a user who initiates a payment to Alice through a previous identifier receives an error message instead. Additionally or alternatively, previous unique identifiers can be rerouted to the new unique identifier $AFrench12. For example, a user who initiates a payment using a previous unique identifier can be informed of the transition to the federated identifier system and informed of Alice's new federated identifier.

Figure 2:
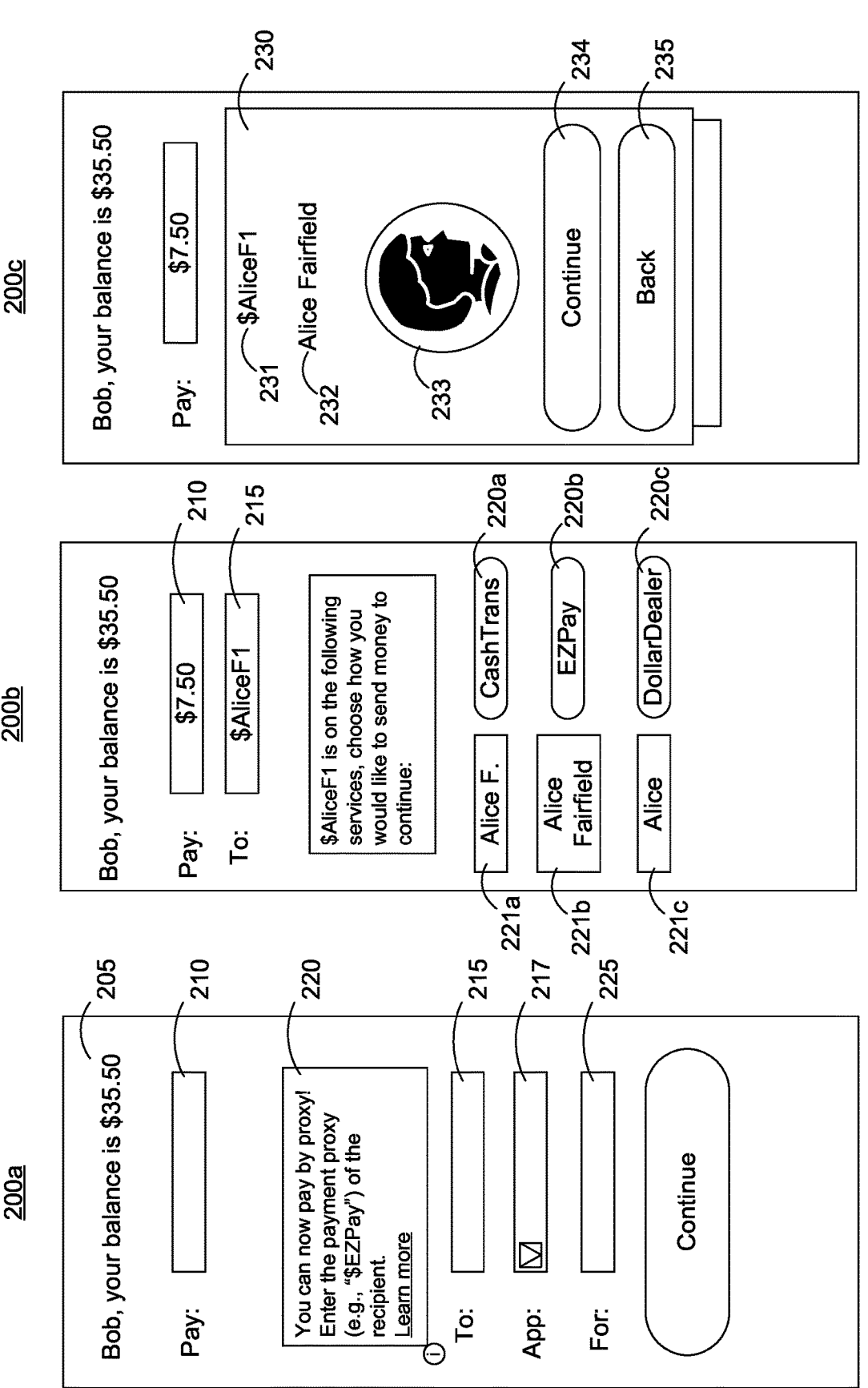
FIG. 2 is an example interface of a mobile application according to some embodiments disclosed herein.

FIG. 2 illustrates example user interfaces 200*a-c* of a mobile application relating to initiating a transaction using a unique identifier that is registered with the operating environment that uses federated identifiers. Because the unique identifier is registered with the operating environment that uses federated identifiers, the unique identifier can be a "federated identifier." The user interfaces 200*a-c* illustrate embodiments of the techniques disclosed herein. In a first user interface 200*a*, a user, Bob Brown, has signed into a mobile application associated with the payment service "EZPay."

The user interface 200*a* includes a notification 205 of Bob's account balance and interface fields through which Bob can provide information regarding the payment. At field 210, Bob can enter the payment amount. At field 215, Bob can provide information for the recipient of the payment, for example recipient's name or recipient's unique identifier. At field 217, Bob can provide information for the mobile application (e.g., EZPay, CashTrans, etc.) on which the recipient is registered. As described, in some examples, the mobile application can be associated with a first-party or third-party service. In absence of Bob providing the mobile application, the EZPay service, or the mobile application, can detect one or more mobile applications where the recipient is registered and auto populate the user's preferred mobile application or a list of all mobile applications in, for example, a drop down menu. In some cases, there may be an option for Bob to use a different payment service (e.g., CashTrans) from the payment service of the mobile application of user interface 200a (e.g., EZPay), for example a payment service or mobile application that provides a faster, more efficient settling of transaction between Bob and the recipient or has more recent recorded activity, which indicates that the recipient is a active user of the the payment service. At field 225, Bob can provide additional information about the payment, as in a memo field. The user interface 200a also includes a modal 220 indicating to Bob that his payment options have changed. Specifically, that he can now use a unique identifier (i.e., a "payment proxy") to initiate the transaction. The modal 220 also includes resources for the user to learn more.

In a second user interface 200b, Bob has entered a payment amount into field 210 and a unique identifier "$AliceF1" into field 215. Upon receiving the input of "$AliceF1" into field 215, the mobile application transmits the identifier "$AliceF1" to EZPay. EZPay, the payment service associated with the mobile application, then determines if the unique identifier $AliceF1 is mapped to a user account of any payment service associated with the operating environment that uses federated identifiers. As described herein, EZPay can make this determination by querying an application programming interface of a centralized identifier registrar that maintains records of federated identifiers, by querying a local instance of an identifier ledger, or through similar methods. Upon determining that the unique identifier is mapped to multiple user accounts, EZPay communicates with the various services to retrieve identifying information for the corresponding user(s). The mobile application receives this identifying information and presents it to Bob via the user interface 200b. In particular, the user interface 200b includes text fields 221a, 221b, and 221c showing the registered real name of the user associated with the unique identifier $AliceF1 on each of the multiple services for which records of the unique identifier can be retrieved. In addition or alternatively to the real name, other user identifying information can be provided, such as a user's picture, address information, potential mutual connections, etc. User interface 200b also includes a number of selectable elements 220a, 220b, and 220c, each associated with a payment service for which the unique identifier $AliceF1 is registered. Bob can select one of the selectable elements 220a, 220b, and 220c to proceed with initiating a payment to the user account associated with that payment service. For example, Bob selects selectable element 220b to proceed with paying the user Alice Fairfield.

In a third user interface 200c, Bob has entered a payment amount and a unique identifier "$AliceF1" into field 215 of user interface 200a. Upon receiving the input of "$AliceF1" into field 215, he mobile application transmits the identifier "$AliceF1" to EZPay. EZPay, the payment service associated with the mobile application, then determines if the unique identifier $AliceF1 is mapped to a user account of any payment service associated with the operating environment that uses federated identifiers according to embodiments disclosed herein. In the user interface 200c, EZPay has identified a single user account uniquely associated with the unique identifier $AliceF1. Upon determining that the unique identifier is mapped to a user account, in this case the user account associated with Alice through the CashTrans payment service, EZPay communicates with CashTrans and retrieves identifying information for the corresponding user, Alice, and presents the modal 230 shown in user interface 200c. As an example, the modal 230 includes the unique identifier 231, the name 232 of the corresponding user, and an account picture 233 of the corresponding user. Using this information, Bob can determine whether he has entered the correct unique identifier and found the actual intended recipient. If it is the correct user, Bob can select interactive element 234 to continue the transaction. If it is not the correct user, Bob can select interactive element 235 to return to user interface 200b and change the unique identifier. Whereas in user interface 200b, Bob determines the payment service and user account to which to initiate the payment, in user interface 200c, EZPay and the corresponding mobile application have been able to affirmatively determine that Alice Fairfield has registered the unique identifier "$AliceF1" and can therefore eliminate other potential users. In particular embodiments, EZPay and the mobile application can determine which of the payment services through which to initiate payment based at least in part on contextual information relating to the payment. For example, EZPay and the mobile application can consider past transactions between Bob and the one or more potentially matching users to determine an existing relationship, an expressly stated preferred or primary payment method associated with Bob and the receiving user, costs or fees that may be charged to Bob, the receiving user, and the payment services, as a consequence of conducting the transaction through a particular payment service, the speed at which the payment services can process payments and finalize the exchange of funds, recent activity of the user(s) on the payment services or associated mobile applications, the transaction volume of the payment services, the relative popularity of the payment services, and other similar considerations. Additionally, if the payment services are associated with mobile applications, EZPay and the mobile application can consider which of the mobile applications are installed on respective user electronic devices and how recently the user(s) have been active in the mobile applications. This can be useful to determine whether a user has abandoned or stopped using an old account that is still associated with their unique identifier and would therefore be less preferable in comparison to an account with a payment service they actively use.

In particular embodiments, once the correct unique identifier $AliceF1 is selected, EZPay attempts to retrieve financial account information associated with the unique identifier $AliceF1. As an example, in a centralized federated identifier system, EZPay can query a centralized identifier registrar to retrieve the account information associated with the unique identifier $AliceF1. The centralized identifier registrar can respond with the account information and an identification of the payment service to contact regarding notifications (e.g., the payment service "CashTrans," through which Alice registered the federated identifier "$AliceF1"). Additionally or alternatively, the centralized identifier registrar can respond with a token associated with the unique identifier $AliceF1. EZPay can contact CashTrans through a secured direct connection to identify the appropriate payment rails or communication protocol. EZPay can provide the token and other account information to validate the transaction request. EZPay and CashTrans can agree on the payment rails to use to initiate the transaction. EZPay can then initiate the transaction from the financial account associated with Bob to the financial account associated with Alice through the unique identifier $AliceF1. In contrast to conventional peer-to-peer transactions, using the federated identifier system, Bob has now sent a payment to Alice across payment services without exchanging financial information. Previously, peer-to-peer transactions were available when two users used the same payment service or when two users exchanged sensitive account information (e.g., account numbers, payment card numbers, etc.).

In some examples, individual payment services, such as "EZPay" and "CashTrans" in the preceding example, can operate with different currencies (e.g., dollar ($), euro (€), pound (£), rupee (₹), yuan (¥), etc.) or asset types (e.g., fiat currency, investments, cryptocurrency, etc.). In some examples, at least one of the payment services or a centralized exchange service can determine a currency associated with the payment service from which a payment originated (e.g., sender payment service) and a currency associated with the payment service by which the payment is received (e.g., recipient payment service) and, if such currencies are different, can determine exchange rates between the sender and receiver currency. Such exchange rates can be used to facilitate payments between multiple payment services that operate with different currencies. In some examples, the exchange rates can be based at least in part on public exchange rates or models, in some examples that are trained by machine learning mechanisms using data associated with the payment service(s). In at least one example, in association with a payment, the payment service or the centralized exchange can perform a conversion between currencies based at least in part on the determined exchange rates.

The user interfaces 100 and 200, and any other user interfaces described herein, are provided for illustrative purposes. Such user interfaces can display additional or alternative data in additional or alternative configurations. To the extent "notifications," "interactive elements," "fields," "modals," or the like are referenced, such "notifications," "interactive elements," "fields," "modals," or the like can comprise user interface elements. In some examples, a user interface element can comprise a text element, a graphical element, an image, an input mechanism, or the like. In some examples, a user interface element can be selectable to provide an input or other indication of an interaction with a user interface with which the user interface element is associated.

Figure 3:
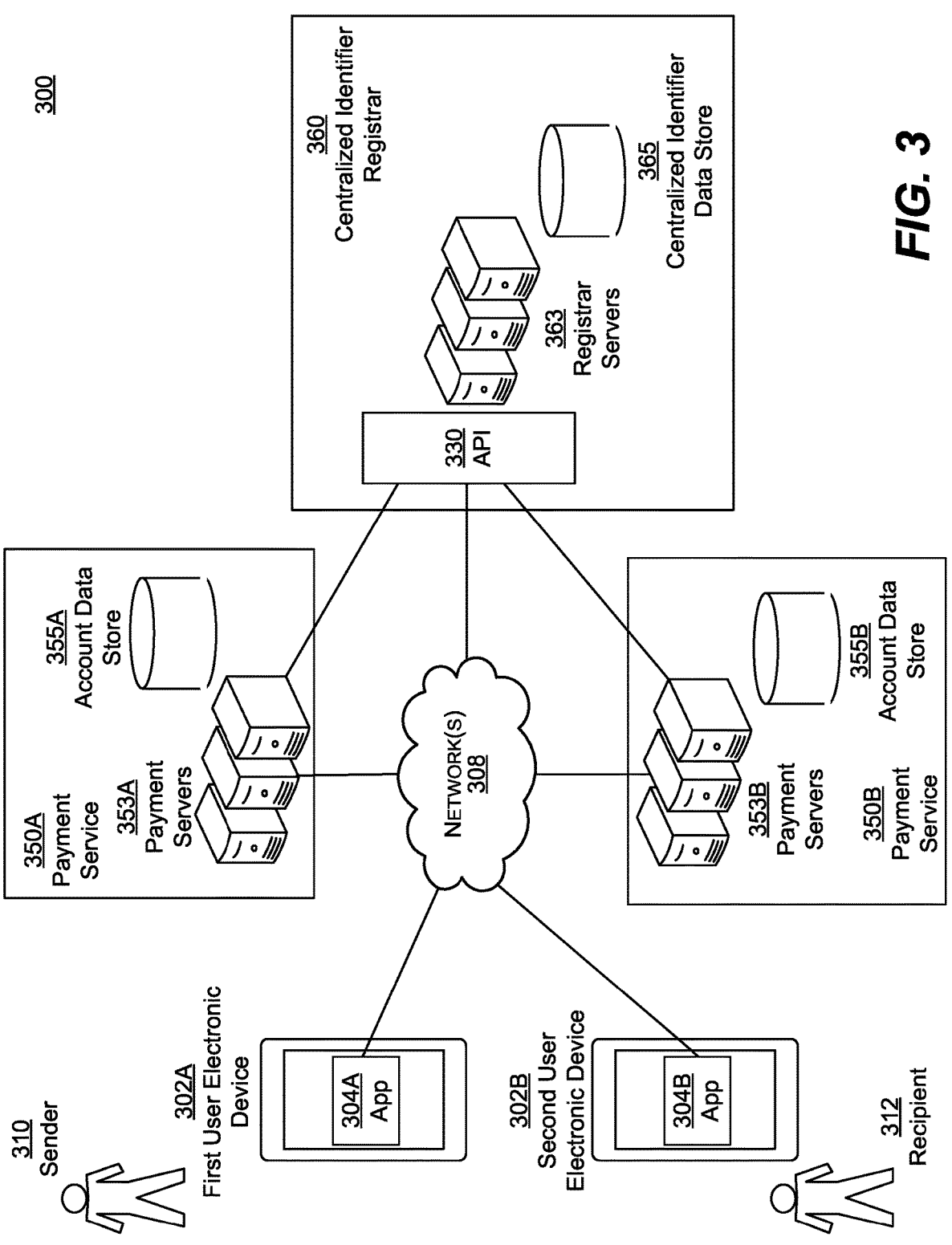
FIG. 3 is an example of a network-based environment in which some embodiments of a federated identifier technology can be implemented.

FIG. 3 illustrates an example operating environment 300 that uses federated identifiers via a centralized federated identifier system. In the centralized operating environment 300, a single entity (or a selected limited number of entities sharing information) is responsible as the source of truth regarding which federated identifiers are registered and to which user. In the operating environment 300, payment services 350A and 350B are each affiliated with a centralized identifier registrar 360, such that each of the payment services 350A and 350B are constituent services. The centralized identifier registrar 360 represents a centralized authority that provides control and decision making for constituent services. As described above, each of the constituent services can utilize the centralized identifier registrar 360 but can retain its own authority in its domain. In some examples, the constituent services can be first-party or third-party services.

For illustration purposes, two payment services 350A and 350B are illustrated. Additional services, payment or otherwise, can be added to the operating environment 300 without departing from the embodiments of this disclosure. In some examples, the payment service 350A and 350B are associated with a same, first-party service provider. In some examples, the payment service 350A and 350B are associated with different, third-party service providers. As shown, each payment service includes one or more payment servers and account data stores. Payment service 350A includes payment servers 353A and an account data store 355A. Payment service 350B includes payment servers 353B and an account data store 355B. The account data stores 355A and 355B are used to securely store information, such as user identifying information for a user associated with a federated identifier, financial account information for a user account associated with the federated identifier, identifying information for a payment service affiliated with the federated identifier, and, as described herein, a token provided by the payment service affiliated with the federated identifier, etc. The user identifying information can include, for example, an email address for the user, a phone number for the user, a username for the user associated with a social media website or service, a personal website or uniform resource locator associated with the user, or other similar information. The user identifying information can be used by the payment service 350A to verify the recipient 312 or to allow the sender 310 to verify the identity of the recipient 312. For example, the payment service 350A can confirm that the user identifying information associated with the federated identifier is associated with a history of transactions of the sender 310 prior to processing the payment. As another example, the payment service 350A can display the user identifying information to the sender 310 and allow the sender 310 to verify that the user identifying information corresponds with expected information. The payment service 350B affiliated with the federated identifier can include the payment service that first requested the federated identifier or registered the federated identifier (e.g., on behalf of the recipient 312) or the payment service selected by the recipient 312 associated with the federated identifier to process payments of their behalf.

The account data stores 355A and 355B can be configured to quickly and efficiently retrieve relevant user information when provided with a query. For example, when queried with a federated identifier the account data store 355A can access user records stored in a user account associated therewith. The payment servers 353A and 353B can send requests to and receive requests from user electronic devices or mobile applications executing thereon (e.g., via the network 308 or via direct connections) and, as described herein, the centralized identifier registrar 360. Additionally, the payment servers 353A and 353B process transactions initiated, for example, at the request of the user electronic devices or mobile applications. Example actions that can be performed by the payment servers 353A and 353B are described herein, for example, with respect to FIG. 9. Actions attributed to the payment services 350A and 350B can be performed by the payment servers 353A and 353B.

The centralized identifier registrar 360 can, in particular embodiments, be an independent entity, not directly affiliated with any other payment service. Alternatively, the centralized identifier registrar 360 can be operated by one of the payment services (e.g., payment service 350A). Trust, from users and other payment services, in the federated system can be improved when the registrar is maintained or sponsored by another trusted payment service that also relies on the accuracy and fairness of the registrar.

The centralized identifier registrar 360 can include one or more registrar servers 363 and a centralized identifier data store 365. The registrar servers 363, like the payment servers 353A and 353B are configured to receive and respond to requests from the payment servers 353A and 353B (e.g., via one or more networks 308). The centralized identifier data store 365 can comprise a data store that includes mappings of federated identifiers, as described herein, to information provided by a payment server 350A or 350B. In particular embodiments, the centralized identifier registrar 360 includes an application programming interface ("API") 330 to expose the functions of the centralized identifier registrar 360 to the payment services 350A and 350B through network(s) 308 or, optionally, a direct connection. By providing access to features through the API 330, which can be accessed by constituent services, the centralized federated identifier system is broadly compatible with constituent services through minimal additional efforts to integrate with the federated identifier system. Moreover, the federated identifier system is scalable to include additional services and users. Actions attributed to the centralized identifier registrar 360 can be performed by the registrar servers 363.

In one implementation, the operating environment 300 includes multiple user electronic devices, including the first user electronic device 302A and the second user electronic device 302B. Each of the user electronic devices can include an instance of a mobile application 304, such as mobile application 304A and 304B executing on the respective user electronic device. In particular embodiments, each mobile application is configured to communicate with a payment service (e.g., payment service 350A) through one or more networks 308. Using mobile application 304A or 304B, the user of a user electronic device (e.g., sender 310 for the first user electronic device 302A and recipient 312 for the second user electronic device 302B) can perform functions supported by the payment services. By way of example only, such services can include registering for a new account, updating financial information associated with the user, initiating a transfer to another user or group of users, requesting a transfer (e.g., of funds (e.g., cash, fiat currency), securities (e.g., stocks, bonds, options), gift cards, cryptocurrency, etc.) from another user or group of users, purchasing security assets or cryptocurrencies, managing cash flow, transacting with merchants, etc. In one example, the sender 310 registers a unique identifier with the payment service 350A to associate the unique identifier with sender 310's user account. Such registration can enable the sender 310 to use the unique identifier as a payment proxy in association with the payment service 350A. The sender 310 then interacts with the mobile application 304A executing on the first user electronic device 302A to request transfer of money or stocks to the recipient 312. The recipient 312 can be associated with its own unique identifier that the recipient 312 previously registered with the payment service 350A. In an example, if the sender 310's unique identifier or the recipient 312's unique identifier are also registered with the centralized identifier registrar 360, both unique identifiers can be "federated identifiers," which can be useable in association with transactions facilitated by the payment service 350A or the payment service 350B.

In particular embodiments, as further depicted by FIG. 3, the first user electronic device 302A and the second user electronic device 302B may be configured to exchange data with (e.g., be "communicatively coupled to") the payment services 350A and 350B (e.g., through the payment servers 353A and 353B) via one or more network(s) 308. In particular embodiments, the one or more network(s) 308 may include, for example, any of various wireless communications networks (e.g., WLAN, WAN, PAN, cellular, WMN, WiMAX, GAN, 6LowPAN, and so forth) that may be suitable for communicatively coupling the first user electronic device 302A and the second user electronic device 302B to the payment services 350A. Similar network(s) 308 can communicatively couple the payment servers 353A and 353B to each other and to the registrar services 363.

In particular embodiments, the payment services 350A and 350B and centralized identifier registrar 360 may include, for example, a cloud-based computing architecture suitable for hosting and servicing respective mobile applications 304A and 304B executing on the first user electronic device 302A and the second user electronic device 302B. The mobile applications 304A and 304B can include, by way of example and not limitation, a mobile payment application, an investment application, a banking application, a shopping application, a digital wallet application, an application for accessing multiple services, and other similar applications. For example, in particular embodiments, the payment services 350A and 350B and centralized identifier registrar 360 may include a Platform as a Service (PaaS) architecture, a Software as a Service (SaaS) architecture, and an Infrastructure as a Service (IaaS), Data as a Service (DaaS), Compute as a Service (CaaS), or other similar cloud-based computing architecture (e.g., "X" as a Service (XaaS)). In particular embodiments, as further depicted by FIG. 3, the payment services 350A and 350B and centralized identifier registrar 360 may include payment servers 353A, 353B and 363 and one or more data stores 355A, 355B, and 365.

For example, in particular embodiments, the one or more payment servers 353A, 353B and 363 may include one or more general purpose processors, graphic processing units (GPUs), application-specific integrated circuits (ASICs), systems-on-chip (SoCs), microcontrollers, a field-programmable gate arrays (FPGAs), central processing unit (CPUs), application processor (APs), visual processing units (VPUs), neural processing units (NPUs), neural decision processors (NDPs), or any other processing device(s) that may be suitable for providing processing or computing support for the respective mobile application 304A executing on the first user electronic device 302A. Similarly, the data stores 355A, 355B, and 365 may include, for example, one or more internal data stores that may be utilized to store information (e.g., user transaction history data, user purchase history data, user attribute data, user credit history data, user investment profile data, user investment data, user contextual data, user interaction data, user preference data, and so forth) associated with the one or more users, such as the sender 310 or the recipient 312.

Example functions of the centralized identifier registrar 360, that the centralized identifier registrar 360 can make available through the API 330 can include creating or registering new federated identifiers, retrieving mapped information associated with a registered federated identifier in response to a request, modifying the information mapped to a federated identifier in response to a verified request, pre-emptively confirming whether a requested federated identifier is already registered, pre-registering or batch registering federated identifiers (e.g., when a new payment service joins the operating environment 300), recommending new or replacement federated identifiers for use if a requested federated identifier is already registered, monitoring a stream of messages, requests, or other related information for use of a federated identifier and many others. Retrieving mapped information associated with a registered federated identifier can include receiving the federated identifier in a request, querying the centralized identifier data store 365 to access a user account associated with the federated identifier, and providing the information associated with the user account in response to the request. Modifying the information mapped to a federated identifier in the centralized identifier data store 365 can include, for example, modifying the personal information or financial information associated with the federated identifier, modifying the token mapped to the federated identifier, changing a "host" payment service associated with the federated identifier (e.g., in response to a user moving their payment account to a new service and wishing to use that service for transfers), and merging records of federated identifiers (e.g., in response to a user having multiple accounts with multiple payment services, and wishing to link the accounts).

Additionally or alternatively, through the API 330, the centralized identifier registrar 360 can monitor communications for the use of a federated identifier to determine an intent to initiate a transaction using the federated identifier as a payment proxy. For example, the centralized identifier registrar 360 can be communicatively coupled with a web-server to monitor public conversations on forums, social media websites, or other online services including constituent services of the federated identifier system to detect the use of a federated identifier. As another example, the centralized identifier registrar 360 can monitor messages sent and received on a first user electronic device 302A (e.g., through an API established between a messaging application executing on the first user electronic device 302A and a mobile application associated with a constituent service of the federated identifier system for the use of a federated identifier). The centralized identifier registrar 360, or a mobile application 304A executing on the first user electronic device 302A and associated with the centralized identifier registrar 360, can parse the messages sent and received on the first user electronic device 302A for a syntax corresponding to a federated identifier, and process the message to identify an intent of a user that used the federated identifier in a message using, for example, the techniques described herein.

As discussed, the centralized identifier registrar 360 can respond to requests to hold or pre-emptively confirm whether a requested unique identifier is already registered to another user on another payment service. For example, a payment service 350A can receive a preliminary request from a user (e.g., sender 310), through a mobile application 304A executing on a first user electronic device 302A indicating that the user would like to register a particular unique identifier. Before the user enters their account information, the payment service 350A can cause a payment server 353A to initiate a query to the centralized identifier registrar 360 through the provided API 330 to determine if the requested unique identifier is in fact available for use. A "collision" occurs where the requested unique identifier is not available for use because it has already been registered, for example by another payment service 350B. By pre-emptively determining whether a collision will or is likely to occur, the payment service 350A and centralized identifier registrar 360 can more efficiently use available resources and avoid unnecessarily using resources to collect and transmit user registration information that would otherwise not be used to register a unique identifier because the request to register the unique identifier would be rejected as the unique identifier is already registered. Additionally, detecting collisions before the user provides a complete record of information to register a unique identifier efficiently avoids the creation of duplicate unique identifiers for users across the operating environment 300 that uses federated identifiers. As described herein, avoiding duplicate user identifiers helps facilitate transactions and interactions of users across various payment services because the users can be assured that they have identified the correct intended recipient.

Additionally, the centralized identifier registrar 360 can assist with the registration by recommending similar or related unique identifiers to the requested, but already registered, unique identifier. Because the centralized identifier data store 365 is the ultimate source of truth regarding the availability of requested unique identifiers, the centralized identifier registrar 360 can meaningfully suggest a unique identifier that is available for claiming by the payment service 350A on behalf of the user, whether or not the user requests one to be created across all platforms. Additionally, when making recommendations, the centralized identifier registrar 360 considers the availability of the unique identifier on other payment services (e.g., payment service 350B) where the unique identifiers of users of the other payment services are also registered as federated identifiers in the centralized identifier data store 365. The recommendations can be based on, for example, look-ahead or type-ahead text prediction, a sequential or ordered recommendation system, or other text recommendation engines.

Moreover, the centralized identifier registrar 360 can determine similarity between a requested unique identifier and one or more suggested unique identifiers based on one or more similarity-determining functions. In particular embodiments, the centralized identifier registrar 360 can use a semantic understanding algorithm, such as natural language processing, to evaluate the meaning of words used in the requested unique identifier and generate unique identifiers with similar semantic meaning. For example, if a user attempted to register the unique identifier "Bookworm1982" and the centralized identifier registrar 360 determined that the unique identifier is unavailable, the centralized identifier registrar 360 can parse the unique identifier to determine key terms, such as "book," "worm," and "bookworm." The centralized identifier registrar 360 can use a semantic understanding algorithm based on the key terms to determine that the user is a fan of reading, based on, for example, an understanding of the term "bookworm" for someone who likes to read. The centralized identifier registrar 360 can generate semantically similar unique identifiers such as "BookLover22" and "RapidReader" to be presented the user as suggested replacements.

Additionally or alternatively, the centralized identifier registrar 360 can use one or more machine learning models trained to categorize unique identifiers and otherwise identify similarities across unique identifiers, such as frequency of co-usage or replacement-level usage of words in a language corpus (e.g., the frequency of usage of "cash" as a replacement for the word "dollar" in modern English usage). A word embedding model can, for example, generate an embedding corresponding to a unique identifier and to a set of one or more pre-generated unique identifiers, where the embedding maps words to an embedding space such that distance in the embedding space is inversely related to similarity. After determining that a requested unique identifier is unavailable, the word embedding model can generate an embedding for the requested unique identifier, identify a set of one or more unique identifiers corresponding to embeddings near the embedding for the requested unique identifier in the embedding space, and provide the set of unique identifiers as recommendations. After generating the similar unique identifiers, the centralized identifier registrar 360 can query the centralized identifier data store 365 using the similar unique identifiers to confirm that the similar unique identifiers are available.

By proactively recommending a unique identifier for registration upon detecting a collision, the centralized identifier registrar 360 can reduce needless use of computational resources and network resources in repeated back-and-forth exchanges between the payment servers 353A and the registrar servers 363 while a user attempts to identify an available unique identifier. The centralized identifier registrar 360 can additionally reduce end user frustration at being required to repeatedly guess at a unique identifier that is available.

When a collision, or prospective collision is detected between multiple requested registrations simultaneously or near simultaneously, it can be useful to establish an equitable system for determining which registration request should be accepted and which requests should be provided instead with recommendations for replacement unique identifiers. The multiple payment services using the federated identifier technology can establish and otherwise agree to a collision resolution protocol. The collision resolution protocol can provide a fair and predictable manner of resolving conflicts such that users are not disadvantaged by virtue of their use of one or more of the multiple payment services. The collision resolution protocol can be processed in part by the centralized identifier registrar 360 and supported by the payment services 350A and 350B. In a first example collision resolution protocol, each of the multiple payment services can operate on a synchronized clock. Requests to register a unique identifier are associated with a timestamp by the payment service 350A or 350B issuing the request. When different payment services attempt to register a same unique identifier, the registration request that is associated with an earlier timestamp is granted by the centralized identifier registrar 360. Another example collision resolution protocol uses a standardized mathematical resolution tool. When the centralized identifier registrar 360 detects a collision between two registration requests, the centralized identifier registrar 360 (or the payment services 350A and 350B) generate a mathematical value using an immutable value associated with each registration. The mathematical value can be a hash value generated by a predetermined hash function. The centralized identifier registrar 360 can compare the two mathematical values and grant the registration request associated with a mathematical value satisfying some predetermined characteristic or test. Example characteristics or tests can include the greatest value, the least value, the greatest or least absolute value, the result of another mathematical function applied to the mathematical value (e.g., a modulo function), or the like. In another example collision resolution protocol, a turn-based system can be used where priority levels are assigned among the multiple payment services and priority levels are adjusted when a payment service relies on a priority level to resolve a collision.

In particular embodiments, the centralized identifier registrar 360 can affirmatively register a user for one or more of the constituent payment services (or other types of services, as discussed herein) that use federated identifiers. Upon receiving confirmation from the user to register a unique identifier on their behalf, the centralized identifier registrar 360 can provide information supplied by the user to register for a first payment service 350A to a second payment service 350B so that the second payment service 350B can establish an account on the user's behalf. The information can include identifying information for the user and financial account information. The centralized identifier registrar 360 can further send the information to other types of constituent services that use federated identifiers. In some examples, the constituent services can be first-party or third-party services. For example, the centralized identifier registrar 360 can send contact information for a user to a social media service or video sharing service to automatically register the user for those services. This enables the user to use the federated identifier across multiple types of services automatically. In particular embodiments, the centralized identifier registrar 360 can receive a notice from a constituent service indicating the provided information has already be used to register an account with the constituent service, but under a different unique identifier. In response to the user's approval, the centralized identifier registrar 360 can cause the registration of a new account using the unique identifier, change the unique identifier from the previously-registered unique identifier to the new requested unique identifier, or request the constituent service to merge the account information of the previous account with the new unique identifier. Additionally or alternatively, the centralized identifier registrar 360 can map the new unique identifier to the unique identifier previously registered by the user on the constituent service in the centralized identifier data store 365. Then, when the centralized identifier registrar 360 receives a request involving the new unique identifier and the constituent service, the centralized identifier registrar 360 can identify the previously-registered unique identifier by querying the centralized identifier data store 365 using the new unique identifier. The centralized identifier registrar 360 can route the request to the constituent service using the previously-registered unique identifier.

By registering accounts on behalf of the user with the constituent services that use federated identifiers, the centralized identifier registrar 360 can consolidate steps required to register a user for a constituent service. This consolidation can facilitate batch processing of these requests at off-peak hours to more efficiently utilize computational resources and manage network traffic. Additionally, the consolidation can improve uniformity of user information stored by the constituent services and reduce errors associated with data entry or translation.

When a new payment service joins the operating environment 300, the existing "local" namespace occupied by accounts or unique identifiers on that payment service can be merged with the claimed namespace already occupied by other constituent services that use federated identifiers (as reflected in the centralized identifier data store 365). A variety of mechanisms can be developed to determine the availability of unique identifiers used by the new payment service in the claimed namespace and resolve potential conflicts, which are especially likely when the same syntax is used by the new payment service as the centralized identifier registrar 360. As an example, the unique identifiers from the new payment service can be appended with symbol or set of characters (e.g., at the beginning or end of the identifier) corresponding to the payment service. For example, a unique identifier "$alice" from the new payment service CashTrans can be modified into a federated identifier by appending "CT" or "CashTrans" to the beginning or end of the identifier. To preserve the possibility for sensibly appending usernames, the centralized identifier data store 365 can enforce rules to prevent a user from registering a federated identifier that is likely to conflict with an extant payment service that is not yet participating in the operating environment 300. As another example, payment proxies used by the new payment service can each be appended with a randomized alphanumeric number that is confirmed (e.g., via a collision check performed by the centralized identifier registrar 360) not to have a collision in order to generate federated identifiers. The users of the new payment service can then be encouraged to manually update their federated identifier to something custom tailored.

In particular embodiments, when registering a unique identifier with the centralized identifier registrar 360, the payment service 350A can send information to the centralized identifier registrar 360 to be stored in the centralized identifier data store 365. As an example, the payment servers 353A can transmit the user identifying information and user financial account information corresponding to the user and stored in the account data store 355A to the centralized identifier registrar 360. The centralized identifier registrar 360 can store this information with the newly registered unique identifier in the centralized identifier data store 365. As such, the newly registered unique identifier can be federated, such that it is usable across multiple constituent payment services. Upon receiving a request to initiate a payment including the federated identifier from another payment service 350B, the centralized identifier registrar 360 can retrieve the financial account information and other related information, and send the retrieved information to the payment service 350B which can process the requested payment, for example, by transacting with the payment servers 353A of the payment service 350A. The financial information can be encrypted or otherwise secured before and during transmission to protect the sensitive information of the recipient user.

As another example, the payment service 350B can provide tokens to the centralized identifier registrar 360 to securely store sensitive information with the centralized identifier registrar 360 and further manage the risk of transmitting user identifying information on the networks 308. When registering a new unique identifier for a recipient 312 with the centralized identifier registrar 360, the payment servers 353B can generate and send a token that uniquely identifies the recipient 312 on the payment service 350B. In some examples, the token can be a cryptographic token. The centralized identifier registrar 360 can cause the token to be mapped to the new federated identifier or otherwise stored in the centralized identifier data store 365 in association with the identifier for the recipient 312, along with an identification or other method of contacting the payment service 350B. The payment service 350B can map financial information (e.g., the financial information of the recipient 312) to the token in an account data store 355B maintained by the payment service 350B. The payment service 350B does not provide the associated financial information of the user account of the recipient 312 to the centralized identifier registrar 360. The token can also be cryptographically secured with a private key known to the payment service 350B. A corresponding public key can be provided to another payment service 350A or to the centralized identifier registrar 360.

The centralized identifier registrar 360 can access the token when another payment service 350A requests a payment or payment information. The centralized identifier registrar 360 can provide the token to the payment service 350A so that the payment service 350A can process the payment with the payment service 350B. For example, the centralized identifier data store 365 can include an endpoint or address for the payment servers 353B. When the centralized identifier registrar 360 receives a request to initiate a payment to the recipient 312 using a federated identifier as a payment proxy associated with the recipient 312 from another payment service 350A, the centralized identifier registrar 360 can retrieve the token and method of contacting the payment service 350B from the centralized identifier data store 365 and provide them to the payment service 350A. After receiving the token, the payment service 350A provides the token to the payment service 350B along with information about the transaction. Payment service 350A and payment service 350B complete the transaction based on a negotiation of financial information. The payment service 350B can identify the user account of the recipient 312 and verify the transaction using the transaction. Payment may also be completed through an agreed upon third-payment service or other processor.

In some examples, individual payment services can operate with different currencies (e.g., dollar ($), euro (€), pound (£), rupee (₹), yuan (¥), etc.) or asset types (e.g., fiat currency, investments, cryptocurrency, etc.). In some examples, at least one of the payment service 350A, the payment service 350B, or a centralized exchange service can determine a currency associated with the payment service from which a payment originated (e.g., sender payment service) and a currency associated with the payment service to which the payment is received (e.g., recipient payment service) and, if such currencies are different, can determine exchange rates between the sender and receiver currency. Such exchange rates can be used to facilitate payments between multiple payment services that operate with different currencies. In some examples, the exchange rates can be based at least in part on public exchange rates or models, in some examples that are trained by machine learning mechanisms using data associated with the payment service(s). In at least one example, in association with a payment, the payment service 350A, the payment service 350B, or the centralized exchange can perform a conversion between currencies based at least in part on the determined exchange rates.

In particular embodiments, in addition to facilitating and enforcing federated identifiers among a collection of payment services, the techniques herein directed to federated identifiers can be applied to a variety of services where it would be advantageous to ensure that a single user account is associated with a single unique identifier. In some examples, the various participating services can be first-party or third-party services. As an example, different types of services can interface with the centralized identifier registrar 360 or can maintain a local instance of an identifier ledger (as described herein with respect to the decentralized federated identifier system). When a user submits a request to register a new unique identifier to a service, the service can verify the availability of the unique identifier using techniques similar to those described herein. The information mapped to a federated identifier and stored in the centralized identifier data store 365 or the local instance of the identifier ledgers can include information to uniquely tie the federated identifier across the constituent services of the federated system to a single user account. Services that can integrate the techniques described herein to benefit from federated identifiers for users include social media services, video sharing services, image sharing services, livestreaming services, and other content generation services (e.g., blogs, newsletters, etc.), and other services where a user's identity can be strongly associated with their user identifier.

Using the techniques described herein, a user can ensure that their various online services use the same unique identifier. Other users wishing to interact with the user, e.g., fans, follows, family, etc., can be assured that when they interact with the user's unique identifier on a service, they are interacting with the same user account. For example, a user Alice French can be a prominent user of a first social media service who occasionally posts on a second social media service, shares videos through a video sharing service, and receives payments through a payment service. Using the techniques described herein, Alice French has registered the federated identifier $AliceF1 though the first social media service. Because the first social media service uses federated identifiers, the identifier $AliceF1 has also been registered for the second social media service, video sharing service, and payment service. Then, when another user Bob Brown looks for the user $AliceF1 on the second social media service or sends a payment to $AliceF1 using the payment service, Bob can be assured that he is interacting with or sending payment to the correct user account.

Figure 4:
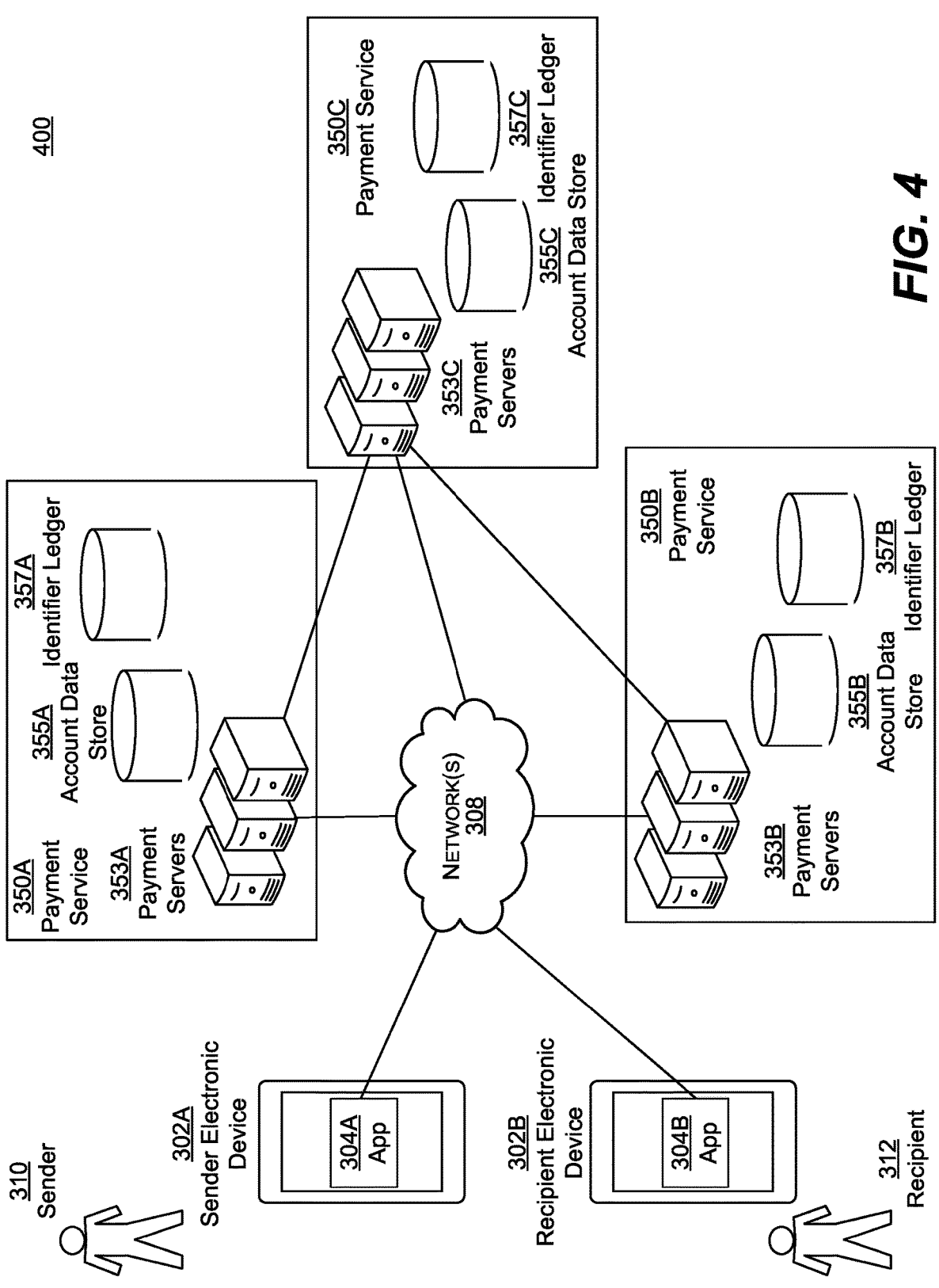
FIG. 4 is an example of a network-based environment in which some embodiments of a federated identifier technology can be implemented.

FIG. 4 illustrates an example embodiment of an operating environment 400 that utilizes federated identifiers via a decentralized federated identifier system. The operating environment 400 comprises payment services 350A, 350B, and 350C, wherein techniques described herein are decentralized. In some examples, the various participating services can be first-party or third-party services. In the operating environment 400, the constituent services maintain local instances of an identifier ledger. Updates made by each constituent service (e.g., each payment service 350A, 350B, and 350C) can be propagated to other services as updates to the identifier leger which are applied by the other services. The decentralized federated identifier system can instill confidence that the information is accurate, allow users to verify that federated identifiers are accurate, and confirm that no single constituent service is able to prefer its own customers or dominate the federated identifier space (e.g., by registering all high-value federated identifiers at once)

The elements of the operating environment 400 illustrated as similar to the elements of the operating environment 300 function similarly and therefore an additional full description will not be provided in the interest of brevity. In addition to the payment services 350A and 350B, the operating environment 400 further includes a third payment service 350C, which has its own payment servers 353 and account data store 355C. In place of a centralized identifier registrar 360, each payment service 350A, 350B, and 350C includes an instance of an identifier ledger 357A, 357B, and 357B, respectively, to manage and maintain a public or semi-public record of the registered federated identifiers. That is, each of the payment services 350A, 350B, and 350C are constituent services of a federated identifier system, wherein the control and decision making is decentralized. Each of the constituent services can respond to the control and decision making associated with the federated identifier system but can retain its own authority in its domain.

Each instance of the identifier ledger 357A, 357B, and 357C can include a mapping of each federated identifier with information to facilitate a payment transfer using the federated identifier as a payment proxy. For example, the federated identifier can be mapped with identifying information for the payment service that registered the federated identifier (e.g., on behalf of a user), a current payment service associated with the federated identifier (e.g., in the event that the user switches their primary payment facilitator from the registering payment service to a different payment service), a mechanism for contacting the current associated payment service, a token for referencing the federated identifier, financial account information and user identifying information for the associated user, and other similarly relevant information.

To register a new unique identifier with the federated identifier system, the payment servers 353A for an individual payment service 350A query the local instance of the identifier ledger 357A with the requested unique identifier to determine the availability of the requested identifier, for example, if the unique identifier has already been registered or reserved, as discussed herein. If the unique identifier has not been registered (e.g., and is therefore available), then the payment service 353A updates the local instance of the identifier ledger 357A to include the unique identifier and information mapped to the unique identifier to reference the user. This update step can occur relatively simultaneously with any updates to the local account data store 355A which can store additional information other than the information mapped to the unique identifier in the account data store 355A because there is a lower risk associated with transferring information. The information mapped to the unique identifier that is stored in the local instance of the identifier ledger 357A can include a set of information to identify the user or the registering payment service (e.g., payment service 357A) that has been set by standards governing the decentralized federated identifier system or has been agreed upon by the participating payment services to ensure uniformity of available information.

After updating the instance of the identifier ledger 357A, the payment servers 353A can propagate the updates to other payment services 350B and 350C so that those payment services can make corresponding updates to their respective instances of the identifier ledger 357B and 357C. Through this propagation, the unique identifier is confirmed as unique among the payment services 350A, 350B, and 350C and can therefore act as a federated identifier for the user account. As an example, propagating the updates to other payment services 350B and 350C can include determining the set of changes made to the instance of the identifier ledger 357A since the last update sent by the payment servers 357A and sending a record of the set of changes or instructions to perform modifications to other instances of the identifier ledgers (e.g., identifier ledgers 357B and 357C) that can be executed by the respective payment servers 357B and 357C. The payment servers 353A can receive updates from the other payment servers 353B and 353C including acknowledgement of the updates to the identifier ledger 357A propagated by the payment servers 353A. Once the update indicating registration of the federated identifier on behalf of the user is propagated, the registration can be finalized and confirmation relayed to the user. If there is a conflict in the updates, such as another payment service 350B attempting to register the same federated identifier on behalf of another user, the payment servers of the respective payment services 350A and 350B can negotiate a collision resolution protocol.

The collision resolution protocol can be designed to fairly assign the federated identifier to one and only one user account. In particular embodiments, the collision resolution protocol can be based on "first come, first served" policy. Each payment service 350A, 350B, and 350C can operate on a synchronized clock. Each payment service 350A, 350B, and 350C, when registering a federated identifier to a respective local instance of the identifier ledger 357A, 357B, and 357C, can associate the registration with a precise timestamp before propagation. During propagation, the record with the earliest timestamp is determined to be the first registrant and therefore the associated user will be determined to be the true owner. This approach may advantage payment services 350A which provide fast updates and efficient processing of user requests, which has the added benefit of encouraging the payment services 350A, 350B, and 350C to use computationally efficient algorithms for handling user requests and state of the art payment servers and data stores to minimize the risks of having registrations of federated identifiers rejected because other payment services registered identifiers more quickly. In particular embodiments, collision resolution can be handled on a standardized mathematical basis. As an example, each stakeholder to a collision (e.g., each payment service that has attempted to register an identifier) can generate a hash value using an agreed-upon mechanism based on, for example, some immutable value of the transaction such as the user electronic device identifier or a network identifier used by the stakeholder. The payment service that generates a maximum or a minimum hash value can be assigned a higher priority level such that the user registering with that payment service is permitted to proceed to register the identifier. In particular embodiments, the collision resolution protocol can be based on a seniority basis, where each payment service 350A, 350B, and 350C are assigned a priority level when electing to participate in the operating environment 400. The priority level may be a factor in resolving which identifier registration by which payment service is maintained (e.g., is permitted to be finalized). In particular embodiments, the collision resolution protocol can be based on a turn-based system, where the priority levels are adjusted over time. For example, once a payment service benefits from a top priority ranking, its priority level can be adjusted downwards according to an agreed-upon protocol. As another example, the priority level can be based in part on the activity of the payment service in registering new identifiers (thereby expanding the reach of the decentralized federated identifier system), processing payments through the system, or providing processing support necessary to maintain the distributed identifier ledgers. As an example, the distributed identifier ledgers 357A, 357B, and 357C can be based on a public or semi-public blockchain system based around an immutable ledger, where the payment servers 353A, 353B, and 353C (or other related components) contribute work to the blockchain system to assist with propagating the updates to the identifier ledger and validating new registrations or other changes to the ledgers.

When a payment service 350A receives a request to initiate a transfer using a federated identifier as a payment proxy, such as through monitoring messages exchanged by users or receiving a direct request to initiate a payment based on the federated identifier, the payment service 350A first queries its local instance of the identifier ledger 357A. If the federated identifier is located in the instance of the identifier ledger 357A, the payment servers 353A retrieve that information and act accordingly. The payment servers 353A may proceed without waiting for confirmation from a third-party server to proceed (as in the centralized embodiment described above with reference to FIG. 3). If the federated identifier is not found in the local instance of the identifier ledger 357A, then the payment servers 353A can indicate that an account is not registered to the provided federated identifier. Additionally or alternatively, the payment servers 353A can query another payment service 350B or 350C to request confirmation that the federated identifier is not registered. This confirmation can be necessary in cases where the payment service 350A has not received updates from one or more of the payment services in some time. Additionally or alternatively, a similar confirmation can be performed when the instance of the identifier ledger 357A indicates that the federated identifier is registered.

The federated identifier enables previously unavailable mechanisms for initiating a transfer between users. Rather than requiring specification of, e.g., banking information or payment card information, a user can provide the federated identifier as a payment proxy in association with a requested transfer. For example, a user can provide a federated identifier in a messaging application, a forum context, a customized payment transfer webpage, or as part of checkout process with a merchant. The sender can trigger a money transfer through the use of the syntax corresponding to the federated identifier in any communication message with an amount of money to transfer. A payment server, upon receiving indication of the sender's desire for money transfer (i.e., as indicated by the input(s) having the syntax), initiates the money transfer on behalf of the sender (i.e., executes, or causes to be executed, one or more operations to transfer funds between the appropriate accounts). The transfer can be initiated irrespective of the financial institution with which the sender or the recipient is associated. For example, cash or other assets (e.g., securities, cryptocurrency, etc.) can be transferred even though the sender may have a financial account associated with Bank A while the recipient may have a financial account associated with Bank B. Furthermore, the payment server can initiate the transfer regardless of the bank-acquirer-financial institution structure associated with the recipient. Using the federated identifier, the payment server can initiate transfer regardless of the payment service to which the user is registered. Cross-platform interoperability can be based on each payment service implementing and providing appropriate addressing information to the registering entity of federated identifiers (either the centralized identifier registrar 360 or the respective distributed identifier ledger 357A, 357B, or 357C). Advantageously, once the federated identifier is provided, the payment server executes, or causes to be executed, the transfer in such a way that neither the sender nor the recipient is privy to sensitive information about each other.

The federated identifier described herein further enables additional new mechanisms interacting with a variety of online services. For example, a content creator can provide a federated identifier they have registered as a payment proxy to viewers of their content through any service. Users wishing to compensate the content creator can interact with the federated identifier or otherwise use the federated identifier to initiate the transfer. As an example, a content creator using a photo- or video-sharing service can append their federated identifier to content posted on the service. Other users can interact with or use the federated identifier to quickly and easily initiate a transfer to the content creator (e.g., as a payment proxy). When a payment server (e.g., payment server 353A) receives a request involving the federated identifier of the content creator, the payment server 353A can first determine if financial account information (e.g., of the content creator) associated with the received federated identifier is located in the local account data store 355A of the payment service 350A. If the financial account information is present, which may occur when the content creator and the user use the same payment service 350A, the payment server 353A can initiate the requested transfer. If financial account information associated with the received federated identifier is not present, which may occur when the content creator and user use different payment services, then the payment server 353A can evaluate the federated identifier by initiating a request to the centralized identifier registrar 360 via the API 330 (in the centralized embodiment) or searching the local instance of the identifier ledger 357A (in the decentralized embodiment) to identify information to initiate a transaction, such as the identification of the payment service used by the content creator. The payment service can contact the payment service used by the content creator to complete the payment. In particular embodiments, the content creator can use and be registered with multiple payment services using the federated identifier. If the payment server 353A that has received the request involving the federated identifier of the content creator is unable to identify a primary or preferred payment service for the content creator, the payment server 353A can use contextual information associated with the request to determine which of the multiple payment services used by the content creator to use for the payment request. As an example, the payment server 353A can identify a preferred payment service of the user who has initiated the payment (e.g., by looking at a transaction history associated with the user), a most recent payment service used by the content creator or the user who initiated the payment, a most recent payment service used by the content creator or the user on particular photo- or video-sharing service, a payment service that will minimize fees to the payment service processing the payment request, the user, or the content creator, a payment service that will settle the payment most quickly or efficiently, or otherwise determined a payment service to use for the payment request. Once this payment service has been identified, the payment server 353A can proceed to process the payment as described in embodiments herein.

As another example, a website can enable micro-payments for pageviews on the website, where viewing users can pay the website or the author of the content on the website directly for each article read or other items of content reviewed. This can easily replace the traditional "paywalled" approach where a content viewer must subscribe to the website in advance, rather than on a pay-per-click-style system. The content server of the website can provide the federated identifier associated with the website or the author of the website with each article (or other content). Upon opening the website or article, the browser of the user electronic device of the viewing user can initiate a request to a payment server 353A using the federated identifier. The payment server 353A can initiate a payment to the appropriate entity (e.g., the website or the individual author) after identifying the associated financial account information using the techniques discussed herein. The federated identifier can be further used with a livestreaming service, which the content creator solicits payments via the federated identifier during their livestream. Additionally, micropayments through a federated identifier can replace traditional advertisements on a segment-level basis, enabling users to pay for access to individual segments of a livestream instead of requiring ads to view the livestream. The federated identifier system efficiently resolves payment transfer requests while giving assurance to the sending user than their payment is being directed to the intended recipient.

In some embodiments, the receiving user, such as a content creator in the example provided above, may not have registered a unique identifier provided with their content as a federated identifier. The payment service therefore may attempt to determine the payment service that the receiving user uses in order to complete the payment. In some embodiments, the payment service may use the format or syntax of the unique identifier provided by the receiving user. For example, the payment service can determine or be provided a set of syntaxes used by the constituent payment services of the federated identifier system. The payment service can parse the payment request from the user to evaluate the syntax of the unique identifier and compare the syntax of the unique identifier to the known set of unique identifiers. The payment service can identify a second payment service corresponding to the syntax and attempt to process the payment with the second payment service referencing the unique identifier. In some embodiments, the payment service can evaluate the context in which the unique identifier is provided. For example, the unique identifier may be provided with text referencing the preferred payment service of the receiving user. The unique identifier may be provided with a series of messages or other information from which the payment service can identify the correct payment service corresponding to the unique identifier of the receiving user. For the example, the payment service can receive, as part of the request from the user to initiate a payment to the receiving user, text of one or more sentences, messages, posts etc. that preceded the text including the unique identifier (e.g., as determined based on a syntax corresponding to the unique identifier). The payment service can parse the messages to identify the syntax corresponding to the identifier and identify additional contextual information in the messages. The payment service can apply one or more machine-learned models to develop an understanding of the text and in particular to identify the request for a payment to the user or account associated with the unique identifier. For example, the payment service can apply a natural language processing model trained to determine a context-based understanding of the text surrounding the unique identifier by evaluating parts of speech, identified entities, sentiment, or commands words included in the text. As another example, the payment service can apply a neural network-based model trained to process and comprehend the text based on word embeddings. In particular, the neural network-based model can be trained to generate word embeddings to organize words (and other letter combinations) according to, for example, frequency of use, relation to payment requests, or relation to payment services. As another example, the payment service can apply a statistical parsing model trained to associate meaning with words and letter combinations include in the text surrounding the identifier.

While FIGS. 3 and 4 refer to "payment services," "payment servers," a "centralized identifier registrar 360," a "centralized identifier data store 365," and the like, in additional or alternative examples, the services, servers, centralized registrar, or data stores can be associated with services other than payment services. That is, in some examples, the "centralized identifier registrar 360" can comprise a registrar for centrally managing the registration and use of any identifier used for any service associated with the registrar and the "centralized identifier data store 365" can store data associated with such identifiers. That is, as described above, techniques described herein are not limited to "payment" proxies for payment services, but instead, are applicable for one or more services, which can include payment services, social networking services, or the like.

Figure 5A:
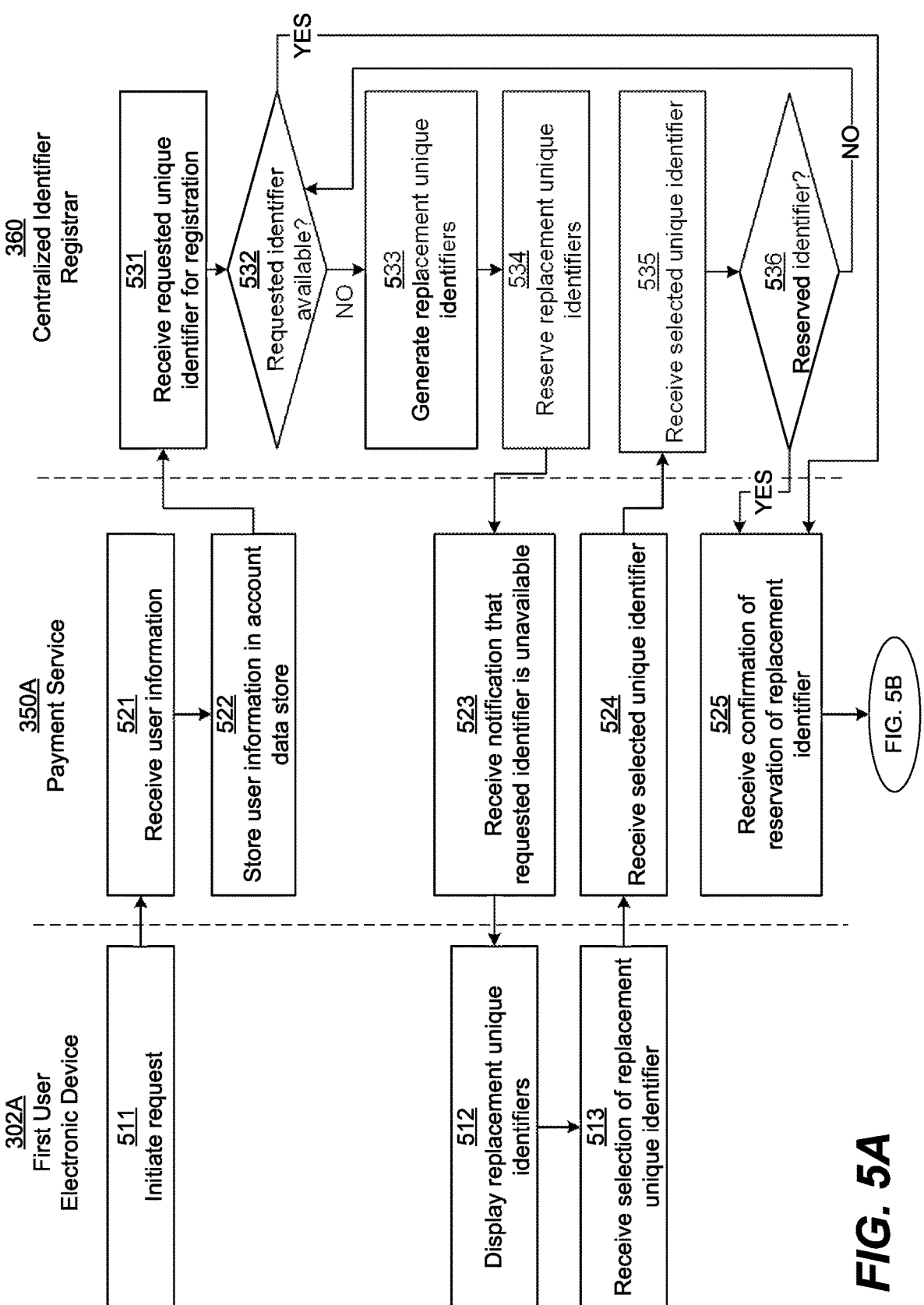
FIGS. 5A-5B are a process for registering a federated identifier according to some embodiments disclosed herein.
Figure 5B:
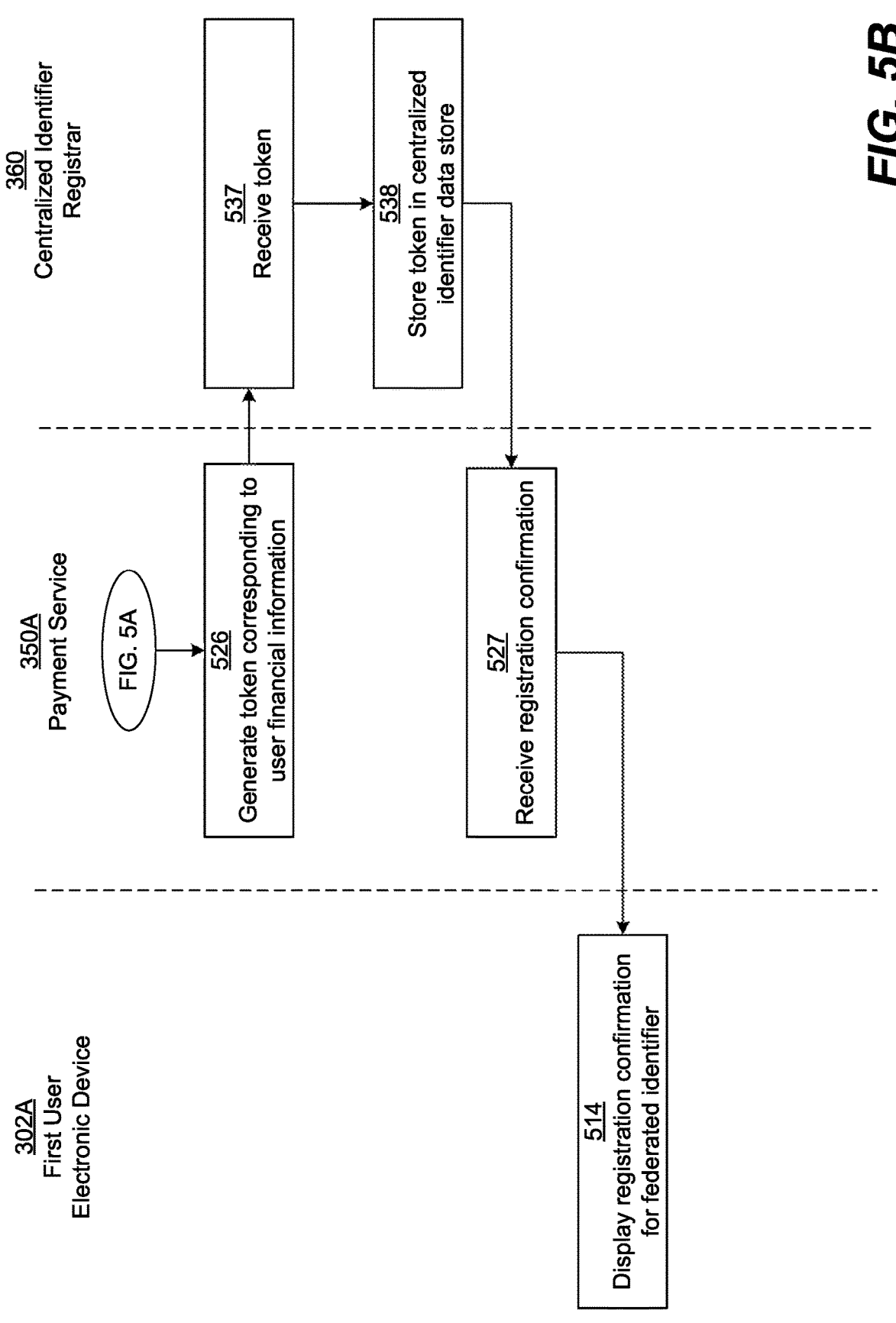

FIGS. 5A and 5B illustrates an example process for registering an identifier with a centralized federated identifier system. The process shown in FIGS. 5A-5B may be performed utilizing one or more processing devices (e.g., first user electronic device 302A and second user electronic device 302B, servers 353 and 363, mobile applications 304A and 304B) associated with the recited entities that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

At step 511, a request is initiated. For example, a first user electronic device 302A initiates the request to register a unique identifier (e.g., a "requested" unique identifier) on behalf of the user. The request to register a unique identifier can be generated by the first user electronic device 302A (e.g., through a mobile application 340A executing thereon) automatically on behalf of the user when the user is establishing an account with a payment service 350A associated with the mobile application 304A. Additionally, or alternatively, the request to register a unique identifier can be generated by the first user electronic device 302A for a user that has a preexisting account with the payment service 350A automatically (e.g., to reserve a federated identifier for the user) or at express request of the user through the mobile application 304A. The request includes the requested unique identifier which the user desires to register and associate with their financial information. The request to register the requested unique identifier can also include user identifying information and financial account information for the user if the payment service 350A has not previously stored that information. The user can enter this information at the request of the payment service 350A into a user interface of the mobile application 304A. For example, the payment service 350A can determine that it does not currently have financial information for the user within its local account data store 355A after querying the local account data store 355A with received identifying information for the user. The mobile application 304A then sends the entered information with the request.

The requested unique identifier included in the request can be specified by the user, recommended by the mobile application 304A executing on the first user electronic device 302A, recommended by the payment service 350A, or recommended by the centralized identifier registrar 360. As an example, when a user indicates an intent to register the requested unique identifier (e.g., through initiating a registration process on the mobile application 304A), the payment service 350A can send a request for recommendations for available unique identifiers to the centralized identifier 360 through the API 330. The request for available unique identifiers can include identifying information for the user, if available, or other information to customize the recommendations.

At step 521, the user information is received. For example, the payment service 350A receives user identifying information and financial information associated with the user from the mobile application 304A executing on the first user electronic device 302A. The payment service can be a first-party or a third-party service. In embodiments where the payment service 350A already has a record for the user (e.g., where the user is seeking to link an existing payment service account with a federated identifier), steps 521 and 522 can be skipped as optional once the request is received including the specified unique identifier.

At step 522, the user information is stored in an account data store. For example, the payment service 350A stores the received information in an account data store 355A. For example, the payment service 350A can generate an internal identifier associated with a user account of the user and store the received information in the account data store 355A. Such an internal identifier can be used to reference the user on an internal basis (e.g., internal to an individual payment service). That way, if the user changes their unique identifier, the payment service 350A can refrain from performing a full update. The payment service 350A sends at least the requested unique identifier to the centralized identifier registrar 360. For example, the payment service 350A can initiate a call on the API 330 provided by the centralized identifier registrar 360.

At step 531, the requested unique identifier is received. For example, the centralized identifier registrar 360 receives the requested unique identifier from the payment service 350A (e.g., via an API 330). At step 532, it is determined if the requested unique identifier is available. For example, the centralized identifier registrar 360 determines the availability of the requested unique identifier. As an example, the centralized identifier registrar 360 queries the centralized identifier data store 365 using the requested unique identifier. If the requested unique identifier is available ("Yes" path), for example if the requested unique identifier has not been registered in the centralized identifier data store 365, then the process can proceed to step 525 described below as there is no need to negotiate a replacement unique identifier. If the requested unique identifier is not available to be registered by the user, then, at step 533, replacement unique identifiers can be generated. For example, the centralized identifier registrar 360 can generate one or more replacement unique identifiers to recommend to the user. As described above, the recommended replacement unique identifiers can be determined based on similarity to the requested unique identifier but are deemed available by querying the centralized identifier data store 365 with the replacement unique identifiers. Additional details associated with generating replacement unique identifiers are described above. As noted, in some examples, the centralized identifier registrar 360 can generate or recommend unique identifiers as part of the initial registration process. In such examples, the recommended unique identifiers can be generated or recommended based at least in part on known information in real-time or near real-time as information is provided.

At step 534, replacement unique identifiers can be reserved. For example, to reduce network traffic, the centralized identifier registrar 360 can temporarily reserve the recommended replacement unique identifiers on behalf of the user. As described herein, the centralized identifier registrar 360 can indicate through records in the centralized identifier data store 365 that the reserved replacement unique identifiers should be held as unregistrable to any users besides the user who initiated the request. By making this indication in the centralized identifier data store 365, which is relied upon by all payment services that are part of the operating environment 300, the recommended replacement unique identifiers are held for the user across all constituent payment services. This is to ensure that recommended unique identifiers are available if the user decides to proceed with one of them. The reservation may last for a fixed amount of time (e.g., 5 minutes) sufficient to receive confirmation of registration from the user. The centralized identifier registrar 360 informs the payment service 350A through a notification that the requested unique identifier is unavailable. The centralized identifier registrar 360 also includes the proactively determined available replacement unique identifiers as consolation to the user.

At step 523, a notification that the requested unique identifier is unavailable is received. For example, the payment service 150A receives a notification that the requested unique identifier is unavailable. The notification can further include the set of recommended replacement unique identifiers determined by the centralized identifier registrar 360. The payment service 150A sends a similar notification to the mobile application 304A executing on the first user electronic device 302A.

At step 512, the replacement unique identifiers are displayed. For example, the mobile application 304A can cause the first user electronic device 302A to inform the user that the requested unique identifier is unavailable. The mobile application 304A can further display the one or more recommended replacement or alternative unique identifiers determined by the centralized identifier registrar 360.

At step 513, a selection of a replacement unique identifier is received. For example, the mobile application 304A executing on the first user electronic device 302A receives a user input corresponding to a selection of a replacement unique identifier. In particular embodiments, the user input can correspond to one of the recommended (replacement) unique identifiers. In particular embodiments, the user input can correspond to a new (replacement) unique identifier entered by the user. The mobile application 304A sends the selection of the replacement unique identifier to the payment service 350A. At step 524, the selected unique identifier is received from the first user electronic device 302A. For example, the payment service 350A receives the selected unique identifier from the mobile application 304A executing on the first user electronic device 102A.

At step 535, the selected unique identifier is received from the payment service 350A. For example, the centralized identifier registrar 360 receives the selected unique identifier from the payment service 350A. At step 536, it is determined whether the selected unique identifier is a reserved unique identifier (e.g., reserved at step 534). For example, the centralized identifier registrar 360 determines whether the selected unique identifier has been previously reserved (e.g., at step 534). Where the selected unique identifier has been previously reserved ("Yes" path), there is no concern for actual availability and the process advances to step 525. If the user has entered a new unique identifier to register ("No" path), then the process 360 may return to step 532 to determine that the new unique identifier is available. The process may repeat again until the centralized identifier registrar 360 is able to confirm the availability of the selected unique identifier. In particular embodiments, because replacement identifiers have already been generated for the user, step 533 can be skipped on subsequent iterations to encourage the user to select one of the generated replacement identifiers (instead of supplying their own). The centralized identifier registrar 360 can confirm that the selected unique identifier is available by querying the centralized identifier data store 365 and determining that no record corresponding to the selected unique identifier exists. Upon confirming, the centralized identifier registrar 360 sends the confirmation to the payment service 350A. At step 525, a confirmation that the selected unique identifier is reserved for the user is received. For example, the payment service 350A receives the confirmation of reservation from the centralized identifier registrar 360. In such an example, the selected unique identifier can be a "replacement" unique identifier when compared to the originally input or selected unique identifier. For the purpose of this discussion, as reserved, the selected unique identifier is referred to as the "unique identifier."

Continuing on with FIG. 5B, at step 526, a token corresponding to user financial information is generated. For example, the payment service 350A can prepare the information to map to the unique identifier by the centralized identifier registrar 360. In particular embodiments, this may include the user identifying information and information associated with the user financial account previously received and stored in an account data store 355A by the payment service 350A. In particular embodiments, the information mapped with the unique identifier can include a token generated by the payment service 350A to correspond with the financial information. As described herein, the use of the token manages the risk of transferring and storing sensitive information among multiple parties. The token generated by the payment service 350A can be unique to the user and to the unique identifier. One or more tokenizing mechanisms can be used to securely tokenize the information. As described herein, in particular embodiments, the token can be a cryptographically secure token or a token to reference a public key associated with the payment service 350A that can be used to validate a subsequent payment request. In particular embodiments, as the request to register a unique identifier for the user can be used to register accounts for one or more additional payment services, step 526 can be performed by each of the one or more payment services 350A and 350B based on information shared between the payment services 350A and 350B. Additionally or alternatively, the payment service 350A that generates the token corresponding to user financial information can share only the token with another payment service 350B. The other payment service 350B can still use the token to identify the user and can communicate with the payment service 350A to retrieve sensitive financial information of the user when requested to process a payment.

At step 537, the token corresponding to the user financial information is received. For example, the centralized identifier registrar 360 receives the token from the payment service 350A. The centralized identifier registrar 360 can also receive the additional information, such as the identifying information or contact mechanism to be stored in the centralized identifier data store 365 in association with the unique identifier. At step 538, the token is stored in the centralized identifier data store 365. For example, the centralized identifier registrar 360 stores the token in the centralized identifier data store 365 in association with the unique identifier. The centralized identifier registrar 360 also stores any other information sent by the payment service 350A for storage. The centralized identifier registrar 360 sends a registration confirmation to the payment service 350A. The centralized identifier registrar 360 can also send a request to other payment services (e.g., payment service 350B) to cause the other payment services to generate an account for the user based on the information received by the centralized identifier registrar 360 from the payment service 350A. This request can include, for example, user identifying information or user financial information, if received from the payment service 350A, or the token received from the payment service 350A. At step 527, the registration confirmation is received. For example, the payment service 350A receives the registration confirmation and sends a confirmation to the mobile application 304A executing on the first user electronic device 302A. At step 514, registration confirmation is displayed. For example, the first user electronic device 302A displays the registration confirmation for the unique identifier. The unique identifier, now registered with the centralized identifier registrar 360, can be a federated identifier that is usable across multiple services associated with the centralized federated identifier system. Additionally, the federated identifier can be registered on the other constituent services automatically or other constituent services can be prevented from allowing users to register accounts using the same identifier by reference to the centralized identifier registrar 360.

Figure 6A:
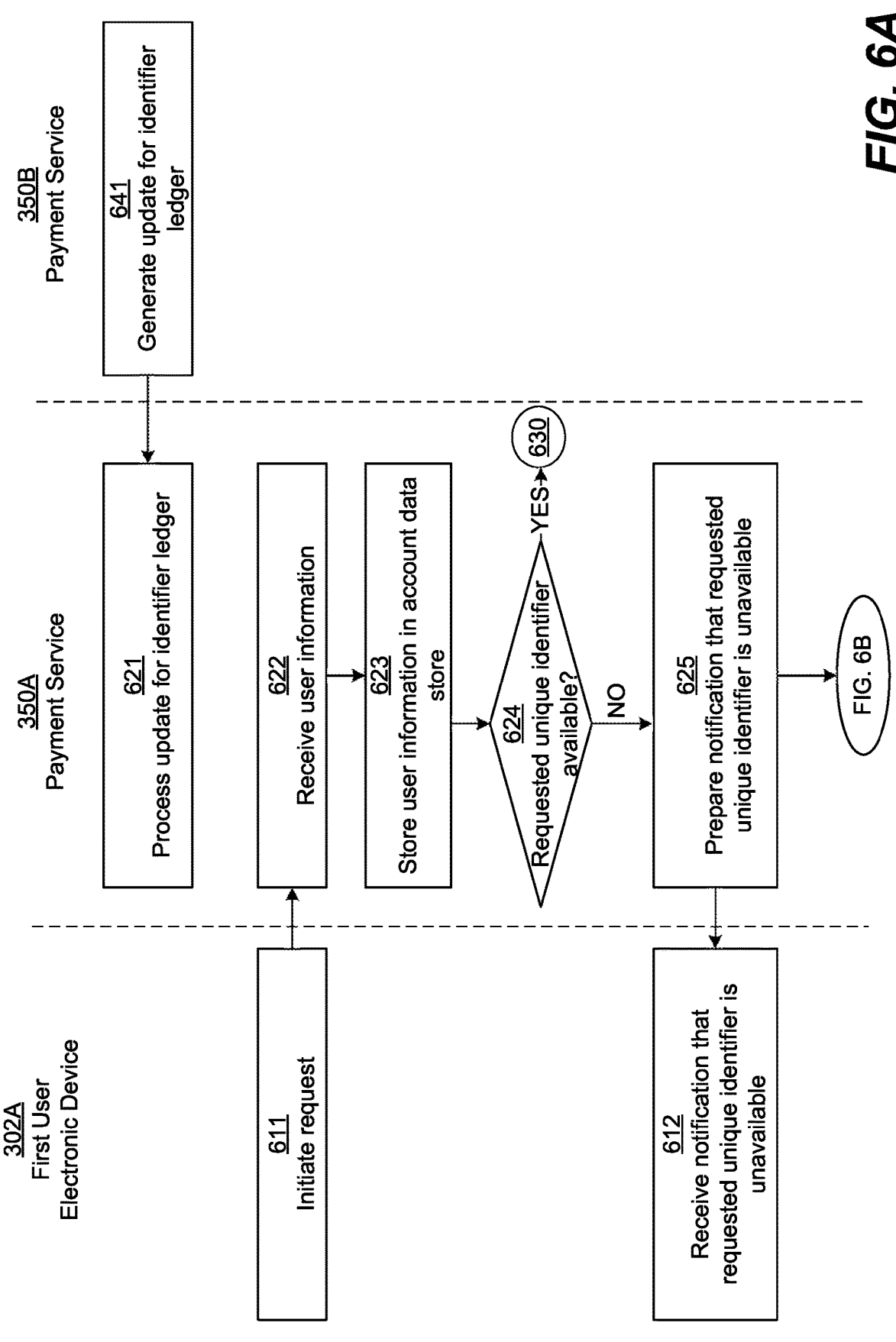
FIGS. 6A-6C are a process for registering a federated identifier according to some embodiments disclosed herein.
Figure 6B:
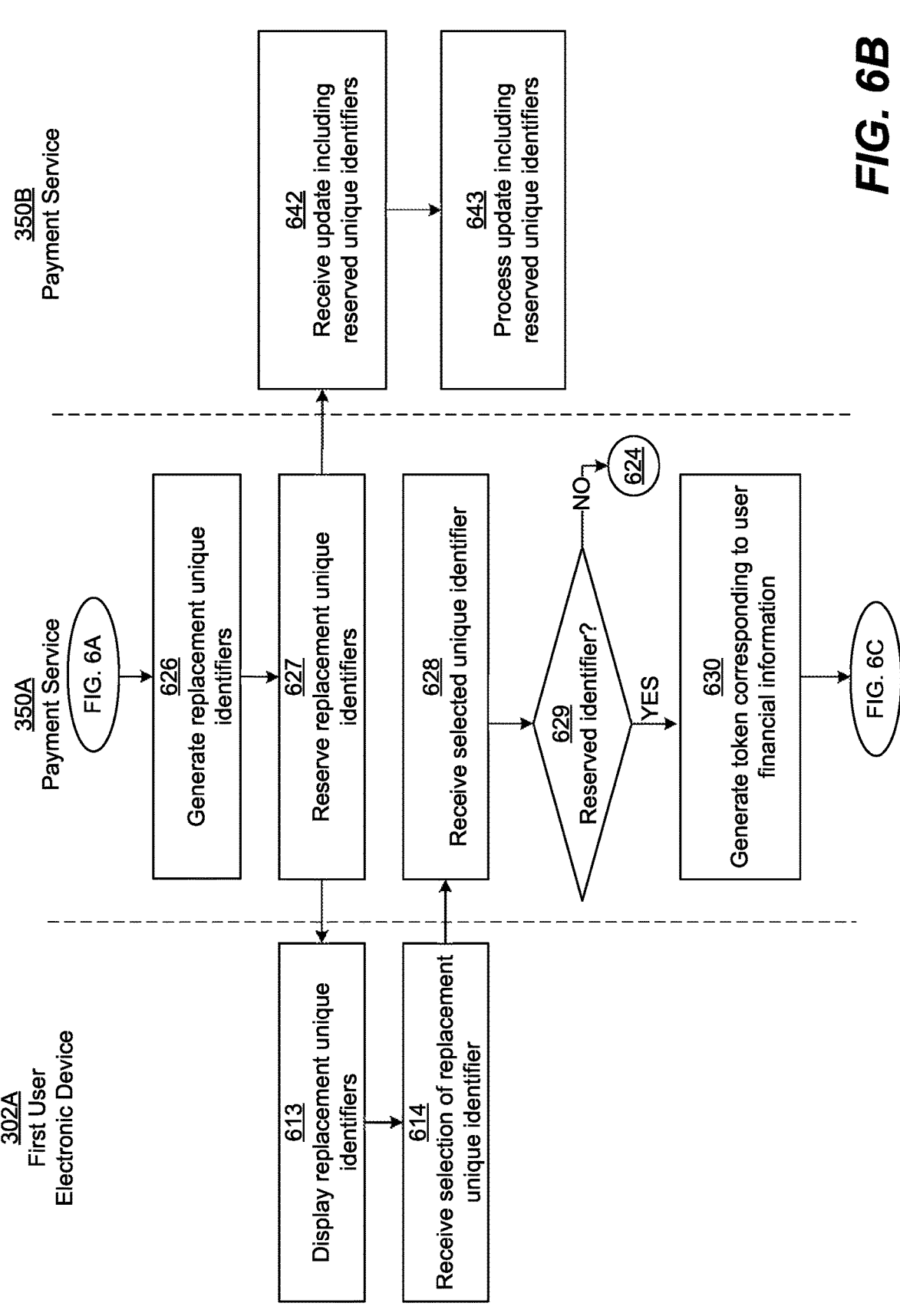
Figure 6C:
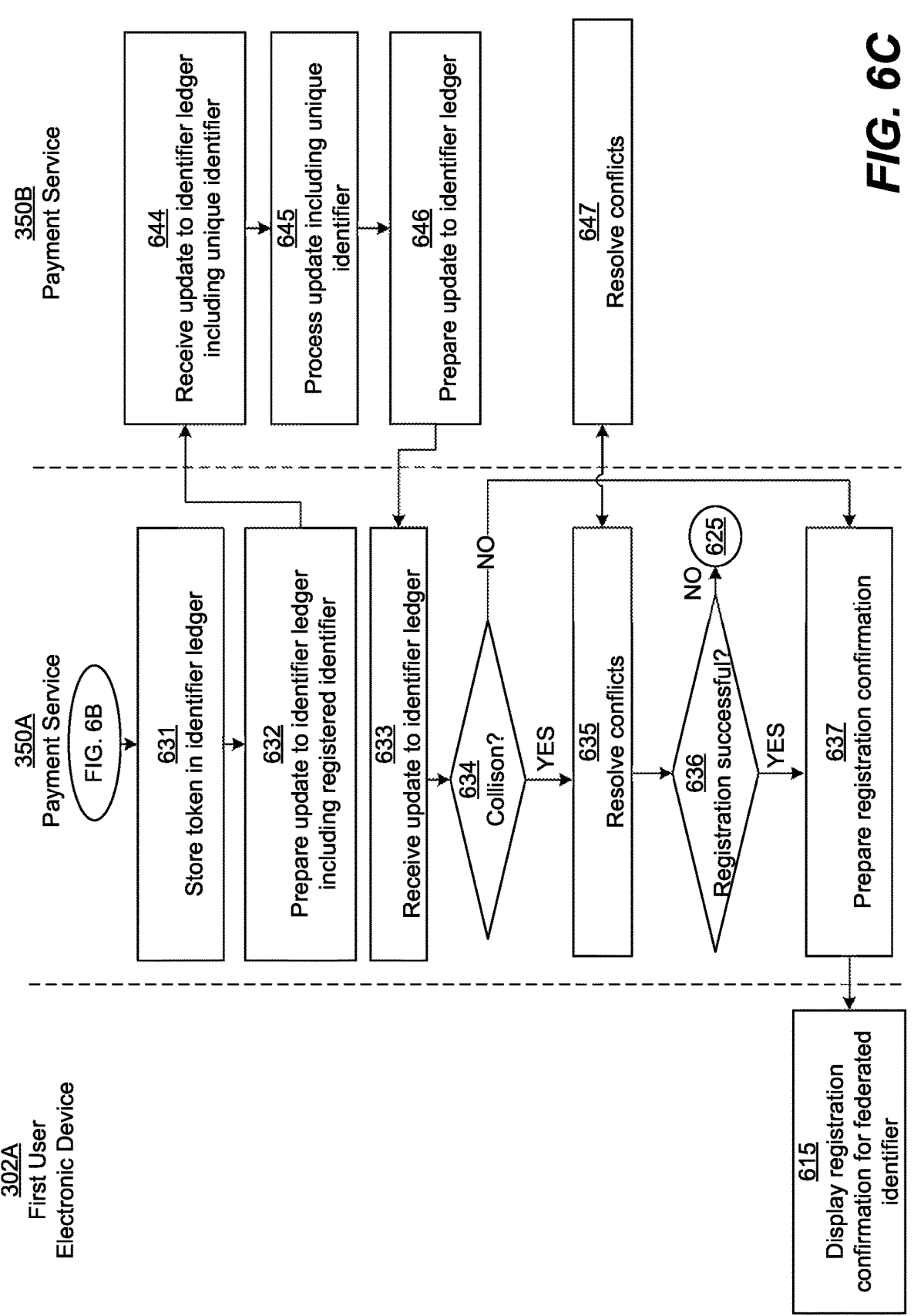

FIGS. 6A-6C illustrate an example process for registering an identifier with a decentralized federated identifier system. The described example refers to the decentralized operating environment 400 described with respect to FIG. 4. The process shown in FIGS. 6A-6C may be performed utilizing one or more of the first user electronic device 302A and second user electronic device 302B and payment servers 353A, 353B, and 353C associated with the recited entities that may include hardware (e.g., a general purpose processor, a graphic processing unit (GPU), an application-specific integrated circuit (ASIC), a system-on-chip (SoC), a micro-controller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

In particular embodiments, prior to the initiation of the process for registering a federated identifier, the payment services 350A and 350B can coordinate to ensure that each has an accurate record of the registered federated identifiers in the operating environment 400. At step 641, an update for an identifier ledger can be generated. For example, a payment service 350B in the decentralized operating environment 400 can generate an update based on changes to a local instance of an identifier ledger 357B. For example, the payment service 350B may have performed modifications to the instance of the identifier ledger 357B and may generate a set of modifications or differences from the previous state of the instance of the identifier ledger 357B. The payment service 350B can propagate the update to the instance of the identifier ledger 357B by, for example, causing the payment servers 353B to send the set of modifications or differences to other payment servers 353A and 353C of other payment services 350A and 350C, respectively via one or more networks 308. The update process can occur at regular intervals, after a specified number of updates have occurred, after each update, or on other similar time frames.

At step 621, the update for the identifier ledger can be processed. For example, the payment service 350A can process the update from the payment service 350C by applying the set of updates to the local instance of the identifier ledger 357A corresponding to the payment service 350A. The payment service 350A maintains a local instance of the identifier ledger 357A, with propagation of updates across payment services 350A and 350B causing the local identifier ledgers 357A and 357B to be identical after each update. As an example, the principles of the identifier ledgers 357A and 357B can be built on public or semi-public blockchain ledgers.

At step 611, a request is initiated. For example, a first user electronic device 302A initiates the request to register a unique identifier on behalf of the user. The request includes the requested unique identifier which the user desires to register and associate with their financial information. The request can also include user identifying information and financial account information for the user if the payment service 350A has not previously stored that information. The user can enter this information at the request of the payment service 350A into a user interface of the mobile application 304A. For example, the payment service 350A can deter-mine that it does not currently have financial information for the user within its local account data store 355A after querying the local account data store 355A with received identifying information for the user. The mobile application 304A then sends the entered information with the request.

The requested unique identifier included in the request can be specified by the user, recommended by the mobile application 304A executing on the first user electronic device 302A, or recommended by the payment service 350A. As an example, when a user indicates an intent to register the requested unique identifier (e.g., through initi-ating a registration process on the mobile application 304A), the payment service 350A can query the local instance of the identifier ledger 357A to determine available unique iden-tifiers and compare possible recommended unique identifi-ers to the registered unique identifiers in the identifier ledger 357A.

At step 622, user information associated with the request is received. For example, the payment service 350A receives user identifying information and financial information asso-ciated with the user from the mobile application 304A executing on the first user electronic device 302A. In embodiments where the payment service 350A already has a record for the user (e.g., where the user is seeking to link an existing payment service account with a federated iden-tifier), steps 622 and 623 can be skipped as optional once the request is received including the requested unique identifier. At step 623, the user information is stored in an account data store. For example, the payment service 350A stores the received information in an account data store 355A. For example, the payment service 350A can generate an internal identifier associated with an account of the user and store the received information in the account data store 355A.

At step 624, it is determined if the requested unique identifier is available. For example, the payment service 350A determines the availability of the requested unique identifier received in the request. As an example, the pay-ment service 350A queries the instance of the identifier ledger 357A maintained by the payment service 350A using the requested unique identifier. If the requested unique identifier is available ("Yes" path), for example if the requested unique identifier has not been registered previ-ously, then the process can proceed to step 630 described below as there is no need to negotiate a replacement unique identifier. If the requested unique identifier is not available to be registered by the user ("No" path), then, at step 625, a notification that the requested unique identifier is unavail-able is prepared. For example, the payment service 350A prepares a notification for the user indicating that the requested unique identifier is unavailable. The payment service 350A sends the notification to the first electronic user device 302A. At step 612, the notification that the requested unique identifier is unavailable is received. For example, the first electronic user device 302A receives the notification that the requested unique identifier is unavailable. The first electronic user device 302A, e.g., through the mobile appli-cation 304A, displays the notification to inform the user that they must select an alternative unique identifier.

Continuing on with FIG. 6B, at step 626, replacement unique identifiers are generated. For example, the payment service 350A can generate one or more replacement unique identifiers to recommend to the user. As described above, the recommended replacement unique identifiers can be deter-mined based on similarity to the requested unique identifier but are deemed available by querying the instance of the identifier ledger 357A with replacement unique identifiers. The determination of similarity and the generation of replacement unique identifiers can be performed in a manner similar to that described herein with respect to the centralized federated identifier system.

At step 627, replacement unique identifiers are reserved. For example, to reduce overall network traffic caused by repeated requests from the user, the payment service 350A can temporarily reserve the recommended replacement unique identifiers on behalf of the user. As described herein, the payment service 350A can indicate that the reserved unique identifiers should be held as unregistrable to any users besides the user who initiated the request. This is to ensure that recommended unique identifiers are actually available. The reservation may last for a fixed amount of time (e.g., 5 minutes) sufficient to receive confirmation of registration from the user. The payment service 350A may modify the local instance of the identifier ledger 357A to indicate that the recommended replacement unique identifiers are reserved by the payment service 350A for the user. To enforce the reservation system-wide, the payment service 350A also propagates updates to the instance of the identifier ledger 357A to other payment services 350B.

At step 642, updates including reserved unique identifiers are received. For example, the payment service 350B receives the update including the reserved unique identifiers. At step 643, the update including the reserved unique identifiers is processed. For example, the payment service 350B processes the received updates to update its own instance of the identifier ledger 357B. While processing the update, the payment service 350B can cause the payment servers 353B to modify the instance of the identifier ledger 357B to indicate that the recommended replacement unique identifiers will be reserved by the payment service 350A. As described herein, the payment server 350A can indicate through updates to the local instance of the identifier ledger 357A and through the updates propagated to other payment services (e.g., payment service 350B) that the reserved unique identifiers should be held as unregistrable to any users besides the user who initiated the request. By making this indication in the local instance of the identifier ledger 357A and propagating the indication as an update to the other payment services (e.g., payment service 350B) to be updated in corresponding local instances of the identifier ledger (e.g., identifier ledger 357B) the recommended unique identifiers are held for the user across all constituent payment services. This is to ensure that recommended unique identifiers are available if the user decides to proceed with one of them. In particular embodiments, the reservations can be kept active for a fixed period of time. The reservation can be set to automatically expire at the end of the that time. In particular embodiments, the reservation can be kept active until affirmatively unlocked by the payment service.

At step 613, the replacement unique identifiers are displayed. For example, after reserving the recommended replacement identifiers, the payment service 350A can provide the recommended unique identifiers to the mobile application 304A executing on the first user electronic device 302A. The mobile application 304A can cause the first user electronic device 302A to display the one or more recommended unique identifiers determined by the payment service 350A.

At step 614, a selection of the replacement unique identifier is received. For example, the mobile application 304A executing on the first user electronic device 302A receives a user input corresponding to a selection of a unique identifier. In particular embodiments, the user input can correspond to one of the recommended (replacement) unique identifiers. In particular embodiments, the user input can correspond to a new (replacement) unique identifier entered by the user. The mobile application 304A sends the selection of the unique identifier to the payment service 350A. At step 628, a selected unique identifier is received. For example, the payment service 350A receives the selected unique identifier from the mobile application 304A executing on the first user electronic device 302A.

At step 629, it is determined whether the selected unique identifier matches a reserved unique identifier. For example, the payment service 350A determines whether the selected unique identifier has been previously reserved (e.g., at step 627). Where the selected unique identifier has been previously reserved ("Yes" path), there is no concern for actual availability and the process advances to step 630. If the user has entered a new unique identifier to register ("No" path), then the payment service may return to step 624 to determine if the unique identifier is available. The process may repeat again until the payment service 350A is able to confirm the availability of the selected unique identifier. The payment service 350A can confirm that the selected unique identifier is available by querying the local instance of the identifier ledger 357A and determining that no record corresponding to the selected unique identifier exists in the present state of the instance of the identifier ledger 357A. In such an example, the selected unique identifier can be a "replacement" unique identifier when compared to the originally input or selected unique identifier. For the purpose of this discussion, as reserved, the selected unique identifier is referred to as the "unique identifier."

At step 630, a token corresponding to user financial information is generated. For example, the payment service 350A can prepare the information to map to the unique identifier in the instance of the identifier ledger 357A. In particular embodiments, the information may include the user identifying information and information associated with the user financial account previously received and stored in an account data store 355A by the payment service 350A. In particular embodiments, the information mapped with the unique identifier can include a token generated by the payment service 350A during step 630 to correspond with the financial information. As described herein, the use of the token manages the risk of transferring and storing sensitive information among multiple parties in a decentralized system where all particular are able to view the entirety of the instance of the identifier ledger 357A. The token generated by the payment service 350A can be unique to the user and to the unique identifier. One or more tokenizing mechanisms can be used to securely tokenize the information. As described herein, in particular embodiments, the token can be a cryptographically secure token or a token to reference a public key associated with the payment service 350A that can be used to validate a subsequent payment request.

Continuing on with FIG. 6C, at step 631, the token is stored in the identifier ledger 357A. For example, the payment service 350A stores the token in the instance of the identifier ledger 357A in association with the unique identifier. The payment service 350A also stores any other information prepared by the payment service 350A for storage, such as information to identify the payment service 350A as the home or primary payment service for the identifier.

At step 632, an update to the identifier ledger including the unique identifier (e.g., registered to the user) is prepared. For example, the payment service 350A prepares another update to the instance of the identifier ledger 357A based on updates made to the local instance of the identifier ledger 357A, including the registration of the unique identifier on behalf of the user. The payment service 350A propagates the update to other payment services 350C as described herein.

At step 644, the update to the identifier ledger including the unique identifier (e.g., registered to the user) is received. For example, the payment service 350B receives the update including the unique identifier. If the reservations of the recommended unique identifiers had not previously expired, the payment service 350B can use the received update to release the reservations. At step 645, the update including the unique identifier is processed. For example, the payment service 350B processes the update including the unique identifier. Because the payment services 350A and 350B are each independent services, they both can make and send updates to the identifier ledger based on updates to the respective local instances of the identifier ledger 357A and 357B respectively. In some cases, as described herein, these updates can include conflicts that are to be resolved, such as where both payment services 350A and 350B have registered the same unique identifiers to different user accounts. At step 646, another update to the identifier ledger to is prepared. For example, the payment service 350B can prepare its own update for the identifier ledger based on modifications made to the local instance of the identifier ledger 357B. The payment service 350B can propagate the update to the payment service 350A.

At step 633, the other update to the identifier ledger is received. For example, the payment service 350A can receive and process the update to the instance of the identifier ledger. Like the payment service 350B, the payment service 350A can process the updates by causing the payment service 353A to attempt to apply the modifications in the updates to the local instance of the identifier ledger 357A. While processing, at step 634, it can be determined if there is a collision based on the competing updates to the identifier ledger. For example, the payment service 350A can determine if there is a collision detected involving the recently registered unique identifier that has been requested by the user of the first user electronic device 302A. A collision in this instance can include an attempt by the payment service 350B to register the same unique identifier on behalf of a second user. If the updates from the payment service 350B do not involve a collision involving the unique identifier, then the process can continue to step 637 where the payment service 350A prepares a registration confirmation for the user. However, if there is a collision involving the unique identifier, then the process continues to step 635.

At step 635, detected conflicts can be resolved. For example, the payment service 350A initiates a conflict resolution mechanism with payment service 350B, which acts in a corresponding conflict resolution mechanism at step 647. The payment service 350B can be a participant in the conflict resolution mechanism because the payment service 350B can resolve the conflict introduced by its own registration of the identifier on behalf of a different user account. As described herein, the conflict resolution mechanism can involve the payment services 350A identifying a priority level for their own registration, with the registration performed with the higher priority level being made permanent in the identifier ledger. Other conflict resolution mechanisms can involve temporal priority, mathematically derived resolution techniques, or other similar approaches.

After steps 635 and 647, at step 636, it can be determined if registration was successful. For example, the payment service 350A can determine whether the registration of the unique identifier was successful. As an example, in this instance, the registration can be deemed successful if the registration performed by the payment service 350A was granted higher priority or otherwise selected as the permanent registration to be kept in the identifier ledger and propagated to other local instances of the identifier ledger 357A and 357B. If the registration was not successful, the process returns to step 625, where the payment service 350A informs the user that the unique identifier is no longer available. If the registration is successful, the process continues to step 637.

At step 637, confirmation of registration of the unique identifier can be prepared. For example, the payment service 350A prepares a registration confirmation and sends the registration confirmation to the mobile application 304A executing on the first user electronic device 302A. At step 615, the registration confirmation can be displayed. For example, the first user electronic device 302A displays the registration confirmation for the identifier. The identifier, now confirmed as registered with the distributed account ledger, can be a federated identifier that is usable across multiple services associated with the decentralized federated identifier system.

Figure 7:
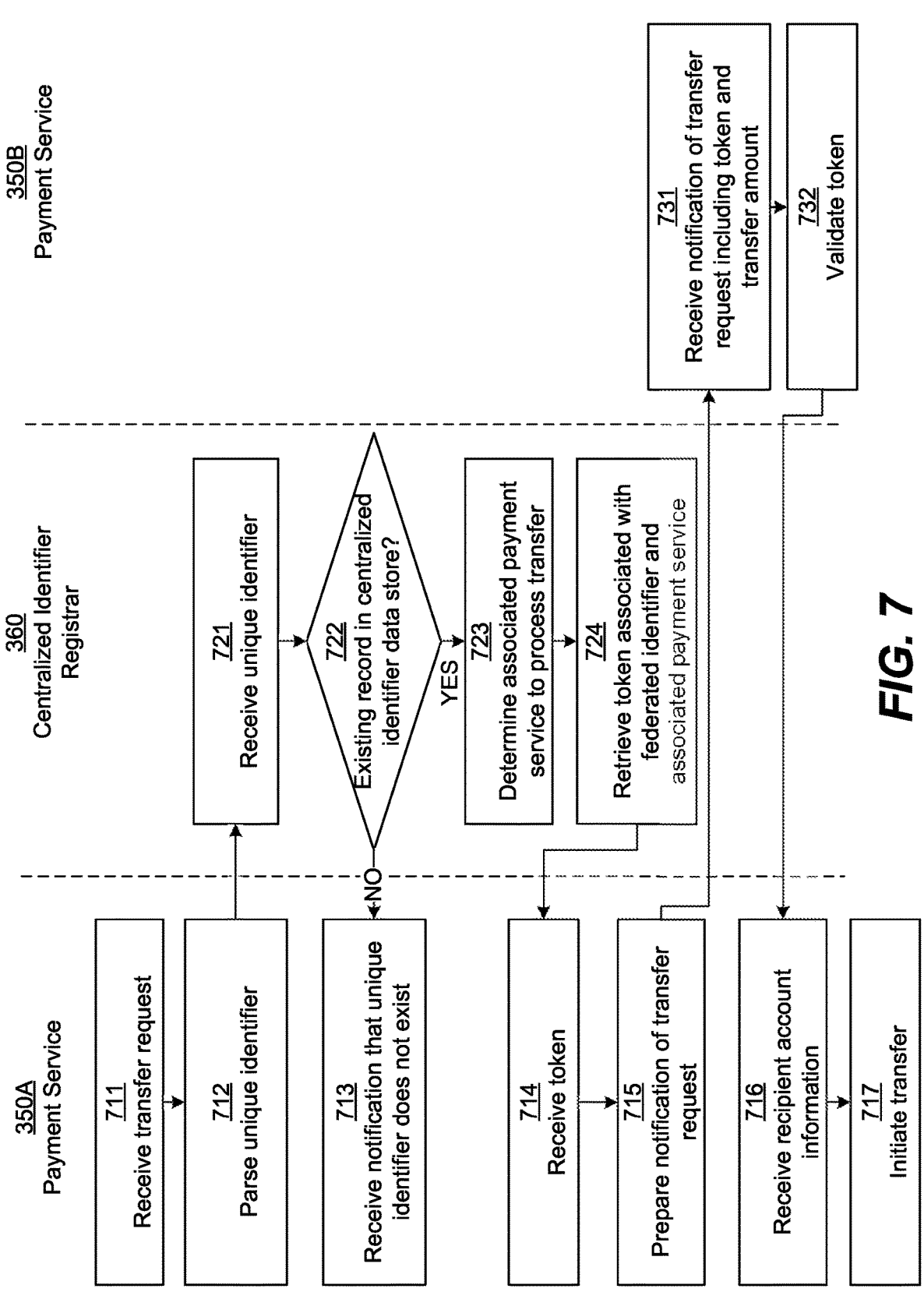
FIG. 7 is a process for initiating a payment transfer using a federated identifier as a payment proxy according to some embodiments disclosed herein.

FIG. 7 illustrates an example process for processing a payment request using a federated identifier. The process shown in FIG. 7 may be performed utilizing one or more payment servers 353A and 353B and registrar servers 163) associated with the recited entities that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

At step 711, a transfer request is received. For example, the first payment service 350A receives a transfer request from a first user electronic device 102A including a unique identifier. The first payment service 350A can receive the request after the user expressly enters the unique identifier in a payment field or other similar user interface. The first payment service 350A can receive the request after a user uses the unique identifier in a text field of a real-time message (e.g., in-app message, email, text message, etc.) or forum-style message (e.g., post to a social media forum, blog, or the like). The first payment service 350A can receive the request automatically from the first user electronic device 302A as a consequence of user activity on the device, such as viewing content designated for a micropayment through a unique identifier as a payment proxy or providing the unique identifier to a merchant as a payment proxy. As described herein, the unique identifier can be registered with one or more payment services, in which case, the unique identifier can be a "federated identifier."

At step 712, the unique identifier is parsed from the request. For example, the payment service 350A parses the unique identifier from the request. The payment service 350A can also parse a transfer amount and other related information from the request. For example, where the transfer request is to transfer cash, the payment service 350A can parse a requested currency. Where the transfer request to is transfer security assets or cryptocurrency, this information can too be extracted from the request.

At step 721, the unique identifier is received. For example, the centralized identifier registrar 360 receives the unique identifier from the request from the payment service 350A. For example, the centralized identifier registrar 360 can provide an API endpoint to receive requests for transfer that specifies as part of its syntax that the unique identifier is to be provided. This can enable the centralized identifier registrar 360 to efficiently continue the process. At step 722, it is determined if the unique identifier is associated with an existing record in the centralized identifier data store 365. For example, the centralized identifier registrar 360 determines if there is an existing record in the centralized identifier data store 365 that is associated with the unique identifier. As an example, the centralized identifier registrar 360 can cause the registrar servers 363 to query the centralized identifier data store 365 using the unique identifier. If there is no existing record, e.g., if the query returns no results ("No" path), the centralized identifier registrar 360 can send an error notification to the payment service 350A to indicate that an account corresponding to the unique identifier does not exist. At step 713, a notification that the unique identifier does not exist in the centralized identifier data store 365 is prepared. For example, the payment service 350A prepares a notification, e.g., to the user electronic device (e.g., the first user electronic device 302A) indicating that the unique identifier does not exist in the centralized identifier data store 365 and that the transfer may not be completed as requested. If at step 722, the centralized identifier registrar 360 is able to determine an existing record ("Yes" path), the unique identifier is determined to be a federated identifier.

At step 723, an associated payment service is determined to process the transfer. As described herein, the federated identifier can be associated with multiple user accounts (all corresponding to the same user) across multiple payment services (e.g., payment service 350A and 350B). The centralized identifier registrar 360 can select which of the payment services should be used in completing the transfer based on implicit or explicit preference criteria, such as an expressed preference for a particular payment service, associated with the user that has initiated the transfer and the recipient. As an example, the centralized identifier registrar 360 can consider contextual information associated with the transfer request. The centralized identifier registrar 360 can consider past transactions between the initiating user and the, now identified, recipient to determine an existing relationship between the users. The centralized identifier registrar 360 can consider costs or fees that may be charged to Bob, the receiving user, and the payment services, as a consequence of conducting the transaction through a particular payment service. The centralized identifier registrar 360 can consider the speed at which the payment services can process payments and finalize the exchange of funds, the transaction volumes of the payment services, the relative popularity of the payment services, and other similar considerations. Additionally, if the payment services are associated with mobile applications, the centralized identifier registrar 360 can consider which of the mobile applications are installed on respective user electronic devices of the user and how recently the users have been active in the mobile applications. This can be useful to determine whether a user has abandoned or stopped using an old account and would therefore be less preferable in comparison to an account with a payment service they actively use. Based on these and other criteria, the centralized identifier registrar 360 can determine the associated payment service.

At step 724, a token associated with the federated identifier and associated payment service is retrieved. For example, the centralized identifier registrar 360 retrieves a token associated with the received federated identifier from the centralized identifier data store 365. The centralized identifier registrar 360 also retrieves an identification or other contact mechanism associated with the payment service 350B associated with the federated identifier. In this example, the federated identifier is associated with a different payment service 350B than received the initial request for transfer.

At step 714, the token is received. For example, the payment service 350A receives the token and contact information for the second payment service 350B from the centralized identifier registrar 360. At step 715, a notification of a transfer request is prepared. For example, the payment service 350A prepares a notification of the transfer request for a second payment service 350B. Because the centralized identifier registrar 360 stores the token associated with payment service 350B that registered the federated identifier, the payment service 350A may work with the other payment service 350B to complete the transfer. The notification can include the token and the transfer amount if the second payment service 350B is expected to initiate the transaction.

At step 731, the notification of the transfer request including a token and, optionally, a transfer amount are received. For example, the second payment service 350B receives the notification of the transfer request including the token and, optionally, the transfer amount. At step 732, the token can be validated. For example, the payment service 350B can validate the token at step 732 to ensure that the token is genuine and is associated with a user account managed by the second payment service 350B. For example, the payment service 350B can query a local account data store 355B using the token and confirm there is a corresponding record for a user. In particular embodiments, the first payment service 350A can further provide the requested federated identifier to the second payment service 350B, which can act as a further confirmation that the correct user token has been provided. Additionally or alternatively, when the centralized identifier registrar 360 receives the request from the first payment service 350A, the centralized identifier registrar 360 can provide a notification to the second payment service 350B (identified based on the information mapped to the federated identifier) that the federated identifier was invoked to identify a user. After the token has been validated, the second payment service 350B can provide a mechanism for the first payment service 350A to securely initiate a payment transfer to or from the financial account associated with the federated identifier (e.g., the recipient financial account).

At step 716, recipient account information is received. For example, the payment service 350A receives the account information associated with the recipient user. In particular embodiments, the account information can be transmitted in a secured direct manner. In particular embodiments, the second payment service 350B can instead provide an address for a mechanism to cause it to initiate the transfer. For example, the second payment service 350B can provide an additional token to reference this transaction and an additional endpoint through which the first payment service 350A can provide the account information associated with the initiating user. At step 717, the transfer can be initiated. For example, the payment service 350A initiates the requested transfer between a financial account associated with the requesting user and the financial account associated with the recipient user using one or more techniques described herein. Therefore, account information and payments are kept secure because access to account information is carefully restricted and granted on a limited basis or in response to validation of the request and payment services involved.

In some examples, individual payment services can operate with different currencies (e.g., dollar ($), euro (€), pound (£), rupee (₹), yuan (¥), etc.) or asset types (e.g., fiat currency, investments, cryptocurrency, etc.). In some examples, at least one of the payment service 350A, the payment service 350B, or a centralized exchange service can determine a currency associated with the payment service from which a payment originated (e.g., sender payment service) and a currency associated with the payment service to which the payment is received (e.g., recipient payment service) and, if such currencies are different, can determine exchange rates between the sender and receiver currency. Such exchange rates can be used to facilitate payments between multiple payment services that operate with different currencies. In some examples, the exchange rates can be based at least in part on public exchange rates or models, in some examples that are trained by machine learning mechanisms using data associated with the payment service(s). In at least one example, in association with a payment, the payment service 350A, the payment service 350B, or the centralized exchange can perform a conversion between currencies based at least in part on the determined exchange rates.

Figure 8:
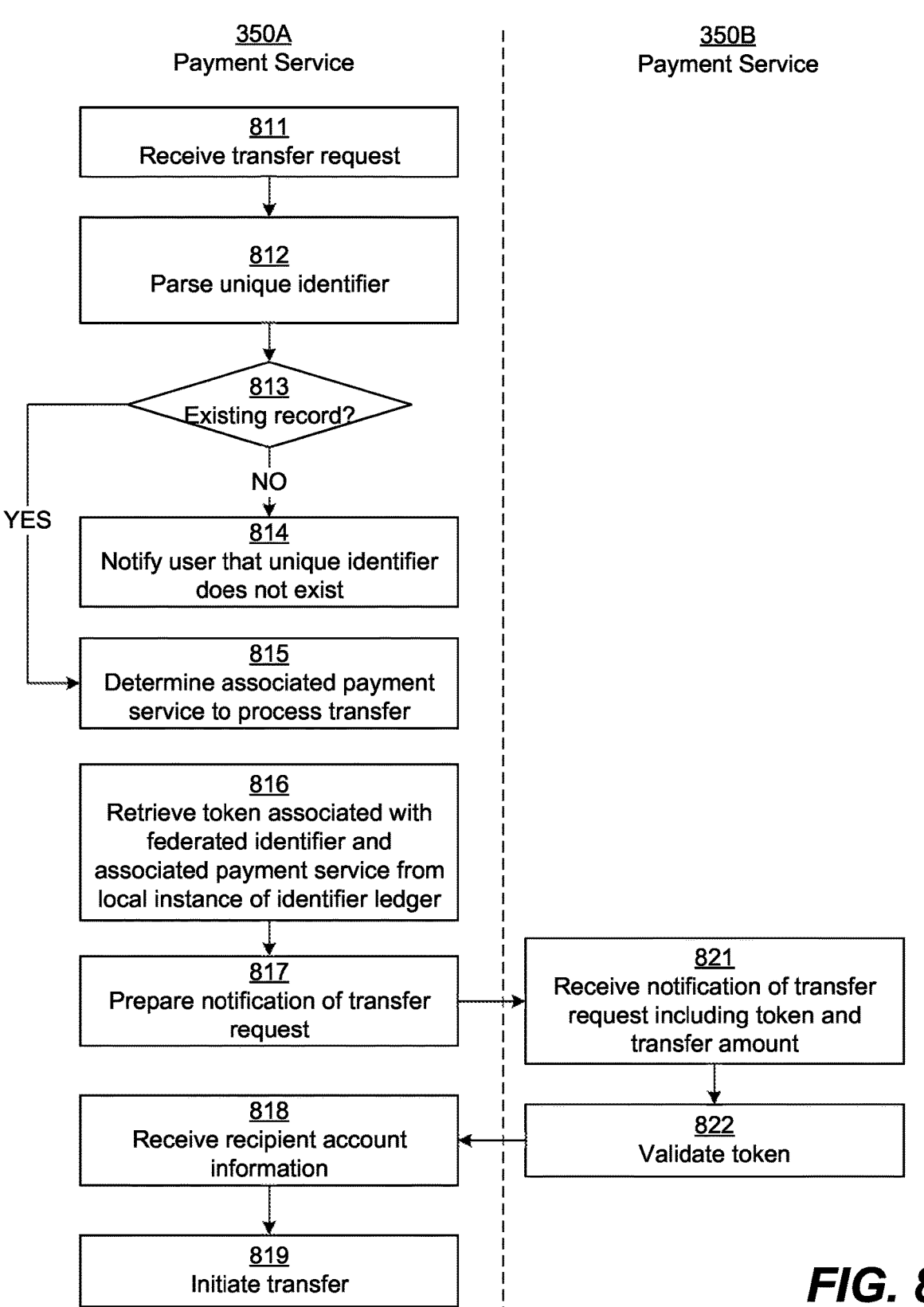
FIG. 8 is a process for initiating a payment transfer using a federated identifier as a payment proxy according to some embodiments disclosed herein.

FIG. 8 illustrates an example process for processing a payment request using a federated identifier. The described example will refer to the decentralized operating environment 400 described with respect to FIG. 4. The process shown in FIG. 8 may be performed utilizing one or more servers 353A and 353B associated with the recited entities that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

At step 811, a transfer request is received. For example, the payment service 350A receives a transfer request from a first electronic device 302A including a unique identifier. The payment service 350A can receive the payment request, for example, after a user expressly enters the unique identifier in a payment field or other similar user interface. The payment service 350A can receive the request after a user uses the unique identifier in a text field of a real-time message or forum-style message. The payment service 350A can receive the request from the first user electronic device 302A as a consequence of user activity on the device, such as viewing content designated as requiring a micropayment through a unique identifier. In some examples, the unique identifier can therefore be used as a "payment proxy." As described above, to the extent the unique identifier is registered to one or more payment services, the unique identifier can be a "federated identifier."

At step 812, the unique identifier is parsed from the transfer request. For example, the payment service 350A parses the unique identifier from the request. The payment service 350A can also parse a transfer amount and other related information from the request. For example, where the transfer request is to transfer cash, the payment service 350A can parse a requested currency. Where the transfer request to is transfer security assets or cryptocurrency, this information can too be extracted from the request.

At step 813, it is determined if the unique identifier matches an existing record in the identifier ledger. For example, the payment service 350A determines if there is an existing record in the instance of the identifier ledger 357A that is associated with the unique identifier. For example, the payment service 350A can cause the payment server 353A to query the instance of the identifier ledger 357A using the unique identifier from the request. If there is no existing record ("No" path), at step 814, the user is notified that the unique identifier does not exist in the identifier ledger. For example, the payment service 350A can send an error notification to the first user electronic device 302A to indicate that an account corresponding to the unique identifier does not exist and that the transfer may not be completed as requested. If at step 813, the payment service 350A is able to determine an existing record ("Yes" path), the unique identifier can be determined to be a federated identifier.

At step 815, an associated payment service is determined to process the transfer. As described herein, the federated identifier can be associated with multiple user accounts (all corresponding to the same user) across multiple payment services (e.g., payment service 350A and 350B). The payment service 350A can select which of the payment services should be used in completing the transfer based on implicit or explicit preference criteria, such as an expressed preference for a particular payment service, associated with the user that has initiated the transfer and the recipient. As an example, payment service 350A can consider contextual information associated with the transfer request. The payment service 350A can consider past transactions between the initiating user and the, now identified, recipient to determine an existing relationship between the users. The payment service 350A can consider costs or fees that may be charged to Bob, the receiving user, and the payment services, as a consequence of conducting the transaction through a particular payment service. The payment service 350A can consider the speed at which the payment services can process payments and finalize the exchange of funds, the transaction volumes of the payment services, the relative popularity of the payment services, and other similar considerations. Additionally, if the payment services are associated with mobile applications, the payment service 350A can consider which of the mobile applications are installed on respective user electronic devices of the user and how recently the users have been active in the mobile applications. This can be useful to determine whether a user has abandoned or stopped using an old account and would therefore be less preferable in comparison to an account with a payment service they actively use. Based on these and other criteria, the payment service 350A can determine the associated payment service.

At step 816, a token associated with the federated identifier and associated payment service is retrieved from the local instance of the identifier ledger. For example, the payment service 350A retrieves a token associated with the received federated identifier from the instance of the identifier ledger 357A. The payment service 350A also retrieves an identification or other contact mechanism associated with the payment service 350B associated with the federated identifier in the instance of the identifier ledger 357A. In this example, the federated identifier is associated with a different payment service 350B than received the initial request for transfer.

At step 817, a notification of the transfer request is prepared. For example, the payment service 350A prepares a notification of the transfer request for second payment service 350B. Because the instance of the identifier ledger 357A stores the token associated with the user financial information at the payment service associated with the federated identifier, in this case payment service 350B, the payment service 350A may work with the other payment service to complete the transfer. The notification of the transfer request for the second payment service 350B can include the token and the transfer amount if the second payment service 350B is expected to initiate the transaction.

At step 821, the notification of the transfer request including the token and, optionally, the transfer amount is received. For example, the second payment service 350B receives the notification of the transfer request including the token and, optionally, the transfer amount. At step 822, the token is validated. For example, the payment service 350B can validate the token at step 822 to ensure that the token is genuine and is actually associated with a user account managed by the second payment service 350B. For example, the payment service 350B can query a local account data store 355B using the token and confirm there is a corresponding record for a user. In particular embodiments, the payment service 350A can further provide the requested federated identifier to the second payment service 350B, which can act as a further confirmation that the correct user token has been provided. After the token has been validated, the second payment service 350B can provide a mechanism for the first payment service 350A to securely initiate a payment transfer to or from the financial account associated with the federated identifier (e.g., the recipient financial account).

At step 818, the financial account information of the recipient is received. For example, the payment service 350A receives the account information associated with the recipient user. In particular embodiments, the account information can be transmitted in a secured direct manner. In particular embodiments, the second payment service 350B can instead provide an address for a mechanism to cause it to initiate the transfer. For example, the second payment service 350B can provide an additional token to reference this transaction and an additional endpoint through which the first payment service 350A can provide the account information associated with the initiating user. At step 819, the transfer is initiated. For example, the payment service 350A initiates the requested transfer between a financial account associated with the requesting user and the financial account associated with the recipient user using one or more techniques described herein.

In some examples, individual payment services can operate with different currencies (e.g., dollar ($), euro (€), pound (£), rupee (₹), yuan (¥), etc.) or asset types (e.g., fiat currency, investments, cryptocurrency, etc.). In some examples, at least one of the payment service 350A, the payment service 350B, or a centralized exchange service can determine a currency associated with the payment service from which a payment originated (e.g., sender payment service) and a currency associated with the payment service to which the payment is received (e.g., recipient payment service) and, if such currencies are different, can determine exchange rates between the sender and receiver currency. Such exchange rates can be used to facilitate payments between multiple payment services that operate with different currencies. In some examples, the exchange rates can be based at least in part on public exchange rates or models, in some examples that are trained by machine learning mechanisms using data associated with the payment service(s). In at least one example, in association with a payment, the payment service 350A, the payment service 350B, or the centralized exchange can perform a conversion between currencies based at least in part on the determined exchange rates.

Particular embodiments may repeat one or more steps of the processes of FIGS. 5A-5B, 6A-6C, 7, and 8, where appropriate. Although this disclosure describes and illustrates particular steps of the processes of FIGS. 5A-5B, 6A-6C, 7, and 8 as occurring in a particular order, this disclosure contemplates any suitable steps of the processes of FIGS. 5A-5B, 6A-6C, 7, and 8 occurring in any suitable order. Moreover, this disclosure contemplates any suitable method for performing the processes of FIGS. 5A-5B, 6A-6C, 7, and 8 which may include all, some, or none of the steps of the processes of FIGS. 5A-5B, 6A-6C, 7, and 8, where appropriate. Furthermore, although this disclosure describes and illustrates particular components, devices, or systems carrying out particular steps of the processes of FIGS. 5A-5B, 6A-6C, 7, and 8, this disclosure contemplates any suitable combination of any suitable components, devices, or systems carrying out any suitable steps of the processes of FIGS. 5A-5B, 6A-6C, 7, and 8.

Figure 9:
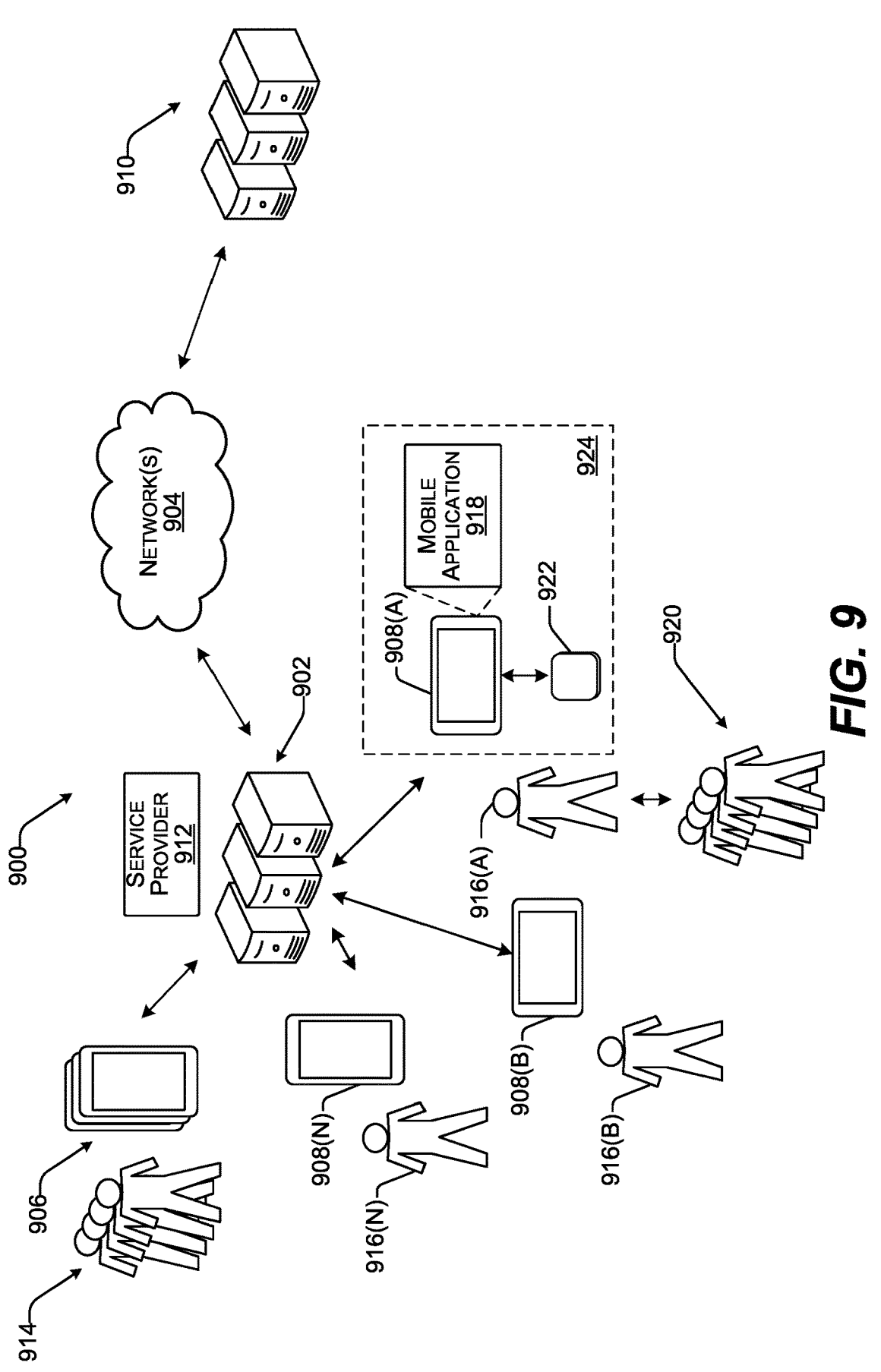
FIG. 9 is an example environment including multiple user devices and service providers.

FIG. 9 illustrates an example environment 900. The environment 900 includes server computing device(s) 902 that can communicate over a network 904 with user devices 906 (which, in some examples can be user devices 908 (individually, 908(A)-908(N))) executing a mobile application 918 (e.g., mobile application 104A) or server computing device(s) 910 associated with third-party service provider(s). The server computing device(s) 902 can be associated with a service provider 912 that can provide one or more services for the benefit of users 914, as described herein. Actions attributed to the service provider 912 can be performed by the server computing device(s) 902.

In particular embodiments, the user devices 906 or 908 can correspond to the first user electronic device 302A and the second user electronic device 302B. The service provider 912 can correspond with one of the payment services (e.g., payment service 350A, 350B, 350C). The environment 900 can be modified to include the number of payment services 350A of the operating environments 300 and 400. Additionally, the server computing devices 910 associated with a third-party provider can correspond with, for example, the registrar servers 363 associated with the centralized identifier registrar as illustrated in FIG. 3 or with other payment services 350B and 350C when viewed from the perspective of a first payment service 350A.

The environment 900 can include multiple user devices 906, as described above. Each one of the multiple user devices 906 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 914. The users 914 can be referred to as customers, buyers, merchants, sellers, borrowers, employees, employers, payors, payees, couriers and so on. The users 914 can interact with the user devices 906 via user interfaces presented via the user devices 906. In at least one example, a user interface can be presented via a web browser, or the like. In other examples, a user interface can be presented via an application, such as a mobile application or desktop application, which can be provided by the service provider 912 or which can be an otherwise dedicated application. In some examples, individual of the user devices 906 can have an instance or versioned instance of an application, which can be downloaded from an application store, for example, which can present the user interface(s) described herein. In at least one example, a user 914 can interact with the user interface via touch input, spoken input, or any other type of input.

As described above, in at least one example, the users 914 can include peer-to-peer users 916 (individually, 916(A)-916(N)). In an example, the peer-to-peer users 916 can operate respective peer-to-peer user devices 908, which can be user devices 906 configured for use by peer-to-peer users 916. For the purpose of this discussion, a "peer-to-peer user" can be any user that uses the mobile application 918 to participate in peer-to-peer transactions, that is, transactions with other users of the service provider 912. In some cases, a peer-to-peer user can be a "merchant", any entity that offers items (e.g., goods or services) for purchase or other means of acquisition (e.g., rent, borrow, barter, etc.). A merchant can differ from a peer-to-peer user in that a merchant is in the regular business of offering items for purchase. As described herein, a payment between peer-to-peer users and between a merchant and a customer can be performed in largely the same manner. A merchant can offer items for purchase or other means of acquisition via brick-and-mortar stores, mobile stores (e.g., pop-up shops, food trucks, etc.), online stores, combinations of the foregoing, and so forth. In some examples, at least some of the peer-to-peer users 916 can be associated with a same entity but can have different merchant locations or can have franchise/franchisee relationships. In additional or alternative examples, the peer-to-peer users 916 can be different peer-to-peer users. That is, in at least one example, the peer-to-peer user 916(A) is a different user than the peer-to-peer user 916(B) or the peer-to-peer user 916(C).

For the purpose of this discussion, "different users" or "different merchants" can refer to two or more unrelated users. "Different merchants" therefore can refer to two or more merchants that are different legal entities (e.g., natural persons or corporate persons) that do not share accounting, employees, branding, etc. "Different merchants," as used herein, have different names, employer identification numbers (EIN)s, lines of business (in some examples), inventories (or at least portions thereof), or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations or different commerce channels.

Each peer-to-peer user device 908 can have an instance of a mobile application 918 stored thereon. The mobile application 918 can configure the peer-to-peer user device 908 to send and receive peer-to-peer transactions, as described herein. In some embodiments, the mobile application can additionally or alternatively configure the peer-to-peer user device 908 as a POS terminal, which enables the peer-to-peer user 916(A), and in particular peer-to-peer users acting as merchants, to interact with one or more customers 920. As described above, the users 914 can include customers, such as the customers 920 shown as interacting with the peer-to-peer user 916(A). For the purpose of this discussion, a "customer" can be any entity that acquires items from merchants. While only two customers 920 are illustrated in FIG. 9, any number of customers 920 can interact with the peer-to-peer users 916. Further, while FIG. 9 illustrates the customers 920 interacting with the peer-to-peer user 916(A), the customers 920 can interact with any of the peer-to-peer user 916.

In at least one example, interactions between the customers 920 and the peer-to-peer users 916 that involve the exchange of funds (from the customers 920) for items (from the merchants 916) can be referred to as "POS transactions" or "transactions." In at least one example, the mobile application 918 can determine transaction data associated with the transactions. Transaction data can include payment information, which, in certain embodiments, can be obtained from a reader device 922 associated with the peer-to-peer user device 908(A), user authentication data, purchase amount information, point-of-purchase information (e.g., item(s) purchased, date of purchase, time of purchase, etc.), etc. The mobile application 918 can send transaction data to the server computing device(s) 902. Furthermore, the mobile application 918 can present a UI to enable the peer-to-peer user 916(A) to interact with the mobile application 918 or the service provider 912 via the peer-to-peer user application 918.

In at least one example, the peer-to-peer user device 908(A), when configured as a POS device for a merchant can be a special-purpose computing device configured as a POS terminal (via the execution of the mobile application 918). In at least one example, the POS terminal may be connected to a reader device 922, which is capable of accepting a variety of payment instruments, such as credit cards, debit cards, gift cards, short-range communication based payment instruments, and the like, as described below. In at least one example, the reader device 922 can plug in to a port in the peer-to-peer user device 908(A), such as a microphone port, a headphone port, an audio-jack, a data port, or other suitable port. In additional or alternative examples, the reader device 922 can be communicatively coupled to the peer-to-peer user device 908(A) via another wired or wireless connection, such as via a Bluetooth®, BLE, and so on. Additional details are described below with reference to FIG. 10. In some examples, the reader device 922 can read information from alternative payment instruments including, but not limited to, wristbands and the like. Additionally or alternatively, other peer-to-peer user devices 908(B) and 908(N) may also be connected to a reader device 922 to facilitate peer-to-peer user transactions.

In some examples, the reader device 922 may physically interact with payment instruments such as magnetic stripe payment cards, EMV payment cards, or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 922, and communicate with the server computing device(s) 902, which can provide, among other services, a payment service. The server computing device(s) 902 associated with the service provider 912 can communicate with server computing device(s) 910, as described below. In this manner, the POS terminal and reader device 922 may collectively process transaction(s) between the peer-to-peer users 916 and customers 920. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 922 of the POS system 924 are shown as separate devices, in additional or alternative examples, the POS terminal and the reader device 922 can be part of a single device. In some examples, the reader device 922 can have a display integrated therein for presenting information to the customers 920. In additional or alternative examples, the POS terminal can have a display integrated therein for presenting information to the customers 920. POS systems, such as the POS system 924, may be mobile, such that POS terminals and reader devices may process transactions in disparate locations across the world. Peer-to-peer user devices 908, including POS systems such as POS system 924, can be used for processing card-present transactions and card-not-present (CNP) transactions, as described below.

A card-present transaction is a transaction where both a customer 920 and his or her payment instrument are physically present at the time of the transaction. Card-present transactions may be processed by swipes, dips, taps, or any other interaction between a physical payment instrument (e.g., a card), or otherwise present payment instrument, and a reader device 922 whereby the reader device 922 is able to obtain payment data from the payment instrument. A swipe is a card-present transaction where a customer 920 slides a card, or other payment instrument, having a magnetic strip through a reader device 922 that captures payment data contained in the magnetic strip. A dip is a card-present transaction where a customer 920 inserts a payment instrument having an embedded microchip (i.e., chip) into a reader device 922 first. The dipped payment instrument remains in the payment reader until the reader device 922 prompts the customer 920 to remove the card, or other payment instrument. While the payment instrument is in the reader device 922, the microchip can create a one-time code which is sent from the POS system 924 to the server computing device(s) 910 (which can be associated with third-party service providers that provide payment services, including but not limited to, an acquirer bank, an issuer, or a card payment network (e.g., Mastercard®, VISA®, etc.)) to be matched with an identical one-time code. A tap is a card-present transaction where a customer 920 may tap or hover his or her payment instrument (e.g., card, electronic device such as a smart phone running a payment application, etc.) over a reader device 922 to complete a transaction via short-range communication (e.g., NFC, RFID, Bluetooth®, BLE, etc.). Short-range communication enables the payment instrument to exchange information with the reader device 922. A tap may also be called a contactless payment.

A CNP transaction is a transaction where a card, or other payment instrument, is not physically present at the peer-to-peer user device 908 such that payment data is required to be manually keyed in (e.g., by a merchant, customer, etc.), or payment data is required to be recalled from a card-on-file data store, to complete the transaction. As an example, as described herein, payment data can be recalled using a federated identifier as payment proxy provided by the customer 920 or the peer-to-peer user 916. The federated identifier is transmitted from the peer-to-peer user device 908 to the service provider 912. Using the techniques described herein, the service provider 912 can determine the payment data to complete the transaction.

The peer-to-peer user devices 908, the server computing device(s) 902, or the server computing device(s) 910 may exchange payment information and transaction data to determine whether transactions are authorized. For example, the peer-to-peer user devices 908 may provide encrypted payment data, user authentication data, purchase amount information, point-of-purchase information, etc. (collectively, transaction data) to server computing device(s) 902 over the network(s) 904. The server computing device(s) 902 may send the transaction data to the server computing device(s) 910. As described above, in at least one example, the server computing device(s) 910 can be associated with third-party service providers that provide payment services, including but not limited to, an acquirer bank, an issuer, or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server computing device(s) 910 associated therewith) can send a fund transfer request to a server computing device of a card payment network (e.g., Mastercard®, VISA®, etc.) to determine whether the transaction is authorized or deficient. In at least one example, the service provider 912 can serve as an acquirer and connect directly with the card payment network.

The card payment network (e.g., the server computing device(s) 910 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server computing device(s) 910 associated therewith) can determine whether the customer has the capacity to absorb the relevant charge associated with the payment transaction. In at least one example, the service provider 912 can serve as an issuer or can partner with an issuer. The transaction is either approved or rejected by the issuer or the card payment network (e.g., the server computing device(s) 910 associated therewith), and a payment authorization message is communicated from the issuer to the POS device via a path opposite of that described above, or via an alternate path.

As described above, the server computing device(s) 910, which can be associated with payment service provider(s), may determine whether the transaction is authorized based on the transaction data, as well as information relating to parties to the transaction (e.g., the customer 920 or the peer-to-peer user 916(A)). The server computing device(s) 910 may send an authorization notification over the network(s) 904 to the server computing device(s) 902, which may send the authorization notification to the peer-to-peer user device 908(A) over the network(s) 904 to indicate whether the transaction is authorized. The server computing device(s) 902 may also transmit additional information such as transaction identifiers to the peer-to-peer user device 908(A). In one example, the server computing device(s) 902 may include an application or other functional components for communicating with the peer-to-peer user device 908(A) or the server computing device(s) 910 to authorize or decline transactions.

Based on the authentication notification that is received by the peer-to-peer user device 908(A) from server computing device(s) 902, the peer-to-peer user 916(A) may indicate to the customer 920 whether the transaction has been approved. In some examples, approval may be indicated at a POS system 924, for example, at a display of the POS system 924. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider 912 can provide, among other services, payment services, inventory management services, catalog management services, business banking services, financing services, lending services, reservation management services, web-development services, payroll services, employee management services, appointment services, loyalty tracking services, restaurant management services, order management services, fulfillment services, peer-to-peer payment services, onboarding services, identity verification (IDV) services, and so on. In some examples, the users 914 can access all of the services of the service provider 912. In other examples, the users 914 can have gradated access to the services, which can be based on risk tolerance, IDV outputs, subscriptions, and so on. In at least one example, access to such services can be availed to the peer-to-peer users 916 acting as merchants via the mobile application 918. In additional or alternative examples, each service can be associated with its own access point (e.g., application, web browser, etc.).

The service provider 912 can offer payment services for processing payments on behalf of the peer-to-peer users 916, as described above. For example, the service provider 912 can provision payment processing software, payment processing hardware or payment services to peer-to-peer users 916, as described above, to enable the peer-to-peer users 916 to receive payments from the customers 920 (or other users 914 generally) when conducting transactions with the customers 920. For instance, the service provider 912 can enable the peer-to-peer users 916 to receive cash payments, payment card payments, or electronic payments from customers 920 for transactions and the service provider 912 can process transactions on behalf of the peer-to-peer users 916.

As the service provider 912 processes transactions on behalf of the peer-to-peer users 916, the service provider 912 can maintain accounts or balances for the peer-to-peer users 916 in one or more ledgers. For example, the service provider 912 can analyze transaction data received for a transaction to determine an amount of funds owed to a peer-to-peer user 916(A) for the transaction. In at least one example, such an amount can be a total purchase price less fees charged by the service provider 912 for providing the payment services. Based on determining the amount of funds owed to the peer-to-peer user 916(A) acting as a merchant, the service provider 912 can deposit funds into an account of the peer-to-peer user 916(A). The account can have a stored balance, which can be managed by the service provider 912. The account can be different from a conventional bank account at least because the stored balance is managed by a ledger of the service provider 912 and the associated funds are accessible via various withdrawal channels including, but not limited to, scheduled deposit, same-day deposit, instant deposit, and a linked payment instrument.

A scheduled deposit can occur when the service provider 912 transfers funds associated with a stored balance of the peer-to-peer user 916(A) to a bank account of the peer-to-peer user 916(A) that is held at a bank or other financial institution (e.g., associated with the server computing device(s) 910). Scheduled deposits can occur at a prearranged time after a POS transaction is funded, which can be a business day after the POS transaction occurred, or sooner or later. In some examples, the peer-to-peer user 916(A) can access funds prior to a scheduled deposit. For instance, the peer-to-peer user 916(A) may have access to same-day deposits (e.g., wherein the service provider 912 deposits funds from the stored balance to a linked bank account of the merchant on a same day as POS transaction, in some examples prior to the POS transaction being funded) or instant deposits (e.g., wherein the service provider 912 deposits funds from the stored balance to a linked bank account of the merchant on demand, such as responsive to a request). Further, in at least one example, the peer-to-peer user 916(A) can have a payment instrument that is linked to the stored balance that enables the merchant to access the funds without first transferring the funds from the account managed by the service provider 912 to the bank account of the peer-to-peer user 916(A).

In at least one example, the service provider 912 may provide inventory management services. That is, the service provider 912 may provide inventory tracking and reporting for merchants. Inventory management services may enable merchants to access and manage a data store storing data associated with a quantity of each item that the merchant has available (i.e., an inventory). Furthermore, in at least one example, the service provider 912 can provide catalog management services to enable the merchant to maintain a catalog, which can be a data store storing data associated with items that the merchant has available for acquisition (i.e., catalog management services). In at least one example, the catalog may include multiple data items and a data item of the multiple data items may represent an item that the merchant has available for acquisition. The service provider 912 can offer recommendations related to pricing of the items, placement of items on the catalog, and multi-party fulfilment of the inventory.

In at least one example, the service provider 912 can provide business banking services, which allow peer-to-peer users 916, including peer-to-peer users acting as merchants to track deposits (from payment processing or other sources of funds) into an account of the peer-to-peer user 916(A), payroll payments from the account (e.g., payments to employees of the peer-to-peer user 916(A)), payments to other peer-to-peer users (e.g., business-to-business) directly from the account or from a linked debit card, withdrawals made via scheduled deposit or instant deposit, etc. Furthermore, the business banking services can enable the merchant to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the peer-to-peer users 916 to visualize their cash flow to track their financial health, set aside money for upcoming obligations (e.g., savings), organize money around goals, etc.

In at least one example, the service provider 912 can provide financing services and products, such as via business loans, consumer loans, fixed term loans, flexible term loans, and the like. In at least one example, the service provider 912 can utilize one or more risk signals to determine whether to extend financing offers or terms associated with such financing offers.

In at least one example, the service provider 912 can provide financing services for offering or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider 912 can offer different types of capital loan products. For instance, in at least one example, the service provider 912 can offer a daily repayment loan product, wherein a capital loan is repaid daily, for instance, from a portion of transactions processed by the payment service on behalf of the borrower. Additionally or alternatively, the service provider 912 can offer a monthly repayment loan product, wherein a capital loan is repaid monthly, for instance, via a debit from a bank account linked to the payment service. The credit risk of the borrower may be evaluated using risk models that consider factors, such as payment volume, credit risk of similarly situated merchants, past transaction history, seasonality, credit history, and so on.

Additionally or alternatively, the service provider 912 can provide financing services for offering or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the peer-to-peer users 916. The service provider 912 can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed or maintained by the service provider 912 (e.g., from payments owed to another user, from payments processed on behalf of the other user, funds transferred to the user, etc.). The service provider 912 can offer specific financial products, such as payment instruments, tied specifically to the loan products. For example, in one implementation, the server provider 912 associates capital to a user's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan or the parties associated with the loan.

The service provider 912 can provide web-development services, which enable users 914 who are unfamiliar with HTML, XML, Javascript, CSS, or other web design tools to create and maintain professional and aesthetically pleasing websites. Some of these web page editing applications allow users to build a web page or modify a web page (e.g., change, add, or remove content associated with a web page). Further, in addition to websites, the web-development services can create and maintain other online omni-channel presences, such as social media posts for example. In some examples, the resulting web page(s) or other content items can be used for offering item(s) for sale via an online/e-commerce platform. That is, the resulting web page(s) or other content items can be associated with an online store or offering by merchants such as the one or more peer-to-peer users 916. In at least one example, the service provider 912 can recommend or generate content items to supplement omni-channel presences of the peer-to-peer users 916. That is, if a peer-to-peer user has a web page, the service provider 912—via the web-development or other services—can recommend or generate additional content items to be presented via other channel(s), such as social media, email, etc.

Furthermore, the service provider 912 can provide payroll services to enable employers to pay employees for work performed on behalf of employers. In at least one example, the service provider 912 can receive data that includes time worked by an employee (e.g., through imported timecards or POS interactions), sales made by the employee, gratuities received by the employee, and so forth. Based on such data, the service provider 912 can make payroll payments to employee(s) on behalf of an employer via the payroll service. For instance, the service provider 912 can facilitate the transfer of a total amount to be paid out for the payroll of an employee from the bank of the employer to the bank of the service provider 912 to be used to make payroll payments. In at least one example, when the funds have been received at the bank of the service provider 912, the service provider 912 can pay the employee, such as by check or direct deposit, often a day, a week, or more after when the work was actually performed by the employee. In additional or alternative examples, the service provider 912 can enable employee(s) to receive payments via same-day or instant deposit based at least in part on risk or reliability analyses performed by the service provider 912.

Moreover, in at least one example, the service provider 912 can provide employee management services for managing schedules of employees. Further, the service provider 912 can provide appointment services for enabling users 914 to set schedules for scheduling appointments or users 914 to schedule appointments.

In some examples, the service provider 912 can provide restaurant management services to enable users 914 to make or manage reservations, to monitor front-of-house or back-of-house operations, and so on. In such examples, the peer-to-peer user device(s) 908 or server computing device(s) 902 can be configured to communicate with one or more other computing devices, which can be located in the front-of-house (e.g., POS device(s)) or back-of-house (e.g., kitchen display system(s) (KDS)). In at least one example, the service provider 912 can provide order management services or fulfillment services to enable restaurants to manage open tickets, split tickets, and so on or manage fulfillment services. In some examples, such services can be associated with restaurant merchants, as described above. In additional or alternative examples, such services can be any type of merchant.

In at least one example, the service provider 912 can provide fulfilment services, which can use couriers for delivery, wherein couriers can travel between multiple locations to provide delivery services, photography services, etc. Couriers can be users 914 who can travel between locations to perform services for a requesting user 914 (e.g., deliver items, capture images, etc.). In some examples, the courier can receive compensation from the service provider 912. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider 912 can receive requests for courier services, automatically assign the requests to active couriers, and communicate dispatch instructions to couriers via user interface (e.g., application, web browser, or other access point) presented via respective devices 906.

In some examples, the service provider 912 can provide omni-channel fulfillment services. For instance, if a customer places an order with a merchant and the merchant cannot fulfill the order because one or more items are out of stock or otherwise unavailable, the service provider 912 can leverage other merchants or sales channels that are part of the platform of the service provider 912 to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider 912 can enable conversational commerce via conversational commerce services, which can use one or more machine learning mechanisms to analyze messages exchanged between two or more users 914, voice inputs into a virtual assistant or the like, to determine intents of user(s) 914. In some examples, the service provider 912 can utilize determined intents to automate customer service, offer promotions, provide recommendations, or otherwise interact with customers in realtime. As an example, intents can be determined based on the detection of a federated identifier in the inputs of the user(s) 914. In at least one example, the service provider 912 can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, the service provider 912 can provide a peer-to-peer payment service that enables peer-to-peer payments between two or more users 914 or peer-to-peer users 916. In at least one example, the service provider 912 can communicate with instances of a mobile application 918 (or other access point) installed on devices 906 or 908 configured for operation by users 914 or peer-to-peer users 916. In an example, an instance of the mobile application executing on a first device operated by a payor can send a request to the service provider 912 to transfer an amount of funds (e.g., fiat currency or non-fiat currency such as cryptocurrency, securities, and related assets) from an account of the payor to an account of a payee (e.g., a peer-to-peer payment). The service provider 912 can facilitate the transfer and can send a notification to an instance of the payment application executing on a second mobile device operated by the payee that the transfer is in process (or has been completed). In some examples, the service provider 912 can send additional or alternative information to the instances of the payment application (e.g., low balance to the payor, current balance to the payor or the payee, etc.). In some implementations, the payor or payee can be identified automatically, e.g., based on context, proximity, prior transaction history, and so on. In other examples, the payee can send a request for funds to the payor prior to the payor initiating the transfer of funds. The funds transferred can be associated with any digital currency type, including, but not limited to, cash, cryptocurrency, etc. In some embodiments, the service provider 912 funds the request to payee on behalf of the payor, to speed up the transfer process and compensate for any lags that may be attributed to payor's financial network.

In some implementations, the service provider 912 can trigger the peer-to-peer payment process through identification of a "payment proxy" having a particular syntax, such as the federated identifier discussed herein. For example, the syntax includes a monetary currency indicator prefixing one or more alphanumeric characters (e.g., $Cash). The currency indicator operates as the tagging mechanism that indicates to a computer system to treat the inputs as a request from the sender to transfer cash, where detection of the syntax (which includes one or more alphanumeric characters tagged by a monetary currency indicator) triggers a transfer of cash. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. The peer-to-peer process can be initiated through a particular application executing on the user devices 906.

In some embodiments, the peer-to-peer process can be implemented within a forum context. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, or any other types of messages. The forum can be employed by a content provider to enable users of the forum to interact with one another, (e.g., through creating messages, posting comments, etc.). In some embodiments, "forum" may also refer to an application or webpage of an e-commerce or retail organization that offers products or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application context, such as a messaging application context. The term "messaging application," as used here, refers to any messaging application that enables communication between users (e.g., sender and recipient of a message) over a wired or wireless communications network, through use of a communication message. The messaging application can be employed by the service provider 912. For instance, the service provider 912 can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 906 (e.g., mobile device or conventional personal computer (PC)) based on instructions transmitted to and from the server computing device(s) 902 (which, in such an example can be called a "messaging server"). In some instances, the messaging application can include a payment application with messaging capability that enables users of the payment application to communicate with one another. In such instances, the payment application can be executed on a user device 906 based on instructions transmitted to and from the server computing device(s) 902 (e.g., the payment service discussed in this description or another payment service that supports payment transactions).

In at least some embodiments, the peer-to-peer process can be implemented within a landing page context. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider 912 can generate the landing page to enable the recipient to conveniently receive one or more payments from one or more senders. In some embodiments, the personalized location address identifying the landing page is a uniform resource locator (URL) that incorporates the payment proxy. In such embodiments, the landing page is a web page, e.g., www.cash.me/$Cash.

In at least one example, a user 914 may be new to the service provider 912 such that the user 914 that has not registered (e.g., subscribed to receive access to one or more services offered by the service provider) with the service provider 912. The service provider 912 can offer onboarding services for registering a potential user 914 with the service provider 912. In some examples, onboarding can involve presenting various questions, prompts, and the like to a potential user 914 to obtain information that can be used to generate a profile for the potential user 914. In at least one example, the service provider 912 can provide limited or short-term access to its services prior to, or during, onboarding (e.g., a user of a peer-to-peer payment service can transfer or receive funds prior to being fully onboarded, a merchant can process payments prior to being fully onboarded, etc.). In at least one example, responsive to the potential user 914 providing all necessary information, the potential user 914 can be onboarded to the service provider 912. In such an example, any limited or short-term access to services of the service provider 912 can be transitioned to more permissive (e.g., less limited) or longer-term access to such services.

The service provider 912 can be associated with IDV services, which can be used by the service provider 912 for compliance purposes or can be offered as a service, for instance to third-party service providers (e.g., associated with the server computing device(s) 910). That is, the service provider 912 can offer IDV services to verify the identity of users 914 seeking to use or using their services. Identity verification requires a customer (or potential customer) to provide information that is used by compliance departments to prove that the information is associated with an identity of a real person or entity. In at least one example, the service provider 912 can perform services for determining whether identifying information provided by a user 914 accurately identifies the customer (or potential customer) (i.e., Is the customer who they say they are?).

The service provider 912 is capable of providing additional or alternative services and the services described above are offered as a sampling of services. In at least one example, the service provider 912 can exchange data with the server computing device(s) 910 associated with third-party service providers. Such third-party service providers can provide information that enables the service provider 912 to provide services, such as those described above. In additional or alternative examples, such third-party service providers can access services of the service provider 912. That is, in some examples, the third-party service providers can be subscribers, or otherwise access, services of the service provider 912.

Techniques described herein can be configured to operate in both real-time/online and offline modes. "Online" modes refer to modes when devices are capable of communicating with the service provider 912 (e.g., the server computing device(s) 902) or the server computing device(s) 910 via the network(s) 904. In some examples, the peer-to-peer user device(s) 908 are not capable of connecting with the service provider 912 (e.g., the server computing device(s) 902) or the server computing device(s) 910, due to a network connectivity issue, for example. In additional or alternative examples, the server computing device(s) 902 are not capable of communicating with the server computing device(s) 910 due to network connectivity issue, for example. In such examples, devices may operate in "offline" mode where at least some payment data is stored (e.g., on the peer-to-peer user device(s) 908) or the server computing device(s) 902 until connectivity is restored and the payment data can be transmitted to the server computing device(s) 902 or the server computing device(s) 910 for processing.

In at least one example, the service provider 912 can be associated with a hub, such as an order hub, an inventory hub, a fulfillment hub and so on, which can enable integration with one or more additional service providers (e.g., associated with the additional server computing device(s) 910). In some examples, such additional service providers can offer additional or alternative services and the service provider 912 can provide an interface or other computer-readable instructions to integrate functionality of the service provider 912 into the one or more additional service providers.

Techniques described herein are directed to services provided via a decentralized system of user devices 906 that are in communication with one or more server computing devices 902 of the service provider 912. That is, techniques described herein are directed to a specific implementation—or, a practical application—of utilizing a decentralized system of user devices 906 that are in communication with one or more server computing devices 902 of the service provider 912 to perform a variety of services, as described above. The unconventional configuration of the decentralized system described herein enables the server computing device(s) 902 that are remotely-located from end-users (e.g., users 914) to intelligently offer services based on aggregated data associated with the end-users, such as the users 914

(e.g., data associated with multiple, different merchants or multiple, different buyers), in some examples, in near-real time. Accordingly, techniques described herein are directed to a particular arrangement of elements that offer technical improvements over conventional techniques for performing payment services and the like, especially through the provision of operating environments and methods for the registration and use of federated identifiers. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider 912, and those outside of the control of the service provider 912, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment services or additional or alternative services described herein. In some implementations, the decentralized system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 914 and user devices 906. Furthermore, such features are changed dynamically based on the profiles of the users involved interacting with the GUIs. As such, techniques described herein are directed to improvements to computing systems.

Figure 10:
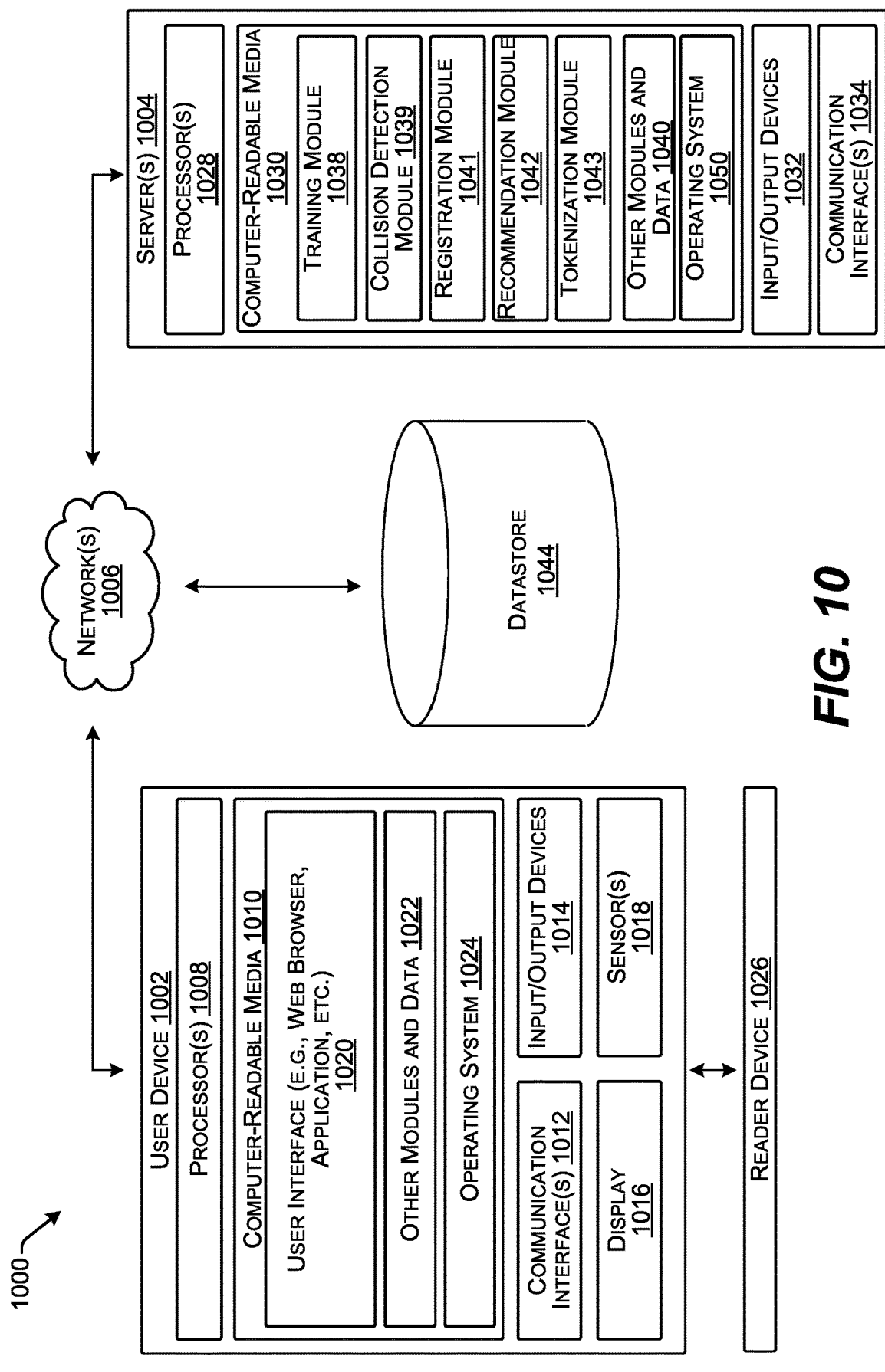
FIG. 10 is a block diagram illustrating a system for performing techniques described herein.

FIG. 10 depicts an illustrative block diagram illustrating a system 1000 for performing techniques described herein. The system 1000 includes a user device 1002, that communicates with server computing device(s) (e.g., server(s) 1004) via network(s) 1006 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1002 is illustrated, in additional or alternate examples, the system 1000 can have multiple user devices, as described above with reference to FIG. 9. As will be recognized, the user device 1002 can correspond to the first user electronic device 302A and second user electronic device 302B, the servers 1004 can correspond in parts to the payment servers 353A, 353B, and 353C and the registrar servers 363, and teachings of the datastore 1044 can relate to one or more of the accounts data stores 355A, 355B, and 355C, the centralized identifier data store 365, and the local instances of the identifier ledger 357A, 357B, and 357C.

In at least one example, the user device 1002 can be any suitable type of computing device, e.g., portable, semi-portable, semi-stationary, or stationary. Some examples of the user device 1002 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1002 can be any computing device capable of sending communications and performing the functions according to the techniques described herein. The user device 1002 can include devices, e.g., payment card readers, or components capable of accepting payments, as described below.

In the illustrated example, the user device 1002 includes one or more processors 1008, one or more computer-readable media 1010, one or more communication interface(s) 1012, one or more input/output (I/O) devices 1014, a display 1016, and sensor(s) 1018.

In at least one example, each processor 1008 can itself comprise one or more processors or processing cores. For example, the processor(s) 1008 can be implemented as one or more microprocessors, microcomputers, microcontrollers, digital signal processors, central processing units, state machines, logic circuitries, or any devices that manipulate signals based on operational instructions. In some examples, the processor(s) 1008 can be one or more hardware processors or logic circuits of any suitable type specifically programmed or configured to execute the algorithms and processes described herein. The processor(s) 1008 can be configured to fetch and execute computer-readable processor-executable instructions stored in the computer-readable media 1010.

Depending on the configuration of the user device 1002, the computer-readable media 1010 can be an example of tangible non-transitory computer storage media and can include volatile and nonvolatile memory or removable and non-removable media implemented in any type of technology for storage of information such as computer-readable processor-executable instructions, data structures, program modules or other data. The computer-readable media 1010 can include, but is not limited to, RAM, ROM, EEPROM, flash memory, solid-state storage, magnetic disk storage, optical storage, or other computer-readable media technology. Further, in some examples, the user device 1002 can access external storage, such as RAID storage systems, storage arrays, network attached storage, storage area networks, cloud storage, or any other medium that can be used to store information and that can be accessed by the processor(s) 1008 directly or through another computing device or network. Accordingly, the computer-readable media 1010 can be computer storage media able to store instructions, modules or components that can be executed by the processor(s) 1008. Further, when mentioned, non-transitory computer-readable media exclude media such as energy, carrier signals, electromagnetic waves, and signals per se.

The computer-readable media 1010 can be used to store and maintain any number of functional components that are executable by the processor(s) 1008. In some implementations, these functional components comprise instructions or programs that are executable by the processor(s) 1008 and that, when executed, implement operational logic for performing the actions and services attributed above to the user device 1002. Functional components stored in the computer-readable media 1010 can include a user interface 1020 to enable users to interact with the user device 1002, and thus the server(s) 1004 or other networked devices. In at least one example, the user interface 1020 can be presented via a web browser, or the like. In other examples, the user interface 1020 can be presented via an application, such as a mobile application or desktop application, which can be provided by a service provider 912 associated with the server(s) 1004, or which can be an otherwise dedicated application. In at least one example, a user can interact with the user interface via touch input, spoken input, gesture, or any other type of input. The word "input" is also used to describe "contextual" input that may not be directly provided by the user via the user interface 1020. For example, user's interactions with the user interface 1020 are analyzed using, e.g., natural language processing techniques, to determine context or intent of the user, which may be treated in a manner similar to "direct" user input.

Depending on the type of the user device 1002, the computer-readable media 1010 can also optionally include other functional components and data, such as other modules and data 1022, which can include programs, drivers, etc., and the data used or generated by the functional components. In addition, the computer-readable media 1010 can also store data, data structures and the like, that are used by the functional components. Further, the user device 1002 can include many other logical, programmatic and physical components, of which those described are merely examples that are related to the discussion herein.

In at least one example, the computer-readable media 1010 can include additional functional components, such as an operating system 1024 for controlling and managing various functions of the user device 1002 and for enabling basic user interactions.

The communication interface(s) 1012 can include one or more interfaces and hardware components for enabling communication with various other devices, such as over the network(s) 1006 or directly. For example, communication interface(s) 1012 can enable communication through one or more network(s) 1006, which can include, but are not limited any type of network known in the art, such as a local area network or a wide area network, such as the Internet, and can include a wireless network, such as a cellular network, a cloud network, a local wireless network, such as Wi-Fi or close-range wireless communications, such as Bluetooth®, BLE, NFC, RFID, a wired network, or any other such network, or any combination thereof. Accordingly, network(s) 1006 can include both wired or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1002 can further include one or more input/output (I/O) devices 1014. The I/O devices 1014 can include speakers, a microphone, a camera, and various user controls (e.g., buttons, a joystick, a keyboard, a keypad, etc.), a haptic output device, and so forth. The I/O devices 1014 can also include attachments that leverage the accessories (audio-jack, USB-C, Bluetooth, etc.) to connect with the user device 1002.

In at least one example, user device 1002 can include a display 1016. Depending on the type of computing device(s) used as the user device 1002, the display 1016 can employ any suitable display technology. For example, the display 1016 can be a liquid crystal display, a plasma display, a light emitting diode display, an OLED (organic light-emitting diode) display, an electronic paper display, or any other suitable type of display able to present digital content thereon. In at least one example, the display 1016 can be an augmented reality display, a virtually reality display, or any other display able to present or project digital content. In some examples, the display 1016 can have a touch sensor associated with the display 1016 to provide a touchscreen display configured to receive touch inputs for enabling interaction with a graphic interface presented on the display 1016. Accordingly, implementations herein are not limited to any particular display technology. Alternatively, in some examples, the user device 1002 may not include the display 1016, and information can be presented by other means, such as aurally, haptically, etc.

In addition, the user device 1002 can include sensor(s) 1018. The sensor(s) 1018 can include a GPS device able to indicate location information. Further, the sensor(s) 1018 can include, but are not limited to, an accelerometer, gyroscope, compass, proximity sensor, camera, microphone, or a switch.

In some example, the GPS device can be used to identify a location of a user. In at least one example, the location of the user can be used by the service provider 912, described above, to provide one or more services. That is, in some examples, the service provider 912 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 914 or for sending users 914 notifications regarding available appointments with merchant(s) located proximate to the users 914. In at least one example, location can be used for taking payments from nearby customers when they leave a geofence, or location can be used to initiate an action responsive to users 914 enter a brick-and-mortar store of a merchant. Location can be used in additional or alternative ways as well.

Additionally, the user device 1002 can include various other components that are not shown, examples of which include removable storage, a power source, such as a battery and power control unit, a barcode scanner, a printer, a cash drawer, and so forth.

In addition, in some examples, the user device 1002 can include, be connectable to, or otherwise be coupled to a reader device 1026, for reading payment instruments or identifiers associated with payment objects. In some examples, as described above, the reader device 1026 can plug in to a port in the user device 1002, such as a microphone port, a headphone port, an audio-jack, a data port, or other suitable port. In additional or alternative examples, the reader device 1026 can be coupled to the user device 1002 via another wired or wireless connection, such as via a Bluetooth®, BLE, and so on. The reader device 1026 can include a read head for reading a magnetic strip of a payment card, and further can include encryption technology for encrypting the information read from the magnetic strip. Additionally or alternatively, the reader device 1026 can be an EMV payment reader, which in some examples, can be embedded in the user device 1002. Moreover, numerous other types of readers can be employed with the user device 1002 herein, depending on the type and configuration of the user device 1002.

The reader device 1026 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1026 may include hardware implementation, such as slots, magnetic tracks, and rails with one or more sensors or electrical contacts to facilitate detection and acceptance of a payment instrument. That is, the reader device 1026 may include hardware implementations to enable the reader device 1026 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1026 may also include a biometric sensor to receive and process biometric characteristics and process them as payment instruments, given that such biometric characteristics are registered with the payment service 912 and connected to a financial account with a bank server.

The reader device 1026 may include processing unit(s), computer-readable media, a reader chip, a transaction chip, a timer, a clock, a network interface, a power supply, and so on. The processing unit(s) of the reader device 1026 may execute one or more modules or processes to cause the reader device 1026 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program modules, program data, or one or more operating systems. Depending on the exact configuration and type of the reader device 1026, the computer-readable media may include volatile memory (such as RAM), non-volatile memory (such as ROM, flash memory, miniature hard drive, memory card, or the like), or some combination thereof. In at least one example, the computer-readable media of the reader device 1026 may include at least one module for performing various functions as described herein.

The reader chip may perform functionalities to control the operations and processing of the reader device 1026. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 106, which may provide a clock signal indicating a time. Furthermore, the reader chip may perform functionality to control the network interface, which may interface with the network(s) 1006, as described below.

Additionally, the reader chip may perform functionality to control the power supply. The power supply may include one or more power supplies such as a physical connection to AC power or a battery. Power supply may include power conversion circuitry for converting AC power and generating multiple DC voltages for use by components of reader device 1026. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media or the transaction chip may have its own processing unit(s) and computer-readable media. In other examples, the functionalities of reader chip and transaction chip may be embodied in a single chip or multiple chips, each including any suitable combination of processing units and computer-readable media to collectively perform the functionalities of reader chip and transaction chip as described herein.

While, the user device 1002 and the reader device 1026 are shown as separate devices, in additional or alternative examples, the user device 1002 and the reader device 1026 can be part of a single device, which may be a battery-operated device. In such an example, components of both the user device 1002 and the reader device 1026 may be associated with the single device. In some examples, the reader device 1026 can have a display integrated therewith, which can be in addition to (or as an alternative of) the display 1016 associated with the user device 1002.

The server(s) 1004 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1004 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1004 can be located together or separately, and organized, for example, as virtual servers, server banks or server farms. The described functionality can be provided by the servers of a single merchant or enterprise, or can be provided by the servers or services of multiple different customers or enterprises.

In the illustrated example, the server(s) 1004 can include one or more processors 1028, one or more computer-readable media 1030, one or more I/O devices 1032, and one or more communication interfaces 1034. Each processor 1028 can be a single processing unit or a number of processing units, and can include single or multiple computing units or multiple processing cores. The processor(s) 1028 can be implemented as one or more microprocessors, microcomputers, microcontrollers, digital signal processors, central processing units, state machines, logic circuitries, or any devices that manipulate signals based on operational instructions. For example, the processor(s) 1028 can be one or more hardware processors or logic circuits of any suitable type specifically programmed or configured to execute the algorithms and processes described herein. The processor(s) 1028 can be configured to fetch and execute computer-readable instructions stored in the computer-readable media 1030, which can program the processor(s) 1028 to perform the functions described herein.

The computer-readable media 1030 can include volatile and nonvolatile memory or removable and non-removable media implemented in any type of technology for storage of information, such as computer-readable instructions, data structures, program modules, or other data. Such computer-readable media 1030 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1004, the computer-readable media 1030 can be a type of computer-readable storage media or can be a tangible non-transitory media to the extent that when mentioned, non-transitory computer-readable media exclude media such as energy, carrier signals, electromagnetic waves, and signals per se.

The computer-readable media 1030 can be used to store any number of functional components that are executable by the processor(s) 1028. In many implementations, these functional components comprise instructions or programs that are executable by the processors 1028 and that, when executed, specifically configure the one or more processors 1028 to perform the actions attributed above to the service provider 912 or payment service. Functional components stored in the computer-readable media 1030 can optionally include a training module 1038, a collision detection module

1039, a registration module 1041, a recommendation module 1042, a tokenization module 1043, and one or more other modules and data 1040.

The training module 1038 can be configured to train models using machine-learning mechanisms. For example, a machine-learning mechanism can analyze training data to train a data model that generates an output, which can be a recommendation, a score, or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1002 or the server(s) 1004 for use at a time after the data models have been trained (e.g., at runtime).

The collision detection module 1039 can be configured to operate a collision detection and resolution protocol. Collision detection can involve determining whether a unique identifier requested to be registered for a user matches a second unique identifier already registered for another user. Collision detection can further involve determining whether two unique identifiers match where a centralized identifier registrar 360 or identifier ledger (e.g., identifier ledger 357A, 357B, or 357C) receive registration requests for the unique identifiers substantially simultaneously. Collision resolution can involve processing the registration requests according to a collision resolution protocol, such as one of the collision resolution protocols described herein.

The registration module 1041 can be configured to receive registration requests for a requested unique identifier, process the requests to determine the availability of the requested unique identifier, and confirm the registration of the unique identifier, if available. The registration module 1041 can be further configured to generate one or more user interfaces (e.g., to be displayed on user electronic devices) to facilitate the registration of requested unique identifiers, generation of replacement unique identifiers, reservation of replacement unique identifiers, and confirmation of completed registrations. Furthermore, the registration module 1041 can be configured to interface with various payment services (e.g., payment service 350A or 350B) to cause the creation of accounts on behalf of users who have requested registration of a unique identifier.

The recommendation module 1042 can be configured to generate recommendations for replacement unique identifiers, such as when a user is registering or changing a unique identifier. The recommendation module 1042 can use one or more context-based prediction algorithms, for example, look-ahead or type-ahead text prediction, a sequential or ordered recommendation system, other text recommendation engines, or similarity and comparison models. The recommendation module 1042 can include one or more machine-learned models for generating recommended replacement unique identifiers. The recommendation module 1042 can determine similarity between a requested unique identifier and one or more recommended unique identifiers based on a similarity-determining function. The similarity-determining function can include a semantic understanding algorithm, such as natural language processing, to evaluate the meaning of words used in the requested identifier and generate identifiers with similar semantic meaning. Additionally or alternatively, the similarity-determining functions or recommendation system can use one or more machine-learned models trained to categorize unique identifiers and otherwise identify similarities across unique identifiers, such as frequency of co-usage or replacement-level usage of words in a language corpus. The recommendation module 1042 can be further based on a word embedding model to generate an embedding corresponding to the unique identifier and to a set of pre-generated unique identifiers, where the embedding maps words to an embedding space such that distance in the embedding space is inversely related to similarity.

The tokenization module 1043 can be configured generate, store, and maintain tokens, which can include cryptographic tokens, corresponding to user accounts in a centralized data store (e.g., in a centralized embodiment) or in a ledger (e.g., in the decentralized embodiment). The tokens generated by the tokenization module 1043 can be stored in lieu of storing plaintext information correlating user identifier information and financial account information. The tokenization module 1043 can use various public-private key schemas where the token serves as a public key and the corresponding private key is stored within a financial institution or payment service to verify the authenticity of the token.

The one or more other modules and data 1040 can include other modules for receiving and resolving requests related to federated identifiers, the functionality of which is described, at least partially, above. Further, the one or more other modules and data 1040 can include programs, drivers, etc., and the data used or generated by the functional components. Further, the server(s) 1004 can include many other logical, programmatic and physical components, of which those described above are merely examples that are related to the discussion herein.

The one or more "modules" referenced herein may be implemented as more modules or as fewer modules, and functions described for the modules may be redistributed depending on the details of the implementation. The term "module," as used herein, refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs that can be accessed over a network or downloaded as software onto a device (e.g., executable code causing the device to perform an action). An application program (also called an "application") may include one or more modules, or a module may include one or more application programs. In additional or alternative examples, the module(s) may be implemented as computer-readable instructions, various data structures, and so forth via at least one processing unit to configure the computing device(s) described herein to execute instructions and to perform operations as described herein.

In some examples, a module may include one or more application programming interfaces (APIs) to perform some or all of its functionality (e.g., operations). In at least one example, a software developer kit (SDK) can be provided by the service provider to allow third-party developers to include service provider functionality or avail service provider services in association with their own third-party applications. Additionally or alternatively, in some examples, the service provider can utilize a SDK to integrate third-party service provider functionality into its applications. That is, API(s) or SDK(s) can enable third-party developers to customize how their respective third-party applications interact with the service provider or vice versa.

The computer-readable media 1030 can additionally include an operating system 1050 for controlling and managing various functions of the server(s) 1004.

The communication interface(s) 1034 can include one or more interfaces and hardware components for enabling communication with various other devices, such as over the network(s) 1006 or directly. For example, communication interface(s) 1034 can enable communication through one or more network(s) 1006, which can include, but are not limited any type of network known in the art, such as a local area network or a wide area network, such as the Internet, and can include a wireless network, such as a cellular network, a local wireless network, such as Wi-Fi or close-range wireless communications, such as Bluetooth®, BLE, NFC, RFID, a wired network, or any other such network, or any combination thereof. Accordingly, network(s) 1006 can include both wired or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1004 can further be equipped with various I/O devices 1032. Such I/O devices 1032 can include a display, various user interface controls (e.g., buttons, joystick, keyboard, mouse, touch screen, biometric or sensory input devices, etc.), audio speakers, connection ports and so forth.

In at least one example, the system 1000 can include a datastore 1044 that can be configured to store data that is accessible, manageable, and updatable. In some examples, the datastore 1044 can be integrated with the user device 1002 or the server(s) 1004. In other examples, as shown in FIG. 10, the datastore 1044 can be located remotely from the server(s) 1004 and can be accessible to the server(s) 1004. The datastore 1044 can comprise multiple data stores or servers connected locally or remotely via the network(s) 1006.

In at least one example, the datastore 1044 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized or total spends of each of the transactions, parties to the transactions, dates, times, or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider 912.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the datastore 1044 can store inventory database(s) or catalog database(s). As described above, an inventory can store data associated with a quantity of each item that a user has available. Furthermore, a catalog can store data associated with items that a user has available for acquisition. The datastore 1044 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to FIGS. 3, 4, 5A-5B, 6A-6C, 7, and 8 for convenience and ease of understanding. However, the methods illustrated are not limited to being performed using components described in FIGS. 3, 4, 5A-5B, 6A-6C, 7, and 8, and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. In some embodiments, one or more blocks of the process can be omitted entirely. Moreover, the methods can be combined in whole or in part with each other or with other methods.

The above Detailed Description of embodiments of the disclosure is not intended to be exhaustive or to limit the invention to the precise form disclosed above. While specific examples for the invention are described herein for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, or modified to provide alternative combinations or sub-combinations. Each of these processes or blocks may be implemented in a variety of different ways. Also, while processes or blocks are at times shown as being performed in series, these processes or blocks may instead be performed or implemented in parallel, or may be performed at different times.

The appended claims may serve as a summary of the invention. Various embodiments are disclosed in the Detailed Description and the appended claims and can be directed to a method, a storage medium, a system and a computer program product; any feature recited in one claim category such as a method can be embodied in a claim in another category such as a system. The dependencies or references back in the appended claims are recited only for formal reasons. Any subject matter resulting from a reference back to any previous claims is within the scope of the disclosure, so that any combination of claims and the features thereof are disclosed and can be claimed regardless of the dependencies recited in the attached claims. The disclosure encompasses not only the combinations recited in the appended claims but also any other combination of features in the claims. Thus, the disclosure includes each feature recited in the claims in combination with any other feature or combination of other features in the claims. Furthermore, any of the embodiments and features described or depicted herein can be claimed in a separate claim and/or in any combination with any embodiment or feature described or depicted herein or with any of the features of the attached claims.

As a non-limiting example, in one or more embodiments, a first payment system can receive from a second payment system, an intent to register an identifier with the first payment system. The identifier can be associated with an account of a user on the second payment system and can be used as a payment proxy provided in lieu of financial information of the user to facilitate payments via the second payment system. The first payment system can determine availability of the identifier based on determining whether the identifier is associated with another user in a data store maintained by the first payment system. The data store stores indications of identifiers used by users of the first payment system and one or more other payment systems, including the second payment system, to ensure each identifier is a unique identifier that is associated with only one user of the first payment system and the one or more other payment systems. Based on a determination that the identifier is available, the first payment system can request, from the second payment system, a token associated with the account of the user on the second payment system; map, in the data store maintained by the second payment system, the token to the identifier; receive a payment request wherein the identifier is used as the payment proxy in lieu of the financial information of the user; determine, based at least in part on parsing the payment request to identify the identifier, that the token that is mapped to the identifier; and facilitate processing of a payment associated with the payment request through the second payment system using the token.

As a non-limiting example, in one or more embodiments, based on a determination that the identifier is not available, the payment service can notify the second payment system that the identifier is not available and request, from the second payment system, a replacement identifier to use in place of the identifier. In one or more embodiments, the user is a first user, the payment request is received from a user electronic device of a second user, and facilitating processing of the payment associated with the payment request through the second payment system using the token includes sending the token and information for the payment request to the second payment system; receiving identifying information for an account of the first user from the second payment system; and initiating a transaction between the account of the first user and an account of the second user based at least in part on the identifying information. Based at least in part on initiating the transaction, the first payment system determines whether a currency conversion is necessary to complete the transaction. In one or more embodiments the data store maintained by the first payment system is a first instance of an identifier ledger. In one or more embodiments the second payment system maintains a second instance of the identifier ledger. In one or more embodiments mapping the token to the identifier is associated with an update to the first instance of the identifier ledger. In one or more embodiments the first payment system propagates the update to the first instance of the identifier ledger to the second instance of the identifier ledger. In one or more embodiments the second payment system is a third-party payment system.

As a non-limiting example, in one or more embodiments, a computing system of a first service provider that is part of a federated system can store, in a data store maintained by the computing system, one or more indications of one or more unique identifiers used by one or more users of the first service provider and at least one second service provider that is part of the federated system. Each of the one or more unique identifiers is associated with only one user of the first service provider and the at least one second service provider. The computing system can receive an intent to register a unique identifier with the first service provider. The unique identifier is useable by a user as a proxy in lieu of personal data associated with the user. The computing system can determine availability of the unique identifier based at least in part on determining whether the unique identifier is associated with another user in the data store maintained by the computing system. Based at least in part on a determination that the unique identifier is available, the computing system can map, in the data store maintained by the computing system, the unique identifier with an account of the user associated with each service provider that is part of the federated system. Subsequent to the mapping, the unique identifier can be usable as the proxy in lieu of the personal data associated with the user on each service provider that is part of the federated system.

As a non-limiting example, in one or more embodiments, prior to determining availability of the unique identifier, the computing system can receive, from the at least one second service provider, another unique identifier associated with the account of the user associated with the at least one second service provider. Based at least in part on a determination that the other unique identifier is associated with another user in the data store maintained by the computing system, the computing system can notify the at least one second service provider that the other unique identifier is not available. The computing system can request, from the at least one second service provider, a replacement unique identifier to use in place of the other unique identifier, wherein the unique identifier is the replacement unique identifier. In one or more embodiments, the computing system can provide one or more recommended unique identifiers in conjunction with the notification that the other unique identifier is not available. The intent to register the unique identifier can be associated with one of the one or more recommended unique identifiers. In one or more embodiments, based at least in part on the determination that the other unique identifier is not available, the computing system can temporarily reserve the one or more recommended unique identifiers for registration. The computing system can release any temporary reservations of the one or more recommended unique identifiers based on receiving the intent to register the unique identifier. In one or more embodiments, at least one second service provider is at least one of a social media service, a media sharing service, a livestreaming service, or a payment service. In one or more embodiments, the computing system is a centralized identifier registrar and the data store maintained by the computing system is a centralized identifier data store. In one or more embodiments, the data store maintained by the computing system is a first instance of a unique identifier ledger. The at least one second service provider maintains a second instance of the unique identifier ledger. In one or more embodiments, mapping the unique identifier with the account of the user associated with each service provider that is part of the federated system is associated with an update to the first instance of the identifier ledger. The computing system propagates the update to the first instance of the identifier ledger to the second instance of the identifier ledger.

As a non-limiting example, in one or more embodiments, the computing system can receive a payment request including the unique identifier from another user. The computing system can facilitate processing of a payment associated with the payment request. In one or more embodiments, the payment request is received from a third service provider that is part of the federated system and facilitating processing of the payment associated with the payment request includes providing an identifier for the at least one second service provider to the third service provider. In one or more embodiments, the computing system can request, from one or more of the service providers that are part of the federated system, a token associated with the account of the user associated the one or more of the service providers. The computing system can map, in the data store maintained by the computing system, the one or more tokens to the unique identifier, wherein the one or more tokens are usable for identifying account of the user associated with the one or more service providers. In one or more embodiments, the computing system can receive, from a second service pro- vider, a request associated with an action including the unique identifier. The unique identifier is provided in lieu of personal data associated with the user. The computing system can identify the token associated with the account of the user associated with the second service provider that is mapped to the unique identifier by querying the data store using the unique identifier received in the request. The computing system can initiate, using the token, the action associated with the request through the first service provider or the second service provider.

As a non-limiting example, in one or more embodiments, the computing system can store, in a data store maintained by the computing system, one or more indications of one or more unique identifiers used by one or more users of a federated system of payment service providers, wherein each of the one or more unique identifiers is associated with only one user of the payment service providers. The com- puting system can receive a request to register a unique identifier with the computing system. The unique identifier is useable by a user as a proxy in lieu of payment data associated with the user for making payments via a first payment service provider of the payment service providers. The computing system can determine that the unique iden- tifier is associated with another user in the data store maintained by the computing system. The other user is associated with a second payment service provider of the payment service providers. Based at least in part on deter- mining that the unique identifier is associated with the other user, the computing system can deny the request to register the unique identifier. The computing system can prompt the user to select an alternative user identifier that is useable by the user for making payments via the first payment service provider.

While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features.

What is claimed is:

1. A method comprising:
    storing, by a first payment system, identifiers in a data store maintained by the first payment system, wherein each identifier comprises a payment proxy used in lieu of financial information in association with payments between users, wherein each identifier is associated with a single user, wherein each identifier uniquely identifies user accounts of a plurality of payment sys- tems that are associated with the respective single user, wherein the plurality of payment systems are associated with different entities, and wherein the data store serves as a source of truth to avoid duplication of the identi- fiers across multiple payment systems;
    receiving, by the first payment system and from a second payment system, an intent to register an identifier with the first payment system, wherein the identifier is associated with an account of a user on the second payment system;

determining, by the first payment system, availability of the identifier based on determining whether the iden- tifier (i) already exists in the data store and is not available or (ii) does not already exist in the data store and is available;
based on a determination that the identifier is available:
    requesting, by the first payment system and from the second payment system, a token that uniquely iden- tifies the account of the user on the second payment system;
    mapping, by the first payment system and in the data store maintained by the first payment system, the token to the identifier;
    receiving, by the first payment system, a payment request wherein the identifier is used as the payment proxy in lieu of the financial information of the user;
    determining, by the first payment system and based at least in part on parsing the payment request to identify the identifier, that the token is mapped to the identifier; and
    facilitating, after determining that the token is mapped to the identifier and by the first payment system, processing of a payment associated with the payment request through the second payment system using the token, wherein the token is used as a substitute for stored financial information of the user on the second payment system; and
based on a determination that the identifier is not avail- able:
    sending a request to a centralized identifier registrar, for one or more recommended unique identifiers, wherein the request includes the identifier; and
    receiving, from the centralized identifier registrar, the one or more recommended unique identifiers, wherein the one or more recommended unique iden- tifiers correspond to one or more embeddings that are near the embedding for the identifier in embedding space, wherein distance in the embedding space between two embeddings is inversely related to similarity of identifiers from which the two embed- dings are generated, and wherein the centralized identifier registrar generates the one or more recom- mended unique identifiers based on similarity of at least one of a frequency of co-usage of words in the identifiers, a replacement-level usage of words in the identifiers in a language corpus, and a combination thereof.

2. The method of claim 1, wherein the centralized iden- tifier register generates the one or more recommended unique identifiers from one or more pre-generated unique identifiers and the one or more embeddings in the embed- ding space include corresponding embeddings generated from the one or more pre-generated unique identifiers.

3. The method of claim 1, wherein the user is a first user, the payment request is received from a user electronic device of a second user, and facilitating processing of the payment associated with the payment request through the second payment system using the token comprises:
    sending, by the first payment system, the token and information for the payment request to the second payment system;
    receiving, by the first payment system, identifying infor- mation for the account of the first user from the second payment system; and
    initiating, by the first payment system, a transaction between the account of the first user and an account of the second user based at least in part on the identifying information, wherein based at least in part on initiating the transaction, the first payment system determines whether a currency conversion is necessary to complete the transaction.

4. The method of claim 1, wherein:

the data store maintained by the first payment system is a first instance of an identifier ledger;

the second payment system maintains a second instance of the identifier ledger;

mapping the token to the identifier is associated with an update to the first instance of the identifier ledger; and the first payment system propagates the update from the first instance of the identifier ledger to the second instance of the identifier ledger.

5. The method of claim 1, further comprising:

providing the one or more recommended unique identifiers to the user;

receiving a selection of one of the one or more recommended unique identifiers from the user; and mapping, by the first payment system and in the data store maintained by the first payment system, the token that uniquely identifies the account of the user on the second payment system to the selected unique identifier.

6. A method comprising:

storing, by a computing system of a first service provider that is part of a federated system of payment systems, identifiers in a data store maintained by the first service provider, wherein each identifier comprises a payment proxy used in lieu of financial information in association with payments between users, wherein each identifier is associated with a respective single user, wherein each identifier uniquely identifies user accounts of a plurality of payment systems of the federated system that are associated with the respective single user, wherein the plurality of payment systems are associated with different entities of the federated system, and wherein the data store serves as a source of truth to avoid duplication of the identifiers across multiple payment systems;

receiving, by the computing system and from at least one second service provider that is part of the federated system, an intent to register a unique identifier with the first service provider;

determining, by the computing system, availability of the unique identifier based at least in part on determining whether the unique identifier (i) already exists in the data store and is not available or (ii) does not already exist in the data store and is available;

based at least in part on a determination that the unique identifier is available, mapping, by the computing system and in the data store maintained by the computing system, the unique identifier with a respective token that uniquely identifies an account of the respective single user associated with each service provider that is part of the federated system, wherein each respective token is provided by an associated service provider of the federated system, wherein each respective token is used as a substitute for stored financial information of the respective single user on an associated service provider of the federated system, wherein subsequent to the mapping, the unique identifier is usable as the payment proxy in lieu of personal data associated with the respective single user on each service provider that is part of the federated system; and based at least in part on a determination that the unique identifier is not available:

providing, by the computing system, the identifier as input to an embedding model of the first service provider; and receiving, from the embedding model, one or more recommended unique identifiers, wherein the one or more recommended unique identifiers correspond to one or more embeddings that are near the embedding for the identifier in embedding space, wherein distance in the embedding space between two embeddings is inversely related to similarity of identifiers from which the two embeddings are generated, and wherein the embedding model generates the one or more recommended unique identifiers based on similarity of at least one of a frequency of co-usage of words in the identifiers, a replacement-level usage of words in the identifiers in a language corpus, and a combination thereof.

7. The method of claim 6, further comprising, prior to determining availability of the unique identifier:

receiving, from the at least one second service provider, another unique identifier associated with the account of the respective single user associated with the at least one second service provider;

based at least in part on a determination that the other unique identifier is associated with another user in the data store maintained by the computing system, notifying the at least one second service provider that the other unique identifier is not available; and requesting, by the computing system and from the at least one second service provider, a replacement unique identifier to use in place of the other unique identifier, wherein the unique identifier is the replacement unique identifier.

8. The method of claim 6, wherein the embedding model generates the one or more recommended unique identifiers from one or more pre-generated unique identifiers and the one or more embeddings in the embedding space include corresponding embeddings generated from of the one or more pre-generated unique identifiers.

9. The method of claim 6, wherein based at least in part on a determination that the unique identifier already exists in the data store, the methods further comprise:

based at least in part on the determination that the other unique identifier is not available, temporarily reserving the one or more recommended unique identifiers for registration; and releasing one or more temporary reservations of the one or more recommended unique identifiers based on receiving the intent to register the unique identifier.

10. The method of claim 6, wherein the at least one second service provider is at least one of a social media service, a media sharing service, a livestreaming service, or a payment service.

11. The method of claim 6, wherein the computing system is a centralized identifier registrar and the data store maintained by the computing system is a centralized identifier data store.

12. The method of claim 6, wherein the data store maintained by the computing system is a first instance of a unique identifier ledger, wherein the at least one second service provider maintains a second instance of the unique identifier ledger.

13. The method of claim 12, wherein mapping the unique identifier with the account of the respective single user associated with each service provider that is part of the federated system is associated with an update to the first instance of the identifier ledger, and wherein the computing system propagates the update from the first instance of the identifier ledger to the second instance of the identifier ledger.

14. The method of claim 6, further comprising:

receiving a payment request including the unique identifier from another user; and facilitating processing of a payment associated with the payment request.

15. The method of claim 14, wherein:

the payment request is received from a third service provider that is part of the federated system, and facilitating processing of the payment associated with the payment request comprises providing an identifier for the at least one second service provider to the third service provider.

16. The method of claim 6, further comprising:

requesting, by the computing system and from one or more of the service providers that are part of the federated system, the respective token associated with the account of the respective user associated with the one or more of the service providers; and mapping, by the computing system and in the data store maintained by the computing system, one or more tokens received from the one or more of the service providers to the unique identifier, wherein the one or more tokens are usable for identifying the account of the respective single user associated with the one or more service providers.

17. The method of claim 16, further comprising:

receiving, by the computing system and from a second service provider, a request associated with an action including the unique identifier, wherein the unique identifier is provided in lieu of personal data associated with the respective single user;

identifying, by the computing system, the respective token associated with the account of the respective single user associated with the second service provider that is mapped to the unique identifier by querying the data store using the unique identifier received in the request; and initiating, by the computing system and using the respective token, the action associated with the request through the first service provider or the second service provider.

18. A computing system of a first service provider that is part of a federated system, the computing system comprising:

one or more processors;

a data store coupled to the one or more processors; and one or more computer-readable non-transitory storage media coupled to the one or more of the processors and comprising instructions operable when executed by one or more of the processors to cause the computing system to perform operations comprising:

storing, in the data store, identifiers, wherein each identifier comprises a payment proxy used in lieu of financial information in association with payments between users, wherein each identifier is associated with a respective single user, wherein each identifier uniquely identifies user accounts of a plurality of payment systems of the federated system, wherein the plurality of payment systems are associated with different entities of the federated system that are associated with the respective single user, and wherein the data store serves as a source of truth to avoid duplication of the identifiers across on multiple payment systems;

receiving, by the computing system and from at least one second service provider that is part of the federated system, an intent to register a unique identifier with the first service provider;

determining, by the computing system, availability of the unique identifier based at least in part on determining whether the unique identifier (i) already exists in the data store and is not available or (ii) does not already exist in the data store and is available;

based at least in part on a determination that the unique identifier is available, mapping, by the computing system and in the data store, the unique identifier with a respective token that uniquely identifies an account of the respective single user associated with each service provider that is part of the federated system, wherein each respective token is provided by an associated service provider of the federated system, wherein each respective token is used as a substitute for stored financial information of the respective single user on an associated service provider of the federated system, wherein subsequent to the mapping, the unique identifier is usable as the payment proxy in lieu of the personal data associated with the respective single user on each service provider that is part of the federated system;

based at least in part on a determination that the unique identifier is not available:

providing, by the computing system, the identifier as input to an embedding model of the first service provider; and receiving, from the embedding model, one or more recommended unique identifiers, wherein the one or more recommended unique identifiers correspond to one or more embeddings that are near the embedding for the identifier in embedding space, wherein distance in the embedding space between two embeddings is inversely related to similarity of identifiers from which the two embeddings are generated, and wherein the embedding model generates the one or more recommended unique identifiers based on similarity of at least one of a frequency of co-usage of words in the identifiers, a replacement-level usage of words in the identifiers in a language corpus, and a combination thereof.

19. The computing system of claim 18, wherein the instructions are further operable when executed by one or more of the processors to cause the computing system to perform further operations comprising, prior to determining availability of the unique identifier:

receiving, from the at least one service provider, another unique identifier associated with the account of the respective single user associated with the at least one second service provider;

based at least in part on a determination that the other unique identifier is associated with another user in the data store, notifying the at least one second service provider that the other unique identifier is not available; and requesting, by the computing system and from the at least one second service provider, a replacement unique identifier to use in place of the other unique identifier, wherein the unique identifier is the replacement unique identifier.

20. The computing system of claim 18, wherein the embedding model generates the one or more recommended unique identifiers from one or more pre-generated unique identifiers and the one or more embeddings in the embedding space includes corresponding embeddings generated from the one or more pre-generated unique identifiers.

* * * * *